United States Patent
Ajemba et al.

(10) Patent No.: US 9,754,152 B2
(45) Date of Patent: Sep. 5, 2017

(54) SYSTEMS AND METHODS FOR SEGMENTATION AND PROCESSING OF TISSUE IMAGES AND FEATURE EXTRACTION FROM SAME FOR TREATING, DIAGNOSING, OR PREDICTING MEDICAL CONDITIONS

(71) Applicant: Fundação D. Anna Sommer Champalimaud e Dr. Carlos Montez Champalimaud, Lisbon (PT)

(72) Inventors: Peter Ajemba, Chatsworth, CA (US); Richard Scott, Chestnut Ridge, NY (US); Janakiramanan Ramachandran, Fremont, CA (US); Jack Zeineh, Fullerton, CA (US); Michael Donovan, Newton, MA (US); Gerardo Fernandez, New York, NY (US); Qiuhua Liu, Sugar Land, TX (US); Faisal Khan, Fishkill, NY (US)

(73) Assignee: FUNDACAO D. ANNA SOMMER CHAMPALIMAUD E DR. CARLOS MONTEZ CHAMPALIMAUD, Lisbon (PT)

( * ) Notice: Subject to any disclaimer, the term of this patent is extended or adjusted under 35 U.S.C. 154(b) by 0 days.

(21) Appl. No.: 14/981,352

(22) Filed: Dec. 28, 2015

(65) Prior Publication Data

US 2016/0188954 A1 Jun. 30, 2016

Related U.S. Application Data

(60) Division of application No. 13/754,097, filed on Jan. 30, 2013, now Pat. No. 9,286,505, which is a
(Continued)

(51) Int. Cl.
G06K 9/00 (2006.01)
G06T 7/00 (2017.01)
(Continued)

(52) U.S. Cl.
CPC .......... *G06K 9/00147* (2013.01); *G06T 5/008* (2013.01); *G06T 7/0012* (2013.01);
(Continued)

(58) Field of Classification Search
None
See application file for complete search history.

(56) References Cited

U.S. PATENT DOCUMENTS 6,577,762 B1 6/2003 Seeger et al.
2005/0163373 A1 7/2005 Lee et al.
(Continued)

FOREIGN PATENT DOCUMENTS

JP 2003-167529 A 6/2003

OTHER PUBLICATIONS

Doyle et al., Automated grading of prostate cancer using architectural and textural image features, IEEE ISBI, pp. 1284-1287, 2007.*
(Continued)

*Primary Examiner* — Manuchehr Rahmjoo
(74) *Attorney, Agent, or Firm* — Leason Ellis LLP.

(57) ABSTRACT

Apparatus, methods, and computer-readable media are provided for segmentation, processing (e.g., preprocessing and/or postprocessing), and/or feature extraction from tissue images such as, for example, images of nuclei and/or cytoplasm. Tissue images processed by various embodiments described herein may be generated by Hematoxylin and Eosin (H&E) staining, immunofluorescence (IF) detection, immunohistochemistry (IHC), similar and/or related staining processes, and/or other processes. Predictive features described herein may be provided for use in, for
(Continued)

example, one or more predictive models for treating, diagnosing, and/or predicting the occurrence (e.g., recurrence) of one or more medical conditions such as, for example, cancer or other types of disease.

11 Claims, 55 Drawing Sheets

Related U.S. Application Data continuation of application No. PCT/US2011/046149, filed on Aug. 1, 2011.

(60) Provisional application No. 61/455,988, filed on Oct. 28, 2010, provisional application No. 61/456,009, filed on Oct. 28, 2010, provisional application No. 61/400,642, filed on Jul. 30, 2010, provisional application No. 60/400,657, filed on Jul. 30, 2010.

(51) Int. Cl.
  *G06T 5/00* (2006.01)
  *G06T 7/11* (2017.01)
  *G06T 7/155* (2017.01)
  *G06T 7/45* (2017.01)

(52) U.S. Cl.
  CPC ............... *G06T 7/11* (2017.01); *G06T 7/155* (2017.01); *G06T 7/45* (2017.01); *G06T 2207/10056* (2013.01); *G06T 2207/20041* (2013.01); *G06T 2207/20212* (2013.01); *G06T 2207/30024* (2013.01)

(56) References Cited

U.S. PATENT DOCUMENTS

| | | |
|---|---|---|
| 2006/0257013 A1 | 11/2006 | Ramm et al. |
| 2008/0267497 A1 | 10/2008 | Fan |
| 2010/0046821 A1 | 2/2010 | Manjeshwar et al. |
| 2010/0061618 A1 | 3/2010 | Marcelpoil et al. |
| 2010/0098306 A1 | 4/2010 | Madabhushi et al. |
| 2011/0110595 A1 | 5/2011 | Kim |
| 2011/0243417 A1* | 10/2011 | Madabhushi ........ G06K 9/3233 382/131 |
| 2012/0106821 A1* | 5/2012 | Madabhushi ........ G06T 7/0012 382/133 |
| 2012/0226709 A1* | 9/2012 | Bhargava ............. G06K 9/6228 707/769 |
| 2012/0290607 A1* | 11/2012 | Bhargava ............. G06F 19/345 707/769 |
| 2014/0064581 A1* | 3/2014 | Madabhushi ........ G06K 9/6256 382/128 |
| 2014/0314286 A1* | 10/2014 | Madabhushi ........ G06T 7/0012 382/128 |

OTHER PUBLICATIONS

Doyle et al., Automated Gland and Nuclei Segmentation for Grading of Prostate and Breast Cancer Histopathology, 2007, ISBI 2008, pp. 284-287.*

Altunbay et al., Color Graphs for Automated Cancer Diagnosis and Grading, Mar. 2010, IEEE Transactions on Biomedical Engineering, vol. 57, No. 3, p. 665-674.*

Andrew Rabinovich et al, "0bjects in Context," Computer Vision. 2007. ICCV 2007. IEEE, 11th International Conference 0 N. IEEE, PI, Oct. 1, 2007 (Oct. 1, 2007). pp. 1-8. XP031194475, ISBN: 978-1-4244-1630-1.

Crum et al, "Generalized Overlap Measures for Evaluation and Validation in Medical Image Analysis," IEEE Transactions on Medical Imaging, IEEE Service Center, Piscataway. NJ. US. vol. 25. No. 11, Nov. 1, 2006 (Nov. 1, 2006). pp. 1451-1461. XP011149827, ISSN: 0278-0062. DOI: 10.1109/TMI.2006.880587.

Peter Ajemba; Richard Scott; Michael Donovan; Gerardo Fernandez, "Stability based validation of cellular segmentation algorithms," Proc. SPIE 7962. Medical Imaging 2011: Image Processing, vol. 7962. Feb. 12, 2011 (Feb. 12, 2011), pp. 1-8. XP040557457.

Altunbay D et al, "Color Graphs for Automated Cancer Diagnosis and Grading," IEEE Transactions on Biomedical Engineering, IEEE Service Center, Piscataway. NJ. USA.,vol. 57. No. 3. Mar. 1, 2010 (Mar. 1, 2010), pp. 665-674. XP011343187, ISSN: 0018-9294. DOI: 10.1109/TBME.2009.2033804.

Wahlby et al., "Algorithms for cytoplasm segmentation of fluorescence labeled cells," Analytical Cellular Pathology, Jan. 1, 2002, pp. 101-111, vol. 24, Elsevier Science, Amsterdam, NL.

Teverovskiy et al., "Automated localization and quantification of protein multiplexes via multispectral fluorescence imaging," Biomedical Imaging, May 14, 2008, pp. 300-303, Piscataway, NJ.

Hamarneh et al. "Simulation of Ground-Truth Validation Data Via Physically- and Statistically-Based Warps", 2008, Springer-Verlag Berlin Heidelberg 2008, MICCAI 2008, Part I, LNCS 5241, pp. 459-467.

Gerig et al. "VALMET: A new validation tool for assessing and improving 3D object segmentation", 2001, In: Niessen, W.J., Viergever, M.A. (eds.) MICCAI 2001. LNCS, vol. 2208, pp. 516-523. Springer, Heidelberg.

Wang et al. "Image Quality Assessment: From Error Visibility to Structural Similarity", Apr. 2004, IEEE Transactions on Image Processing, vol. 13, No. 4, pp. 600-612.

Peter Ajemba, et al. "Integrated segmentation of cellular structures", Proceedings of SPIE, Jan. 1, 2011, pp. 796201-796201-10.

International Preliminary Report on Patentability in corresponding PCT Application No. PCT/US2011/046149, mailed Feb. 5, 2013.

International Search Report in corresponding PCT Application No. PCTUS2011/046149, mailed Apr. 4, 2012.

European Search Report of Application No. EP 14 16 0371 dated Dec. 3, 2014.

European partial Search Report of Application No. EP 14 16 0371 dated Aug. 8, 2014.

Non-Final Office Action in corresponding U.S. Appl. No. 13/754,097, mailed Mar. 12, 2015.

Final Office Action in corresponding U.S. Appl. No. 13/754,097, mailed Sep. 10, 2015.

* cited by examiner

AR Histograms

Ki67 Histograms (a)

(b)

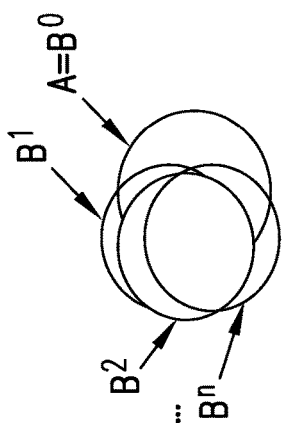

1. DICE
   metric $= \max[\mu^n]^p$

2. Jaccard
   metric $= \max[\partial^n]^p$ $$\frac{B^0 \cup B^1}{B^0} + \frac{B^1 \cup B^2}{B^1} + \frac{B^2 \cup B^3}{B^2} + \frac{B^3 \cup B^0}{B^3} = \mu^1$$

$$\frac{B^0 \cup B^1}{B^0} + \frac{B^1 \cup B^2}{B^1} + \frac{B^2 \cup B^3}{B^2} + \frac{B^3 \cup B^0}{B^3} = \mu^2$$

$$\frac{B^0 \cup B^1}{B^0} + \frac{B^1 \cup B^2}{B^1} + \frac{B^2 \cup B^3}{B^2} + \frac{B^3 \cup B^0}{B^3} = \mu^3$$

$$\frac{B^0 \cup B^1}{B^0 \cap B^1} + \frac{B^1 \cup B^2}{B^1 \cap B^2} + \frac{B^2 \cup B^3}{B^2 \cap B^3} + \frac{B^3 \cup B^0}{B^3 \cap B^0} = \partial^1$$

$$\frac{B^0 \cup B^1}{B^0 \cap B^1} + \frac{B^1 \cup B^2}{B^1 \cap B^2} + \frac{B^2 \cup B^3}{B^2 \cap B^3} + \frac{B^3 \cup B^0}{B^3 \cap B^0} = \partial^2$$

$$\frac{B^0 \cup B^1}{B^0 \cap B^1} + \frac{B^1 \cup B^2}{B^1 \cap B^2} + \frac{B^2 \cup B^3}{B^2 \cap B^3} + \frac{B^3 \cup B^0}{B^3 \cap B^0} = \partial^3$$

$\max[.]^p$ = maximum of all permutations

FIG. 27

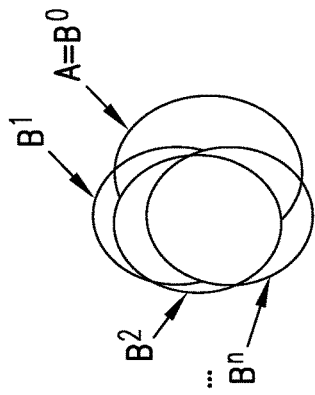

1. DICE metric $= \max[\mu^n]^p + \dfrac{2p}{n}\sum_{i=0}^{n}\xi_i$

2. Jaccard metric $= \max[\partial^n]^p + \dfrac{p}{n}\sum_{i=0}^{n}\xi_i$ $$\dfrac{B^0 \cup B^1}{B^0} + \dfrac{B^1 \cup B^2}{B^1} + \cdots + \dfrac{B^n \cup B^0}{B^n} + \cdots = \mu^n$$

$$\left| \dfrac{B^0 \cup B^1}{B^0 \cap B^1} + \dfrac{B^1 \cup B^2}{B^1 \cap B^2} + \cdots + \dfrac{B^n \cup B^0}{B^n \cap B^0} \right| = \partial^n$$

p=penalty term
e=secondary overlaps weighted by relative areas
1=secondary overlaps weighted by relative areas
max[.]$^p$=maximum of all permutations

FIG.28

SYSTEMS AND METHODS FOR SEGMENTATION AND PROCESSING OF TISSUE IMAGES AND FEATURE EXTRACTION FROM SAME FOR TREATING, DIAGNOSING, OR PREDICTING MEDICAL CONDITIONS

CROSS-REFERENCE TO RELATED APPLICATIONS

This application is a divisional under 35 U.S.C. §121 of co-pending U.S. application Ser. No. 13/754,097 which is a continuing application under 35 U.S.C. §371 of International Patent Application No. PCT/US2011/046149, filed Aug. 1, 2011, which claims the priority of U.S. Provisional Patent Application Nos. 61/455,988 and 61/456,009 both filed Oct. 28, 2011; and 61/400,642 and 61/400,657 both filed Jul. 30, 2011, all of which are incorporated by reference herein.

FIELD OF THE INVENTION

Embodiments of the present invention relate to systems and methods for segmentation and processing of images (e.g., tissue images of nuclei and/or cytoplasm) and feature extraction from the same for, for example, treating, diagnosing, and/or predicting the occurrence (e.g., recurrence) of one or more medical conditions (e.g., cancer or other types of disease).

BACKGROUND OF THE INVENTION

Conventional methods for segmentation of tissue images are prone to misclassification of objects in tissue (e.g., epithelial and stromal nuclei) and may produce irregular nuclei, incorrectly identify cytoplasm boundaries, and result in over and under-segmentation of clustered nuclei. These problems are exacerbated by variations in image acquisition conditions and image artifacts.

Existing systems for characterizing objects (e.g., glands) in tissue images are also predicated upon the need for accurate and repeatable segmentation of lumens in the image. However, segmentation of lumens can be difficult as cancer progresses. Specifically, tissue architecture may typically consist of isolated or touching gland rings surrounded by fibromuscular tissue (stroma). Each gland ring may include rows of epithelial cells surrounding a duct (lumen). The connected glandular cytoplasm (e.g., epithelial unit) may include a gland ring. However, as cancer progresses, epithelial cells replicate in an uncontrolled way, disrupting regular ring structures. For example, in Gleason grade 4, epithelial units fuse together creating chains of gland rings, or dense cribriform sheets of rings, all in the same epithelial unit, while lumens shrink or disappear. In existing segmentation systems, this can lead to touching/fused epithelial cells/units. Existing segmentation systems also have difficulty performing segmentation based on lumens, which have shrunk or disappeared. The same segmentation difficulty arises for Gleason grade 5, where the tumor loses these structures and becomes undifferentiated sheets of epithelial cells and/or epithelial fragments.

More accurate, reliable, and repeatable systems and methods for processing, segmentation, and feature extraction from images (e.g., tissue images) are needed, for example, to allow for the generation of improved predictive models for diagnosing, treating, and/or predicting the occurrence of medical conditions. These and other objects of the present invention are satisfied according to various embodiments of the present invention described herein.

SUMMARY OF EMBODIMENTS OF THE INVENTION

Some embodiments of the present invention are directed to apparatus, methods, and computer-readable media for segmentation and processing of tissue images (e.g., images of nuclei and/or cytoplasm) and feature extraction from the same. Tissue images processed by various embodiments described herein may be generated by Hematoxylin and Eosin (H&E) staining, immunofluorescence (IF) detection, immunohistochemistry (IHC), similar and/or related staining processes, and/or other processes. Predictive features described herein may be provided for use in, for example, one or more predictive models for treating, diagnosing, and/or predicting the occurrence (e.g., recurrence) of one or more medical conditions such as, for example, cancer or other types of disease.

According to one aspect of some embodiments of the present invention, an apparatus, method, and computer-readable medium are provided for reducing non-uniform variations in intensity in a tissue image. Such non-uniform variations may result from, for example, variations in image acquisition conditions. In some embodiments, the image may be an image of nuclei in tissue labeled with nuclear counterstain 4'-6-diamidino-2-phenylindole (DAPI). In another embodiment, the image may be an image of cytoplasm in tissue labeled with biomarker cytokeratin 18 (CK18). One or more computers may estimate an inverse illumination field of the tissue image, and generate a modified image based on the inverse illumination field of the tissue image. In some embodiments of the present invention, the modified image may be subject to additional computer processing including, for example, segmentation, classification of cellular and/or tissue components, and/or feature extraction.

In some embodiments of the present invention, generating a modified image based on the inverse illumination field includes multiplying the tissue image by its inverse illumination field.

In some embodiments of the present invention, estimating the inverse illumination field of the tissue image includes one or more of subtracting background from the tissue image (e.g., using a top hat filter), performing blob detection (e.g., using an Eigenvalues-of-Hessian matrix method (EoH)), identifying local maxima, dividing the tissue image into a plurality of components around the local maxima, setting an intensity inside each component of the plurality of components, for example, to an average intensity, and estimating the inverse illumination field by filtering (e.g., using a Gaussian filter). In some embodiments, contrast enhancement may be applied to the image, for example, subsequent to subtracting background from the tissue image.

In some embodiments of the present invention, dividing the image into a plurality of components around the local maxima may include one or more of producing a distance map based on the local maxima and performing a watershed transformation using the distance map.

In some embodiments of the present invention, estimating the inverse illumination field of the tissue image includes partitioning the tissue image into blocks and, for each block, calculating a statistic (e.g., maximum, minimum, mean, median, standard deviation, and variance). The statistic for all blocks may be used to generate a new image, and the new image may be resampled to create an illumination field image.

According to another aspect of some embodiments of the present invention, an apparatus, method, and computer-readable medium are provided for binarization of an image of tissue (e.g., DAPI image or CK18 image). For example, an adaptive process may be provided that identifies an optimal binarization procedure for each image based on one or more intensity patterns, for example, background texture in the image. An initial binarization of the tissue image may be performed (e.g., using minimum error thresholding) to extract a background region of the image, and an intensity pattern of the background region, for example, texture of the background region may be evaluated. An additional or final binarization of the tissue image may be performed based on the evaluation. For example, in some embodiments, at least one of a filter size and a threshold cut-off point for use in the additional binarization may be selected based on the evaluation. In some embodiments, at least one of the filter size and the threshold cut-off point for the additional binarization are different than a filter size and a threshold cut-off point used in the initial binarization of the tissue image.

In some embodiments of the present invention, evaluating the intensity pattern(s) of the background region of the tissue image, for example, the texture includes evaluating a contrast of the background region. In some embodiments, evaluating the texture includes evaluating an energy of the background region. In some embodiments, evaluating the texture includes evaluating a contrast and an energy of the background region of the tissue image to produce a value indicative of the contrast and a value indicative of the energy. In some embodiments, an aggregate value representative of the texture may be computed as, for example, (1–the value of the contrast) multiplied by the value of the energy.

In some embodiments of the present invention, the foregoing binarization procedure may be performed on a tissue image already subject to processing to reduce non-uniform variations in intensity in the image.

According to another aspect of some embodiments of the present invention, an apparatus, method, and computer-readable medium are provided for processing a segmented image of cytoplasm (e.g., segmented CK18 image). In some embodiments, this processing may be performed on a tissue image already subject to at least one of processing to reduce non-uniform variations in intensity, and binarization. In some embodiments of the present invention, gaps on boundaries of the segmented image of cytoplasm (e.g., scalloped edges overlapping with nuclei objects) may be identified. In some embodiments, holes caused by the gaps may be filled using one or more morphological operations (e.g., dilation).

In some embodiments of the present invention, gaps inside the segmented image of cytoplasm and/or on its boundary may be identified and removed (e.g., using a grayscale morphological closing operation). Alternatively or additionally, cytoplasm holes having a certain size (e.g., less than or equal to an average nucleus size for the image) may be identified and removed. Alternatively or additionally, holes that are greater than that certain size and at least partially filled by a single nucleus (e.g., holes smaller than four times the average nucleus size and at least 50% filled by a single nucleus) may be identified and filled.

According to another aspect of some embodiments of the present invention, an apparatus, method, and computer-readable medium are provided for classifying nuclei into one or more (e.g., three or more) classes (e.g., epithelial nuclei, stromal nuclei, and unclassified/undefined) depending on, for example, distance from and/or overlap of the nuclei to a cytoplasm border.

According to yet another aspect of some embodiments of the present invention, an apparatus, method, and computer-readable medium are provided for removing artifacts from a segmented image of nuclei. In some embodiments, this processing may be performed on a tissue image already subject to at least one of processing to reduce non-uniform variations in intensity, and binarization. A segmented (e.g., binarized) image of nuclei may be received. Lumen artifacts may be detected and removed from the segmented image in order to produce an output nuclei image. In some embodiments of the present invention, detecting and removing artifacts includes determining whether an object within the segmented image of nuclei is an artifact based on at least one of a morphological characteristic and a texture characteristic of at least one of the object and a component connected to the object. In some embodiments of the present invention, the morphological characteristic(s) are selected from the group consisting of a size of the connected component, nucleus size, average nucleus size, percentage relative to tumor area, percentage of object area inside lumen, eccentricity, nuclei elongation, and/or other morphological characteristics. In some embodiments, the texture characteristic(s) are selected from the group consisting of average nuclei intensity (e.g., DAPI intensity), standard deviation of nuclei intensity, and/or other texture characteristics.

According to another aspect of some embodiments of the present invention, an apparatus, method, and computer-readable medium are provided for separating epithelial units within a segmented tissue image (e.g., cytoplasm binary mask). Each epithelial unit may include, consist of, or consist essentially of cytoplasm contained within one or more related epithelial cells that are confined by stroma. In some embodiments, this processing may be performed on a tissue image already subject to at least one of processing to reduce non-uniform variations in intensity, binarization, and postprocessing (e.g., to remove artifacts). In some embodiments of the present invention, a propagation process is performed starting from marker regions within each epithelial unit, and proceeding towards touching boundaries of the epithelial units. The marker regions may be created from, for example, a segmented image of epithelial nuclei and/or a segmented image of lumens. In some embodiments of the present invention, an image resulting from epithelial unit separation may be used, for example, within subsequent gland ring segmentation (e.g., to identify whether gland rings are part of the same epithelial unit, or different epithelial units).

In some embodiments, epithelial unit separation may be achieved by, for example: receiving a segmented nuclei image (e.g., DAPI binary mask) and variably dilating it using morphological dilation. A complement image of the dilated nuclei image may be generated and marker centers may be extracted from the complement image. Using one or more (e.g., all) of the marker centers, a cytoplasm (e.g., CK18) image, and a segmented cytoplasm image (e.g., cytoplasm binary mask), a new image of intensity valleys and peaks may be generated. A transform (e.g., watershed transform) may be applied to the new image to obtain lines (e.g., watershed lines) of separations within a resulting image, and the resulting image may be segmented (e.g., binarized). For example, a segmented cytoplasm binary mask and watershed binarized image may be merged, and missing epithelial units from the segmented cytoplasm binary mask may be identified and retained. An image resulting from the identifying and retaining procedure may be labeled, and separation boundaries may be extracted from the labeled image. In some embodiments, one or more of these processing stages, and/or other processing stages described in the present application, are optional and can be omitted and/or replaced by other stages. For example, the foregoing process may be a center initialized process. In other embodiments, a boundary initialized process (e.g., same or similar to the process shown and described in connection with FIG. 12C) may be used. These two processes have complementary effects, and between the two of them may pick up most if not all of the epithelial unit separations. In some embodiments of the present invention, these two processes could eliminate the need to use a watershed transform for epithelial unit separation.

According to another aspect of some embodiments of the present invention, an apparatus, method, and computer-readable medium are provided for segmenting gland units from a nuclei image. As at least part of such segmentation, a segmented epithelial nuclei binary mask may be received. The nuclei binary mask may be variably dilated using morphological dilation. A complement of the dilated nuclei binary mask may be generated. Marker centers may then be extracted from the complement of the dilated mask.

According to yet another aspect of some embodiments of the present invention, an apparatus, method, and computer-readable medium are provided for refining an epithelial unit segmentation within a segmented tissue image. In some embodiments, this processing may be performed on a tissue image already subject to at least one of (i) processing to reduce non-uniform variations in intensity, (ii) binarization, (iii) post-processing (e.g., to remove artifacts), and (iv) initial gland ring segmentation. Intensity may be computed on individual separations of a cytoplasm (e.g., CK18) intensity image. Standard deviation may also be computed corresponding to the intensity computations, and on a standard deviation of intensity on individual separations of a gradient of the cytoplasm image. Separations may be identified that touch any nuclei marker centers. Separation boundaries may be eliminated based on a threshold criterion, and refined separation boundaries may be extracted.

According to still another aspect of some embodiments of the present invention, an apparatus, method, and computer-readable medium are provided for enhancing ridges formed by cytoplasm membranes around an outer boundary of touching or almost touching cytoplasm within a tissue image. In some embodiments, this processing may be performed on a tissue image already subject to at least one of processing to reduce non-uniform variations in intensity, binarization, post-processing (e.g., to remove artifacts), and gland ring segmentation. In some embodiments, a propagation process may be performed, starting from higher contrast edges of a cytoplasm mask and proceeding along lower contrast ridges and edges between epithelial units.

In some embodiments of the present invention, enhancement of ridges formed by cytoplasm membranes may be achieved by, for example: generating a speed image that includes cytoplasm edge and ridge strength. Fast marching edge strength propagation may be performed using the speed image (e.g., initialized from the cytoplasm borders) to create a distance map. A segmentation (e.g., watershed segmentation) of an inversion of the distance map may be performed.

According to still another aspect of some embodiments of the present invention, an apparatus, method, and computer-readable medium are provided for segmenting and/or classifying gland rings within a tissue image. In some embodiments, geometric clustering of nuclei (e.g., based on triangulation or tessellation of epithelial nuclei coordinates) is performed to partition epithelial regions. In some embodiments, triangulation is performed on the tissue image with epithelial nuclei centers as vertices, and selected regions of the triangles are merged. In some embodiments, epithelial regions are classified as gland rings or glandular non-rings.

In some embodiments of the present invention, segmenting gland rings may be achieved by, for example: triangulation (e.g., Delaunay triangulation) on a tissue image with epithelial nuclei centers as vertices. Selected regions of the triangles may be merged. Polygonal areas may then be classified as gland rings or glandular non-rings (e.g., and stromal and undefined areas). In some embodiments of the present invention, the classification of the polygonal areas as gland rings or glandular non-rings may be based on one or more of a size, stromal area, lumen area, ring density, and cytoplasm connectivity around the ring. In some embodiments, the process may additionally include assigning a depth to each triangle (e.g., equal or substantially equal to a length of a longest side of that triangle), sorting the triangles by depth, and/or performing the merging starting with the deepest triangles. In some embodiments, regions may be merged if a length of a common side between triangles is at least, for example, 90% of a depth of a neighbor and/or if both regions touch the same one or more epithelial units. In other embodiments of the present invention, a process that includes a watershed transform (e.g., same or similar to the process used for epithelial unit separation but, for example, having smaller markers) may be used to separate gland rings.

According to another aspect of some embodiments of the present invention, an apparatus, method, and computer-readable medium are provided for localizing and quantifying biomarker signal within a tissue image (e.g., an image of a fine needle aspirate, biopsy sample, whole tissue section, and/or tissue micro array (TMA)). One or more bright objects having a size below a threshold may be removed from an image of tissue as being indicative of speckle noise. A threshold, specific to the image, may be determined and applied to distinguish between background and real signal intensity for a plurality of objects (e.g., nuclei objects, cytoplasm objects, and/or glandular objects) remaining in the image, thereby producing a thresholded image. In some embodiments, a histogram corresponding to the thresholded image may be generated. In some embodiments, one or more predictive features may be extracted from the thresholded image. In some embodiments, in addition to varying from one image to another, the threshold may vary from one part of an image to another part of the same image.

According to another aspect of some embodiments of the present invention, an apparatus, method, and computer-readable medium are provided for predicting occurrence of a medical condition (e.g., prostate cancer). A dataset for a patient may be evaluated with a computer-implemented model predictive of the medical condition, where the model is based on one or more ring features measured from one or more tissue images, thereby evaluating the medical condition in the patient. In some embodiments of the present invention, the one or more ring features may be selected from the group of gland ring features consisting of statistical combinations over the image of individual ring metrics such as outer diameter of ring, inner diameter of ring, border gap, lumen or clearing diameter, border density, lumen ratio, proportion of border touching inner clearing, proportion of border touching stroma, ratio of border less than a predefined number of pixels from stroma, mean distance of border pixels from stroma, and width of epithelial padding between ring and stroma, and/or the individual ring metrics themselves. In some embodiments, the ring metrics may be combined and/or averaged over the whole image to create image features. In some embodiments, these image features may be parameterized in, for example, any one or more of four ways: by statistic (two alternatives), by region type (8 alternatives), by weight (8+alternatives) and/or by variable (20+alternatives), creating in total more than 2×8×8×20 possible features according to various embodiments of the present invention, as shown for example in Tables 2-8 herein. Table 2 shows basic ring measurements from which statistical combination image features may be constructed according to some embodiments of the present invention. In these tables, a consistent feature naming convention is formed as "Statisitic Weight RegionType Variable." In some embodiments of the present invention, the computer-implemented predictive model may produce a value indicative of the medical condition in the patient. In some embodiments, the model may be based on at least one additional feature selected from the group of features consisting of one or more clinical features, one or more molecular features, and/or one or more computer-generated morphometric feature(s) generated from one or more tissue image(s).

According to yet another aspect of some embodiments of the present invention, an apparatus, method, and computer-readable medium are provided for evaluating a dataset for a patient with a model predictive of the medical condition, where the model is based on one or more features selected from the group of features consisting of (i) a feature generated based upon a comparison of histograms corresponding to compartments or sub-compartments of cellular objects and (ii) a feature generated from an intensity index corresponding to image signal intensity.

According to another aspect of some embodiments of the present invention, an apparatus, method, and computer-readable medium are provided for evaluating a dataset for a patient with a model predictive of the medical condition, where the model is based on one or more texture features selected from the group of features consisting of (i) homogeneity and (ii) correlation, thereby evaluating the medical condition in the patient.

In some embodiments of the present invention, an apparatus, method, and computer-readable medium are provided for extracting one or more texture features from an image of tissue. Objects (e.g., nuclei) may be extracted by forcing background toward zero. Sub-objects (e.g., epithelial nuclei) may be separated. One or more texture features may be computed for each epithelial nucleus (e.g., homogeneity and/or correlation). A histogram may be generated based on the one or more texture features, and a polynomial may be fit to the histogram. In some embodiments, the histogram corresponding to the first type of sub-objects (e.g., epithelial nuclei) may be divided by a second histogram corresponding to a second type of sub-objects (e.g., stromal nuclei) to obtain a new histogram, a new polynomial may be fit to the new histogram. In some embodiments, features may be extracted from one or more of the polynomials. In some embodiments of the present invention, alternatively or additionally the first and second histograms (e.g., epithelial and stromal histograms) can be subtracted from each other or added together before extracting one or more predictive features based on a result thereof. In some embodiments of the present invention, a histogram normalization process may be used, for example, as an alternative or in addition to polynomial fitting.

According to yet another aspect of some embodiments of the present invention, an apparatus, method, and computer-readable medium are provided for assessing the statistical stability of a segmentation image or process. A medical or non-medical image (e.g., a tissue image, cytology image, radiograph, computed tomography image, ultrasound image, brightfield and/or darkfield image of semiconductor material, geospatial image, or astronomical image) may be received and perturbed to generate one or more variant images. Segmentation may be performed on the image and the one or more variant images to produce segmented versions of the image and the one or more variant images. One or more metrics of similarity may be computed for the segmented versions of the image and the one or more variant images in order to perform one or more of the following functions: (i) assess the stability of the segmentation; (ii) assess the segmentation quality of an image; (iii) rank an image by its segmentation quality; (iv) compare an image to other images; (v) determine if an image should be included or excluded from other processes (e.g., feature extraction and analysis); and/or (vi) determine if an image segmentation output meets one or more performance quality criteria. For example, in some embodiments, extensions of one or both of the Dice or Jaccard similarity metrics may be computed and used to assess segmentation stability.

According to another aspect of some embodiments of the present invention, an apparatus, method, and computer-readable medium are provided for assessing the partition stability of a segmentation image or process. Segmentation may be performed on an image. One or more additional partitions around the segmentation boundaries of the image may be created (e.g., by eroding or dilating the segmentation boundaries). One or more intensity pattern metrics, or combination(s) of intensity pattern metrics, may be calculated from one or more partitions in order to perform one or more of the following functions: (i) assess the stability of the segmentation process; (ii) assess the segmentation quality of an image; (iii) rank an image by its segmentation quality; (iv) compare an image to other images; (v) determine if an image should be included or excluded from other processes; and/or (vi) determine if an image segmentation output meets one or more performance quality criteria. For example, in some embodiments, the energy of the dilated background may be compared to the energy of the original background to assess segmentation stability.

BRIEF DESCRIPTION OF THE DRAWINGS

For a better understanding of embodiments of the present invention, reference is made to the following description, taken in conjunction with the accompanying drawings, in which like reference characters refer to like parts throughout, and in which:

FIG. 26A, subpart (b), illustrates an application of stability analysis to bug detection according to some embodiments of the present invention, where an effect of a statistical estimation bug in a segmentation process yielded the image on the left having a poor stability score and the image on the right having a correspondingly higher validation score was created with the same segmentation process after the estimation bug was fixed;

FIG. 27 illustrates validation match metrics for multiple images, one object each.

FIG. 28 illustrates validation match metrics for multiple images, multiple objects.

DETAILED DESCRIPTION OF THE PREFERRED EMBODIMENTS

Figure 1:
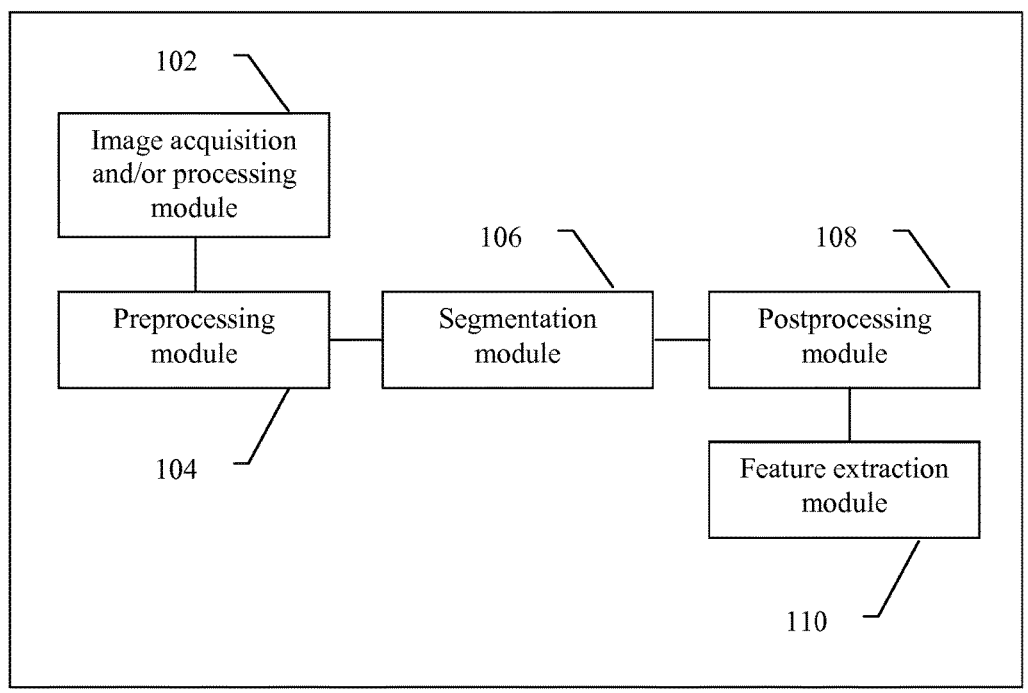
FIG. 1 is a block diagram of an image analysis system according to some embodiments of the present invention.

FIG. 1 is a block diagram of an image analysis system 100 according to some embodiments of the present invention. System 100 includes image acquisition module 102, preprocessing module 104, segmentation module 106, postprocessing module 108, and feature extraction module 110. For example, in some embodiments of the present invention, image acquisition module 102 may include a multispectral camera (e.g., Nuance multispectral camera) at, for example, 20× by 10× resolution. Modules 102-110 are shown in FIG. 1 as being serially coupled. In other embodiments, any other suitable system arrangements may be used including, for example, coupling any one or more of modules 102-110 to another any one more of modules 102-110 or causing all of modules 102-110 to be coupled (e.g., directly or indirectly to allow for communication) to each other.

Each of modules 102-108 may include any suitable hardware (e.g., one or more computers or processors), software, firmware, or combination thereof for performing the respective functions described herein in connection with, for example, one or more of FIGS. 2A-26D. For example, in some embodiments of the present invention, preprocessing module 104 may be an apparatus configured to perform any one or more (e.g., all) of the functions described in connection with FIGS. 2A-4 including, for example, correcting non-uniform variations in intensity in tissue images.

In some embodiments of the present invention, segmentation module 106 may be an apparatus configured to perform any one or more (e.g., all) of the functions described in connection with FIGS. 5-6E including, for example, binarization of tissue images.

In some embodiments of the present invention, postprocessing module 108 may be an apparatus configured to perform any one or more (e.g., all) of the functions described in connection with FIGS. 7-11D including, for example, separating touching or connected components, filling holes, and/or removing artifacts within the tissue images (e.g., tissue images images into epithelial units and/or FIG. 14 relating to, for example, additional segmentation of tissue images into gland rings.

In some embodiments of the present invention, feature extraction module 110 may be configured to perform any one or more (e.g., all) of the functions described in connection with FIGS. 15-22B including, for example, extracting gland ring features, texture features (e.g., homogeneity and/or correlation), and/or other features. In some embodiments of the present invention, module 102 and/or another suitable apparatus (e.g., including hardware, software, firmware, or combination thereof) may be configured to perform any one or more (e.g., all) of the functions described in connection with FIG. 23 A-D including, for example, assessing the performance of one or more segmentation algorithms without using ground truth images.

Modules 102-110 are shown in FIG. 1 as being separate modules (e.g., utilizing different hardware, software, firmware, or a combination thereof). In other embodiments of the present invention, any other suitable system arrangements may be used including, for example, implementing any two or more of modules 102-110 using at least partially the same hardware, software, firmware, and/or combination thereof.

Pre-Processing of Tissue Images

Figure 2A:
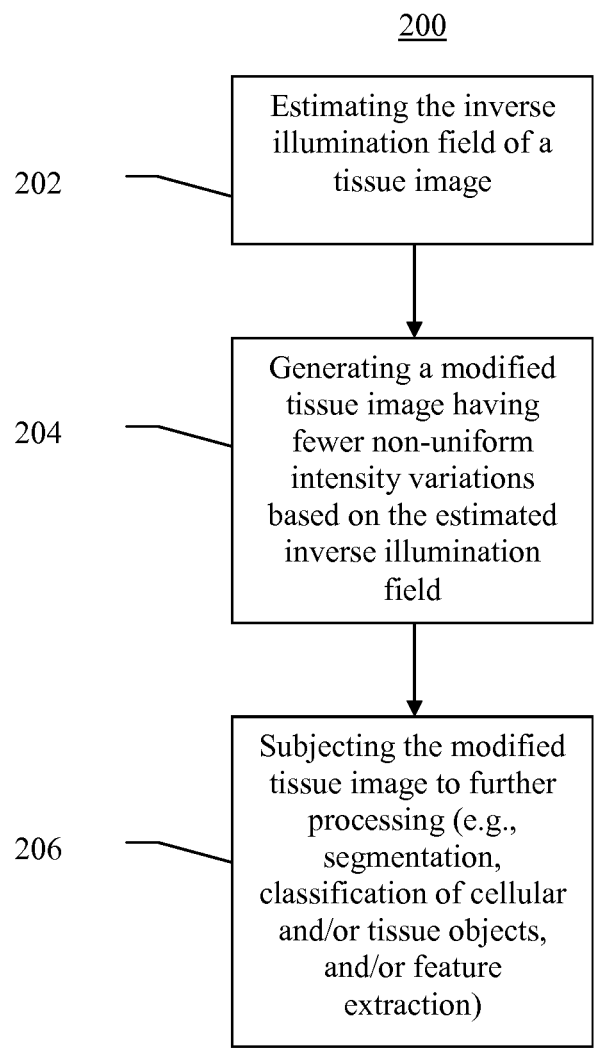
FIG. 2A is a flowchart of illustrative stages involved in pre-processing an image of tissue to correct for non-uniform variations in intensity due to, for example, the history of the underlying tissue and/or image acquisition conditions according to some embodiments of the present invention.

FIG. 2A is a flowchart 200 of illustrative stages involved in pre-processing an image of tissue according to some embodiments of the present invention. Process 200 may be utilized to correct for non-uniform variations in intensity due to, for example, the history of the underlying tissue (e.g., variations regarding how such tissue was initially collected, processed, or subsequently handled) and/or image acquisition conditions. In some embodiments, process 200 may be performed by pre-processing module 104 (FIG. 1) or other suitable computing equipment.

Signal intensity in a tissue image is often used as a criterion to determine whether a given portion of the image is "positive" signal or background signal. For example, when the intensity of a given portion (e.g., one or more pixels) of the image exceeds a threshold value, the signal may be deemed a positive signal. Portions of the image having an intensity below the threshold may be deemed background signal. Positive signal may be included in subsequent processing of the tissue image including, for example, segmentation and classification of the positive signal into cellular and/or tissue objects and/or feature extraction. Background signal, on the other hand, may be ignored in subsequent processing. Non-uniform variations in intensity can result in a failure, for example, to properly distinguish positive signal from background signal and can lead to segmentation errors, misclassification of cellular and/or tissue objects, and incorrect feature extraction.

In multispectral microscopy, for example, multiple proteins (antigens) in a tissue specimen are simultaneously labeled with different fluorescent dyes conjugated to antibodies specific to each particular protein. Each dye has a distinct emission spectrum and binds to its target protein within a tissue compartment. The labeled tissue is imaged under an excitation light source using a microscope fitted with one or more relevant filters and a multispectral camera. The resulting multispectral image (e.g., image cube) is then subjected to spectral unmixing to separate the overlapping spectra of the fluorescent labels. The unmixed images have multiple components, where each component (e.g., image layer) represents the expression level of a protein-antigen in the tissue. For each image, the presence or absence of a positive signal within any given region of the image may be determined based on the intensity of the signal in that region.

In some embodiments of the present invention, process 200 may include, consist of, or consist essentially of estimating the inverse illumination field of a tissue image at stage 202, and generating a corrected image at stage 204 based on (e.g., based at least in part on) the estimated inverse illumination field (e.g., multiplying the tissue image by the inverse illumination field to obtain a corrected image). The intensity non-uniformity in the tissue image input to stage 202 may be corrected or substantially improved by process 200. The output of stage 204 may be a corrected or substantially improved image having fewer (e.g., none) non-uniform intensity variations than the tissue image input to stage 202. According to various embodiments of the present invention, images resulting from process 200 may be subsequently processed at stage 206 (e.g., subject to segmentation, classification of cellular and/or tissue objections, and/or feature extraction). Advantageously, the operation of stages 202-204 may allow for improved results (e.g., fewer errors) in such subsequent processing.

In some embodiments of the present invention, process 200 may be used to correct for intensity non-uniformity in a tissue image that includes primarily nuclei. The tissue image input to process 200 may be generated, for example, by imaging tissue that is labeled with the nuclear counterstain 4'-6-diamidino-2-phenylindole (DAP I). Such imaging may be performed by image acquisition module 102. DAPI is a fluorescent dye that has a distinct emission spectrum. In some embodiments, DAPI may be used alone or in combination with one or more additional fluorescent dyes such as, for example, the biomarker cytokeratin 18 (CK18) that binds to cytoplasm.

In other embodiments of the present invention, process 200 may be utilized to correct for non-uniform intensity variations in other types of images including, for example, images that include primarily cytoplasm (e.g., generated by imaging tissue labeled with CK18), images generated by imaging tissue labeled with other biomarker(s), and/or images that include other tissue or cellular components or a combination of tissue and/or cellular components.

Figure 2B:
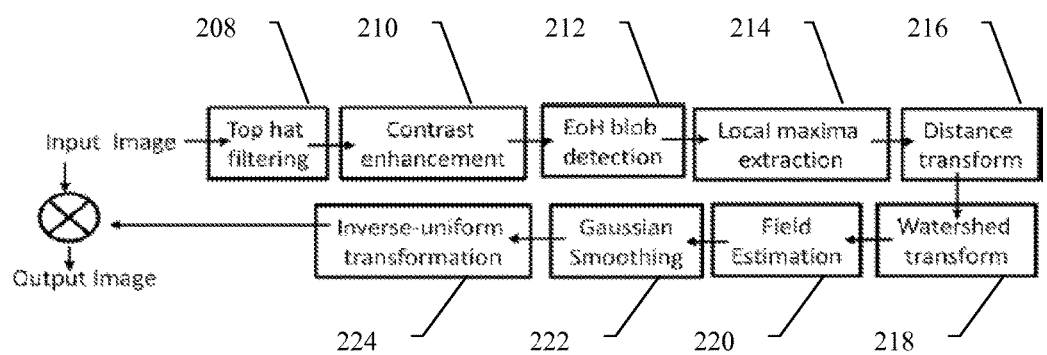
FIG. 2B is a flowchart of illustrative substages involved in estimating an inverse illumination field within the process of FIG. 2 A according to some embodiments of the present invention.

FIG. 2B is a flowchart of illustrative substages involved in process 200 (FIG. 2A) according to some embodiments of the present invention. For example, in some embodiments, estimating the inverse illumination field of the tissue image at stage 202 (FIG. 2A) may include top-hat filtering, Eigenvalues-of-Hessian blob detection, and/or a distance transform. Suitable examples of top-hat filtering, Eigenvalues-of-Hessian blob detection, and distance transformation according to some embodiments of the present invention are described in Gonzalez R. C and Woods R. E., Digital Image Processing, Second Edition, Prentice-Hall Inc, 2002, which is hereby incorporated by reference herein in its entirety.

At stage 208, tissue background in a tissue image is subtracted from the image using, for example, a top hat filter. In some embodiments, tissue background may correspond to a gray-level in the tissue image, which is in contrast to brighter regions of the tissue image that represent tissue foreground (e.g., nuclei and/or cytoplasm). The top hat filter may remove smooth regions that are larger than most, if not all, tissue and/or cellular components of interest in the image (e.g., nuclei clusters, or cytoplasm clusters when, for example, stage 208 is applied to CK18 images). In some embodiments of the present invention, a filter size (e.g., 30 pixels) may be set for the top-hat filter for use for non-uniform illumination correction. In some embodiments, nuclei and/or cytoplasm clusters have a size range from three to five small nuclei clumps (e.g., occupying roughly 100-200 pixels) to 10-30 nuclei large clumps (e.g., occupying roughly 500-2000 pixels).

At stage 210, contrast enhancement is applied to the filtered image resulting from stage 208. In some embodiments of the present invention, contrast enhancement stretches the image (e.g., some or all pixels in the image), for example, to fill the full range of intensity values. For example, for 8-bit images, the new_intensity=(old_intensity−minq) 255/(maxp−minq), where maxp=intensity of percentile p, minq=intensity of percentile q, taking, for example, p=99% and q=1%. In another example, for 16-bit images, 255 is replaced by 65535. In another embodiment, which may provide a more balanced sampling of bright and dark pixels in the image and avoid enhancing background noise in images with small bright areas on a large dark background, max and min percentile values may be calculated in bands around the edges in the image. In some embodiments, stage 210 may be optional and may be omitted from process 200. In other embodiments, stage 210 may be utilized, for example, as necessitated by the top-hat filtering of stage 208 and/or low contrast present in the original tissue image that serves as input to process 200.

At stage 212, blob detection (e.g., nuclei detection) is performed on the image resulting from stage 210, or from stage 208 if stage 210 is not utilized. In some embodiments, such detection may be performed using an Eigenvalues-of-Hessian matrix method (EoH). Advantageously, the present inventors have determined that such a detection method can detect both bright and dim components of the types (e.g., both bright and dim nuclei) that may be present in the tissue images evaluated by process 200 according to some embodiments of the present invention. Illustrative substages involved in stage 212 are described below in connection with FIG. 2C.

At stage 214, local maxima are extracted from (identified in) the image resulting from stage 212. For example, stage 212 generates a blob image, which may be subsequently thresholded (e.g., as shown in FIG. 3D) in order to identify the local maxima. In some embodiments, the local maxima are the pixels that have the highest intensity value in their respective local regions. For example, for the image, they may represent a rough estimate of the average maximum intensity in each region. As described below, in some embodiments, the intensity inverse illumination field is obtained by processing the local maxima points.

At stage 216, an inverse Euclidean distance transform is computed starting from the local maxima points to produce a distance map.

At stage 218, a watershed transformation is performed using the distance map from stage 216 as input. The watershed transformation divides the image into small components or cells around the local maxima (e.g., local maxima of the nuclei). A suitable example of a watershed transformation process according to some embodiments of the present invention is described in above-incorporated Gonzalez R. C and Woods R. E., Digital Image Processing, Second Edition, Prentice-Hall Inc, 2002.

In some embodiments, the intensity inside each component or cell is set to its average intensity at stage 220 ("field estimation").

At stage 222, a first estimate of the intensity field is obtained by, for example, smoothing the image resulting from stage 220 using a Gaussian filter.

At stage 224, correction for non-uniform intensity is accomplished by multiplying the original image by the inverse of the intensity field obtained as a result of stage 220. In some embodiments, process 200 includes an additional stage (e.g., after stage 224) of enhancing the separation between clustered components (e.g., nuclei), for example, along the thin dark ridges that separate them using a morphological top-hat transform on the intensity corrected nuclei image. In some embodiments, this top-hat transform may be the same as, or similar to, the top-hat filter described above in connection with stage 208 (e.g., having a filter size of 30 pixels).

Figure 2C:
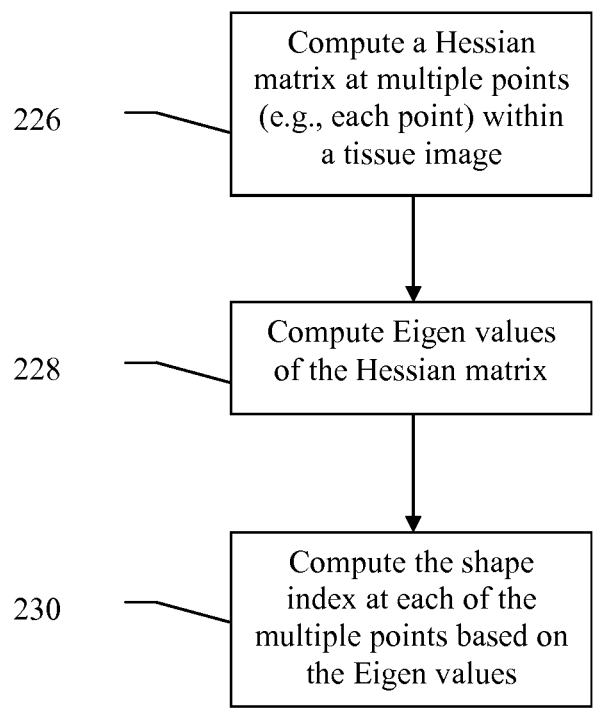
FIG. 2C is a flowchart of illustrative substages involved in blob detection within the process of FIG. 2A using an Eigenvalues-of-Hessian matrix method (EoH) according to some embodiments of the present invention.

FIG. 2C is a flowchart of illustrative sub-stages involved in the blob detection of stage 212 (FIG. 2B) according to some embodiments of the present invention. In some embodiments, an EoH matrix is used to compute a shape index at each point. At stage 226, a Hessian matrix is computed at multiple points (e.g., each point)$^{(x,y)}$ in the image I as:

$$H(x, y) = \begin{bmatrix} \frac{\partial^2 I(x, y)}{\partial x^2} & \frac{\partial^2 I(x, y)}{\partial xy} \\ \frac{\partial^2 I(x, y)}{\partial xy} & \frac{\partial^2 I(x, y)}{\partial y^2} \end{bmatrix}$$

At stage 228, given the Hessian matrix, Eigen values of the matrix are computed, for example, as approximately:

$$\lambda_{1,2} = \frac{1}{2}\left\{\frac{\partial^2 I(x, y)}{\partial x^2} + \frac{\partial^2 I(x, y)}{\partial y^2} \mp \sqrt{\left(\frac{\partial^2 I(x, y)}{\partial x^2} - \frac{\partial^2 I(x, y)}{\partial y^2}\right)^2 + 4\left(\frac{\partial^2 I(x, y)}{\partial xy}\right)^2}\right\}$$

At stage 230, the Eigen values (e.g., approximate values) are used to compute the shape index at each point (x, y), for example, as:

$$\theta(x, y) = -\tan^{-1}\left(\frac{\lambda_1(x, y)}{\lambda_2(x, y)}\right)$$

In some embodiments of the present invention, the blobs (e.g., nuclei) are defined as the points for which $\pi/4 \leq \theta(\chi, y) \leq 3\pi/4$ although other values could be employed in other embodiments of the present invention.

Figure 2D:
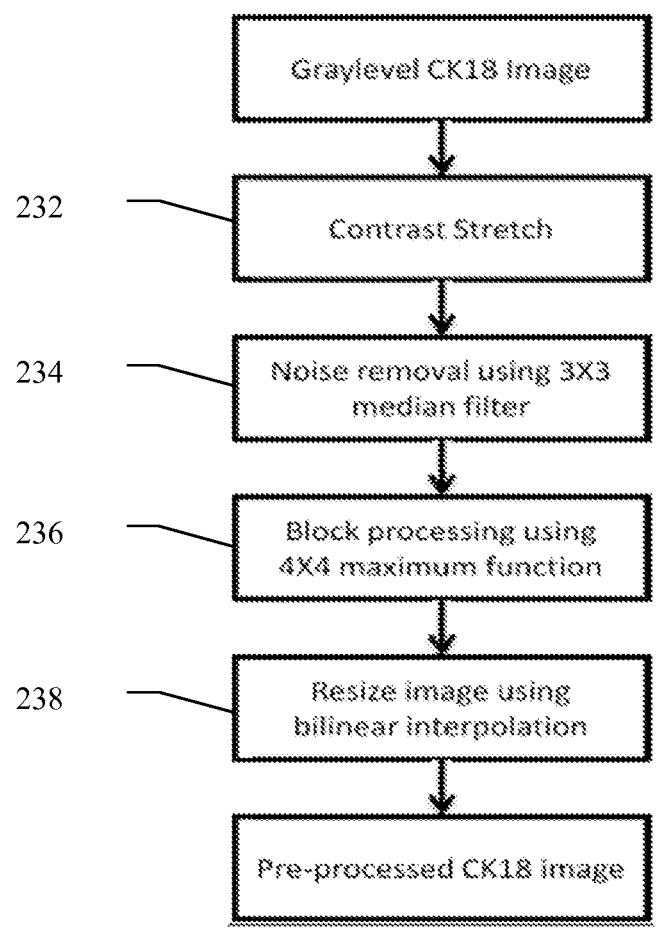
FIG. 2D is a flowchart of illustrative stages involved in correcting for non-uniform intensity variations in, for example, a cytoplasm (e.g., gray-level CK18) image according to some embodiments of the present invention.

FIG. 2D describes illustrative stages involved in correcting for non-uniform intensity variations in, for example, a cytoplasm (e.g., gray-level CK18) image according to some embodiments of the present invention. The process of FIG. 2D may be a form of block-based non-uniformity correction. In some embodiments, the process of FIG. 2D may be an alternative to the process shown in FIGS. 2A-2C. In some embodiments, the process of FIG. 2D may utilize background averaging and/or background sampling. At stage 232, the image may be contrasted by, for example, stretching a bottom portion (e.g., bottom 10%) and a top portion (e.g., top 10%) of all pixel values. In some embodiments, this process may be the same or similar to the contrast enhancement process described above in connection with stage 210. At stage 234, noise (e.g., salt and pepper noise) may be removed in the background using, for example, a 3×3 median filter. At stage 236, block processing may be used to enhance dark pixels in the image. For example, a 4×4 block may be used with a maximum function that replaces the maximum pixel value in each 4×4 neighborhood. At stage 238, the image may be resized back to its original size or similar or other size using, for example, bilinear interpolation. The result of the FIG. 2D process may be an image that has been adjusted for non-uniform variations.

Figure 3:
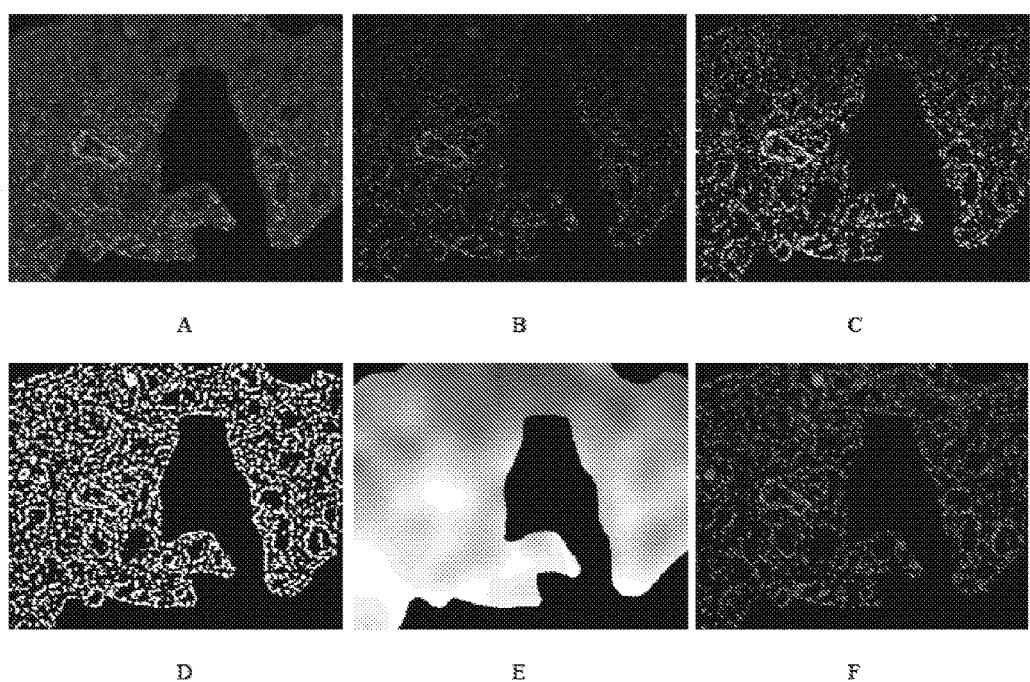
FIGS. 3 and 4 show illustrative examples of images resulting from tissue image processing according to FIGS. 2A-2C according to some embodiments of the present invention.

FIG. 3 shows illustrative examples of images resulting from tissue image processing according to FIGS. 2A-2C according to some embodiments of the present invention. Image A is the original, uncorrected DAPI image of nuclei present in tissue that served as an input to process 200. Image B is the modified image that resulted from top-hat filtering at stage 208. Image C is the modified image resulting from contrast enhancement at stage 210. Image D is the modified image resulting from EoH blob detection and image thresholding at stages 212 and 214. Image E is the estimated inverse illumination field resulting from stage 224. Lastly, image F is the intensity corrected image resulting from multiplying the original image A by image E representing the estimated inverse illumination field.

Figure 4:
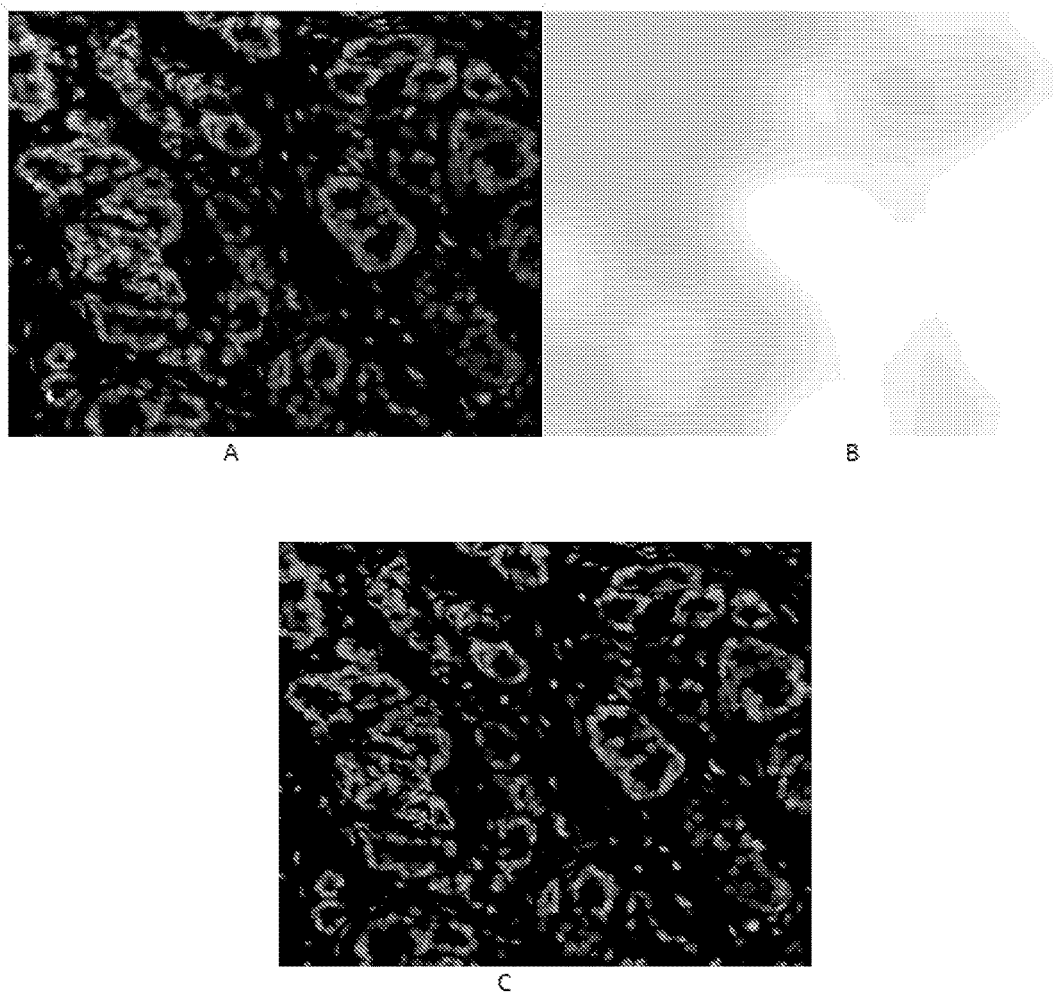

FIG. 4 shows additional illustrative examples of images resulting from tissue image processing according to FIGS. 2A-2C according to some embodiments of the present invention. Image A is the original, uncorrected DAPI image of nuclei present in tissue that served as an input to process 200. Image B is the estimated inverse illumination field resulting from stage 224. Lastly, image C is the intensity corrected image resulting from multiplying the original image A by image B representing the estimated inverse illumination field.

Binarization and Segmentation of Tissue Images

Figure 5:
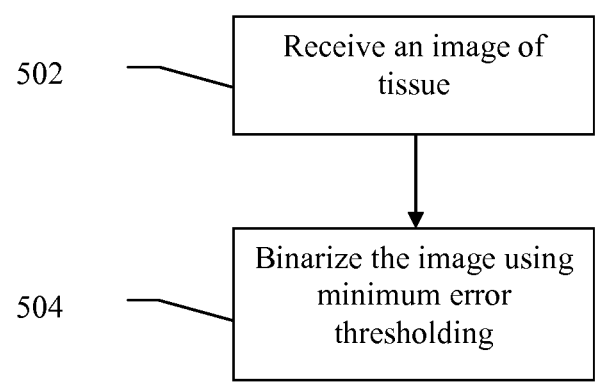
FIGS. 5 and 6A are flowcharts of illustrative stages involved in binarization of an image of tissue according to some embodiments of the present invention.

FIG. 5 is a flowchart 500 of illustrative stages involved in binarization of an image of tissue according to some embodiments of the present invention. Process 300 may be utilized, for example, to extract from an image of nuclei (e.g., DAPI image resulting from spectral detection) the portions of the image corresponding to tissue foreground or positive signal (i.e., nuclei). In some embodiments, process 500 may be performed by segmentation module 106 (FIG. 1) or other suitable computing equipment. In some embodiments, process 500 may be performed on a tissue image that has already been preprocessed according to process 200 (FIGS. 2A-2C) to remove non-uniform intensity variations.

At stage 502, an image of tissue is received. At stage 504, the image is binarized using minimum error thresholding. For example, in some embodiments, such minimum error thresholding may include a clustering-based approach that assumes that the histogram of signal intensity in the image is bimodal in order to estimate the Poisson mixture parameters (e.g., assuming that a DAPI image resulting from process 200 (FIGS. 2A-2C) has a representative histogram that includes of a mixture of two Poisson distributions). In some embodiments, stage 504 may include using the minimum error thresholding method described in Al-Kofahi et al., "Improved automatic detection and segmentation of cell nuclei in histopathology images," IEEE Transactions on Biomedical Engineering, 57(4), 2010, which is hereby incorporated by reference herein in its entirety, or another suitable process. In some embodiments, process 500 may result in the identification of congruent regions (e.g., of nuclei) as well as fragments (e.g., of nuclei) that do not belong to any region. In some embodiments (e.g., embodiments wherein the image is an image of nuclei), fragments smaller than, for example, 30 pixels in area may be removed. In some embodiments, the resulting image may then be labeled using a relabeled components method.

In some embodiments of the present invention, the clustering-based approach of stage 504 may model the normalized image histogram of the tissue image as:

$$h(i) = \sum_{k=1}^{2} P_k \cdot p(i|k), i = 1, 2, \ldots, I_{max}$$

where $P_k$ is the prior probability of the $k^{th}$ component, p(i|k) is a Poisson distribution with mean $\mu_k$, and $I_{max}$ is the maximum intensity bin in the histogram. For any threshold t the Poisson mixture parameters are given by:

$$P_k^1 = \sum_{i=a}^{b} h(i)$$

$$\mu_k^1 = \frac{1}{P_k^1} \sum_{i=a}^{b} i \cdot h(i)$$

Where $$(a, b) = \begin{cases} (0, t), & k = 1 \\ (t+1, I_{max}), & k = 2 \end{cases}$$

In some embodiments, the goal is to find a threshold t* that minimizes the following error criterion function, where μ is the overall mean intensity of the entire image:

$$t^* = \operatorname*{argmin}_t \left\{ \mu - \sum_{k=1}^{2} P_k^t + \mu_k^t \ln \mu_k^t \right\}$$

Figure 6A:
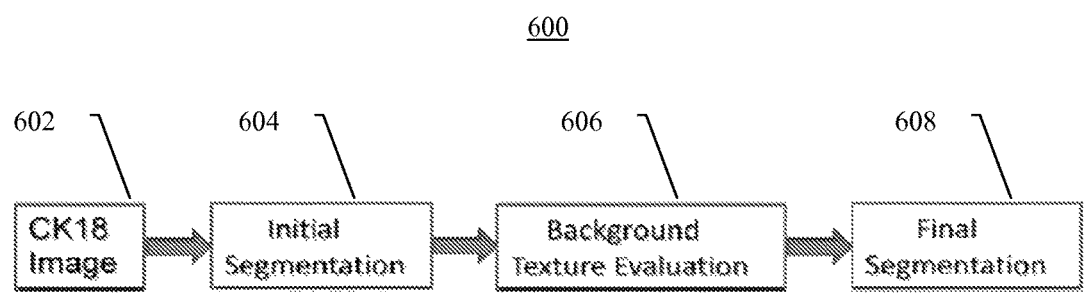

FIG. 6A is another flowchart 600 of illustrative stages involved in binarization of an image of tissue according to some embodiments of the present invention. Process 600 may be utilized, for example, to extract from an image of cytoplasm (e.g., CK18 image resulting from spectral detection) the portions of the image corresponding to tissue foreground or positive signal (i.e., cytoplasm). For example, process 600 may adapt the processing performed (e.g., the parameters of a minimum error threshold process) based on background texture in the image (e.g., non-epithelial background texture). Advantageously, the flexibility of this approach can lead to accurate segmentation of images with noisy background textures. In some embodiments, process 600 may be performed by segmentation module 106 (FIG. 1) or other suitable computing equipment. In some embodiments, process 600 may be performed on a tissue image that has already been preprocessed according to process 200 (FIGS. 2A-2C) to remove non-uniform intensity variations.

At stage 602, an image of tissue (e.g., CK18 image of cytoplasm obtained by spectral imaging) is received. At stage 604, the image is subjected to initial segmentation. At stage 606, the background texture in the image is evaluated. At stage 608, the image is subjected to an additional or final segmentation.

Figure 6B:
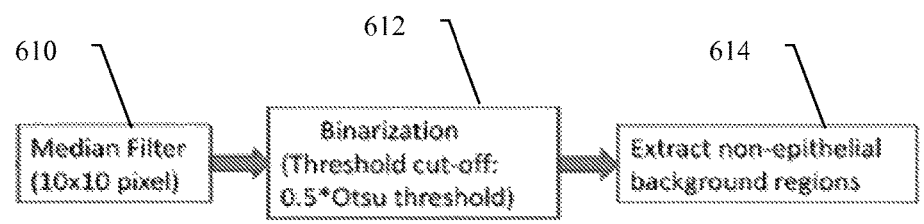
FIG. 6B is a flowchart of illustrative substages involved in initial segmentation within the process of FIG. 6A according to some embodiments of the present invention.

FIG. 6B is a flowchart of illustrative substages involved in initial segmentation 604 within process 600 (FIG. 6A) according to some embodiments of the present invention. At stage 610, a filter (e.g., average size 10×10 pixel median filter) is applied over the image to smooth background noise due to, for example, residual staining while preserving the boundary structure (e.g., boundary structure of cytoplasm). For example, in some embodiments, filter size according to process 600 may vary between, for example, 2 to 18, with the smallest value of the median filter being 2×2 and the largest being 18×18. With values of 2×2 through 18×18 in this example, the average size median filter may be 10×10. At stage 612, the resulting image is binarized using, for example, the minimum error threshold method described above or another suitable process. The threshold cut-off may be, for example, 0.5*Otsu threshold. For example, the threshold cut-off may refer to the pixel value at which the process converts the intensity image to a binary image. The 0.5*Otsu threshold may refer to a cut-off value determined by computing half the value of the threshold determined by the Otsu method, which chooses a threshold to minimize the intra-class variance of black and white pixels. At stage 614, the complement of the binarized image is then multiplied with a normalized version of the original image to extract the non-epithelial background.

Figure 6C:
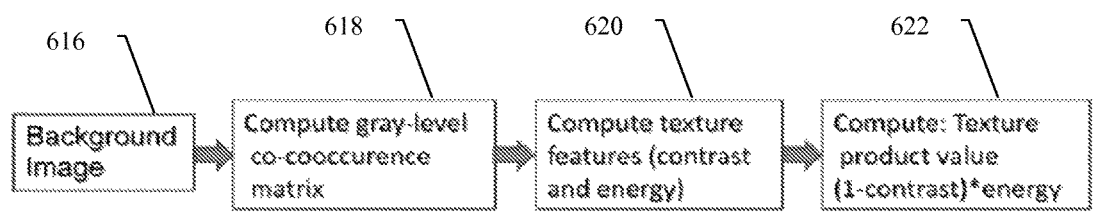
FIG. 6C is a flowchart of illustrative substages involved in background texture evaluation within the process of FIG. 6A according to some embodiments of the present invention.

FIG. 6C is a flowchart of illustrative substages involved in background texture evaluation 606 within process 600 (FIG. 6A) according to some embodiments of the present invention. A background image may be generated by complementing (inverting) the cytoplasm mask from the initial segmentation and multiplying the complemented image by the original (e.g., CK18) image. In some embodiments, and as described above, the initial segmentation may utilize an average size median filter of 10×10 and a 0.5*Otsu threshold level. Starting with the background image at stage 616 (e.g., non-epithelial background image), at stage 618 a gray level co-occurrence matrix is computed from the background image. At stage 620, textural features (e.g., contrast and energy) are computed from the matrix. Energy may be defined as:

$$\sum_{i,j} p(i, j)^2$$

Contrast may be defined as:

$$\sum_{i,j} |i - j|^2 p(i, j)$$

For these equations, p(i,j) is obtained from the gray-level co-occurrence matrix that calculates how often a pixel with gray-level (grayscale intensity) value i occurs horizontally adjacent to a pixel with the value j. Suitable examples of energy and contrast parameters are described in above-incorporated Gonzalez R. C and Woods R. E., Digital Image Processing, Second Edition, Prentice-Hall Inc, 2002, and in Mathworks' Matlab www.mathworks.com/help/images/ref/graycoprops.html, which is hereby incorporated by reference herein in its entirety. At stage 622, the features are combined to generate texture aggregate values. In some embodiments of the present invention, the aggregate value may be computed as (1−contrast)*energy.

Figure 6D:
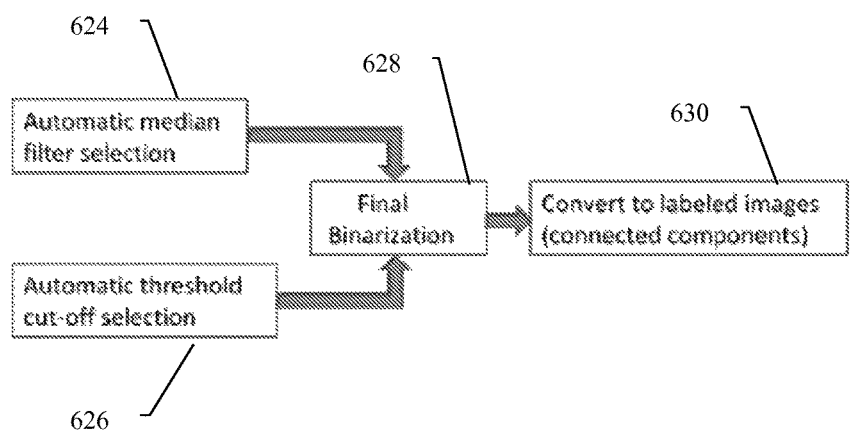
FIG. 6D is a flowchart of illustrative substages involved in additional or final segmentation within the process of FIG. 6A according to some embodiments of the present invention.

FIG. 6D is a flowchart of illustrative substages involved in additional or final segmentation 608 within process 600 (FIG. 6A) according to some embodiments of the present invention. At stages 624 and 626, respectively, the optimal median filter size and the optimal cut-off point for additional or final binarization (e.g., using minimum error thresholding method or another suitable process) are automatically selected. Additional or final binarization is performed at stage 628. In some embodiments of the present invention, a smaller median size filter and/or lower cut-off threshold value are selected for images that have less noise in the background. In some embodiments, this automatic selection is performed adaptively based on each image's background texture product value (e.g., calculated as indicated above). For example, a larger texture product value is typical for images with limited background noise. In some embodiments, the median filter size and cut-off threshold value are gradually increased to cover additional (e.g., two more) regions of texture product value as the level of background noise increases. These (e.g., three) regions together may cover the complete background texture noise range. In one example, three regions corresponding texture product value (e.g., defined as (1−contrast)*energy) may be provided. In this example of texture product value, the texture product values will always lie between 0 to 1. In some embodiments, it may be split into three regions, for example, (i) 0.00-0.33, (ii) 0.34-0.66, and (iii) 0.67-1.00. In some embodiments, the threshold cut-off is 0.9 and median filter size is 18 for the first region of 0.0 to 0.33; the threshold cut-off is 0.55 and median filter size is 15 for the second region of 0.34 to 0.66; and/or the threshold cut-off is 0.35 and median filter size is 5 for the third region of 0.67 to 1.00. In some embodiments of the present invention, the binarized images are converted into labeled images using connected components at stage 630.

Figure 6E:
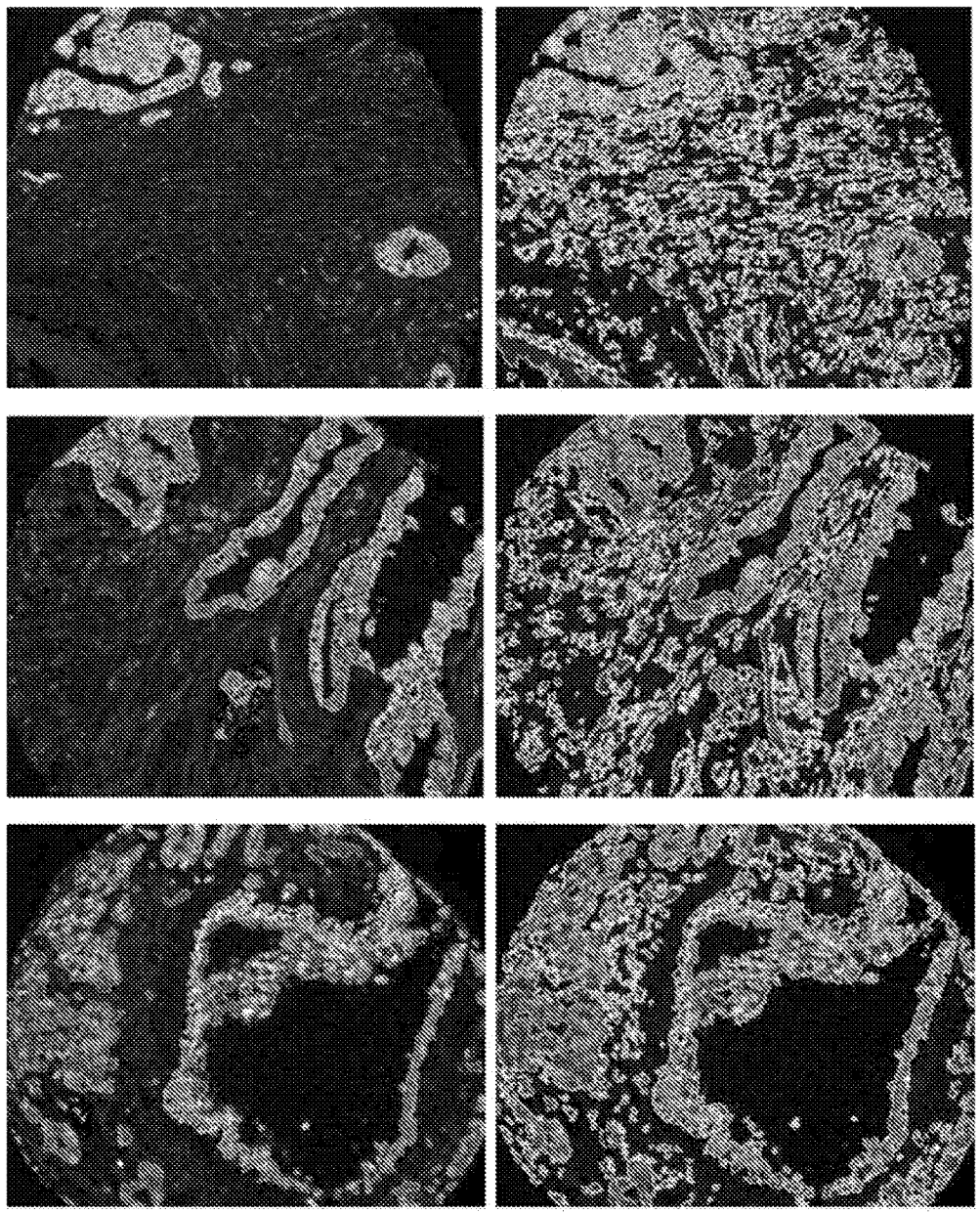
FIG. 6E shows images that compare adaptive cytoplasm segmentation according to FIG. 6B (images on left) with non-adaptive segmentation (images on right) in images with noisy background according to some embodiments of the present invention.

FIG. 6E is a comparison of adaptive cytoplasm segmentation (images on left) with non-adaptive segmentation (images on right) in images with noisy background. As shown, the background texture estimation facilitates improved cytoplasm segmentation by, for example, the automatic selection of median filter and binarization parameters.

Example: Segmentation of Noisy Cytoplasm Images

Adaptive epithelial cytoplasm segmentation as described above was applied on 1030 images (from 383 patients) that had fairly noisy to very noisy background. A fraction of the images had high levels of noise in the background that made the difference in foreground and background contrast very low. These were the most challenging cases. The background texture estimation process facilitated improved cytoplasm segmentation by the automatic selection of median filter size and binarization threshold level parameters. The segmentation was thus fine-tuned to adapt to every image based on the quantitative level of background noise.

Figure 7:
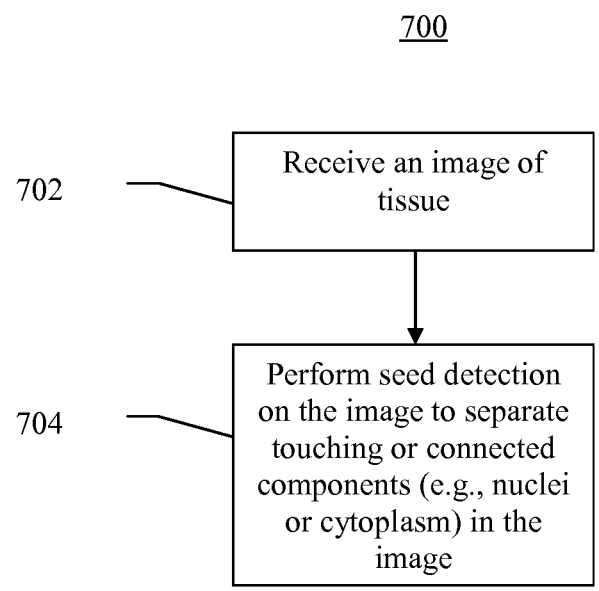
FIG. 7 is a flowchart of illustrative stages involved in separating touching or connected components of positive or foreground signal in an image of tissue according to some embodiments of the present invention.

FIG. 7 is a flowchart 700 of illustrative stages involved in separating touching or connected components of positive or foreground signal in an image of tissue (e.g., DAPI image of nuclei and/or CK18 image of cytoplasm resulting from spectral detection). In some embodiments of the present invention, process 700 may be performed by segmentation module 106 (FIG. 1) or other suitable computing equipment. In some embodiments, process 700 may be performed on a tissue image that has already been preprocessed according to process 200 (FIGS. 2A-2C) to remove non-uniform intensity variations, and/or binarized according to process 500 (FIG. 5) or process 600 (FIGS. 6A-6D) to extract from an image the portions of the image corresponding to tissue foreground or positive signal.

In some embodiments of the present invention, process 700 may detect a seed point for a plurality of (e.g., all) components (e.g., nuclei or cell) within an image. At stage 702, an image of tissue is received. At stage 704, seed detection is performed on the image to separate touching or connected components in the image.

In some embodiments of the present invention, seed detection at stage 704 may be performed using a multi-scale Laplacian of Gaussian (LoG) filter (specifically, the LoG's Difference of Gaussian (DoG) approximation). In some embodiments, use of the LoG (or DoG) filter may be based on the idea that most of nuclei and cytoplasm objects have a blob-like appearance. The scale of the filter (usually the standard deviation of its Gaussian kernel) may be directly related to the size of the blob. Thus, the maximum LoG response at the center of the blob may occur when using an LoG filter with a size that matches the size of the blob. In some embodiments, the use of multiple LoG scales may be necessitated by the presence of multiple nuclei and cytoplasm object sizes in the images within a dataset under consideration. In some embodiments, the Difference of Gaussian (DoG) approximation of the multi-scale LoG may be used because of its ease of implementation and the fact that the DoG method does not require normalization across the scale. In some embodiments of the present invention, such seed detection may be performed using the process described in above-incorporated Al-Kofahi et ah, "Improved automatic detection and segmentation of cell nuclei in histopathology images," IEEE Transactions on Biomedical Engineering, 57(4), 2010, or another suitable process. Also incorporated by reference herein in its entirety is Al-Kofahi, Algorithms and Framework for Cellular—Scale Mapping, Doctoral Dissertation, Rensselaer Polytechnic Institute, Troy, N.Y., 2009.

In some embodiments, seed detection in the image may be performed as follows: assuming that $L_{norm}$ (x, y; σ) is scale normalized LoG at scale a, in terms of a difference of Gaussians, it follows that:

$$L_{norm}(x, y; \sigma) \approx \frac{1}{2\sigma'}(G(x, y; \sigma + \sigma') - G(x, y; \sigma - \sigma'))$$

where G(x, y, σ) is a Gaussian kernel with standard deviation a. In some embodiments, in order to detect seed points, the image I(x, y) may be first convolved with multiple scale-normalized LoGs (using the DoG approximation) at different scales. Then the maximum LoG response at each point may be set to the maximum across the scales as $$R(x, y) = \underset{\sigma \in [\sigma_{min}, \sigma_{max}]}{\operatorname{argmax}} \{L_{norm}(x, y; \delta) * I(x, y)\}$$

where * is the convolution operation, and σ are the scale ranges. The resulting image R(x, y) referred to as the LoG response image can be thought of as a topographic surface in which each blob (e.g., nuclei or cytoplasm) is represented by a Gaussian like blob with one local maxima. In some embodiments, seed points may be detected by identifying these local maxima points. In some embodiments, a minimum size constraint may be used to limit the size of the identified blob. The size of the area (search box) may depend on a parameter termed the clustering resolution r, which in turn depends on the minimum scale.

In some embodiments, the clustering resolution parameter may be subsequently used to perform local maximum clustering. An advantage of using the multi-scale LoG method for seed detection is that in addition to producing seed points, the method yields the LoG response image R(x, y). In some embodiments, the LoG response image and the detected seeds may be combined with a clustering based approach to separate touching cells. In some embodiments, this process may not be followed by segmentation refinement using a Graph-cuts based approach. This is because the present applicant has determined that results produced by applying a local maximum clustering approach are adequate, rendering segmentation refinement unnecessary. As can be inferred from its name, the clustering method groups points in the image around their local maxima using a graduated region growth approach. As the clustering is applied to the response image and the local maxima of the image are also the seed points, the clustering method degenerates to a simple task of assigning image points to seed points.

In some embodiments, the local maximum clustering algorithm uses a sliding box having a size defined by a resolution parameter where each point in the image is first assigned to its local maximum inside that box. In subsequent iterations, that assignment may be propagated until each foreground point is assigned to a seed point. In some embodiments, there may be two advantages to this clustering method over, for example, use of a watershed transform method. First, this method may have a clustering resolution parameter that controls the smallest cluster size possible, thus making it possible to avoid producing very small clusters or fragments. Second, this method can be applied on the foreground points only (or could be constrained to a limited portion of the image), making it computationally attractive and flexible.

Post-Processing: Artifact Removal and Reclassification Near Boundaries

Figure 8:
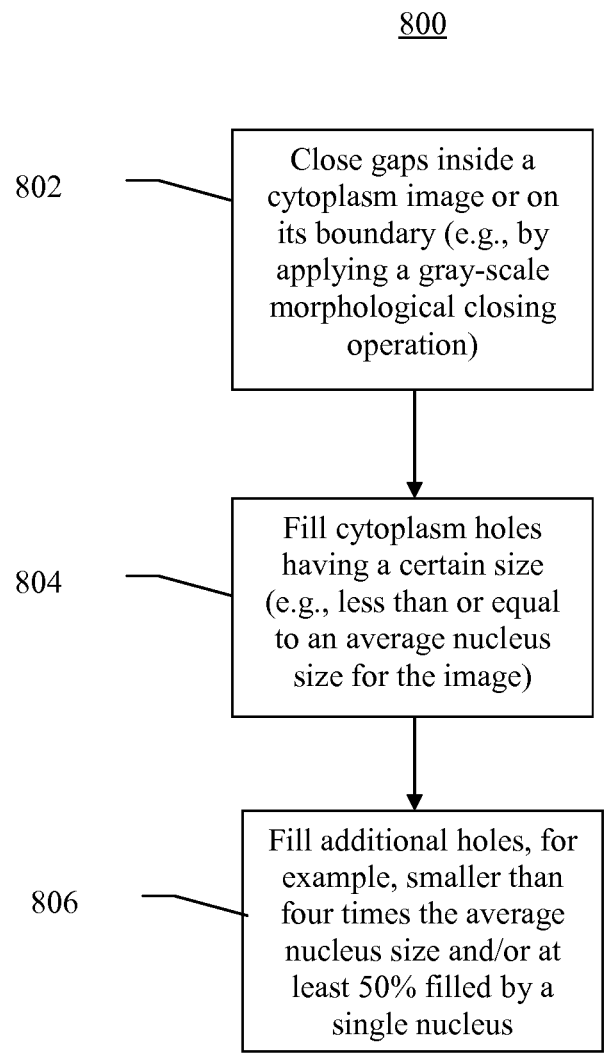
FIGS. 8 and 9 are flowcharts of illustrative stages involved in removing artifacts and/or other unwanted fragments or errors in a segmented image of tissue according to some embodiments of the present invention.

FIG. 8 is a flowchart 800 of illustrative stages involved in removing artifacts and/or other unwanted fragments or errors in a segmented image of tissue (e.g., DAPI image of nuclei or CK18 image of cytoplasm) according to some embodiments of the present invention. In some embodiments of the present invention, process 800 may be performed by post-processing module 108 (FIG. 1) or other suitable computing equipment. In some embodiments, process 800 may be performed on a tissue image that has already been preprocessed according to process 200 (FIGS. 2A-2C) to remove non-uniform intensity variations, and/or binarized according to process 500 (FIG. 5) or process 600 (FIGS. 6A-6D) to extract from an image the portions of the image corresponding to tissue foreground or positive signal, and/or processed according to process 700 (FIG. 7) to separate touching or connected components of positive or foreground signal in the tissue image.

Process 800 may include using a first segmented image (e.g., nuclei segmentation) as a template to fill holes in a second segmented image (e.g., cytoplasm segmentation). For example, in some embodiments of the present invention, when the first and second images correspond to a nuclei (DAPI) image and a cytoplasm (CK18) image, respectively, process 800 may entail filling holes in the second image left by the DAPI staining. For example, here, the first and second images may be the output of a nuclei image (e.g., DAPI) segmentation process ("nuclei mask") and the output of a cytoplasm image (e.g., CK18) segmentation process ("cytoplasm mask"). Two types of holes may be common in the cytoplasm mask. The first type represents nuclei objects that are missed during an initial thresholding step (e.g., stage 504, FIG. 5) because they are too dim and close to the background intensity level. The second type represents lumen holes inside a gland object. The holes due to the lumen are typically dimmer and larger than the nuclear holes. In some embodiments, the hole filling process is used to fill in the first type of holes but not the second type.

At stage 802, small gaps inside the cytoplasm image or on its boundary are closed by applying, for example, a gray-scale morphological closing operation. A suitable example of a gray-scale morphological closing operation according to some embodiments of the present invention is described in above-incorporated Gonzalez R. C and Woods R. E., Digital Image Processing, Second Edition, Prentice-Hall Inc, 2002. At stage 804, this may be followed by filling multiple (e.g., all) of the cytoplasm holes, for example, having a size less than or equal to an average nucleus size for the image. At stage 806, holes smaller than, for example, four times the average nucleus size and/or at least 50% filled by a single nucleus may also be filled. In some embodiments of the present invention, the remaining holes may be considered (e.g., labeled or classified by one or more computers as) lumen holes. Alternatively or additionally, in some embodiments, semi-holes that touch an edge of a non-tumor mask and are completely enclosed by one cytoplasm object may be considered (e.g., labeled or classified by one or more computers as) lumen holes.

Figure 9:
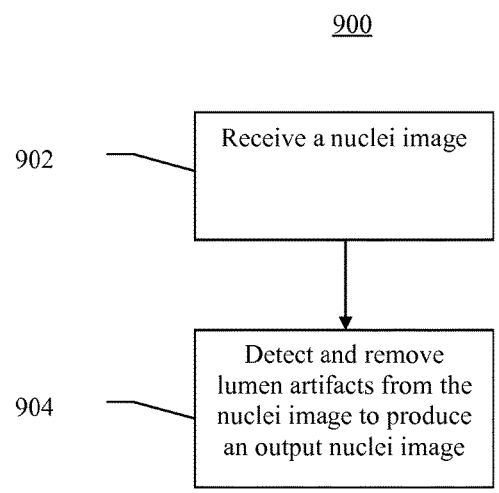

FIG. 9 is another flowchart 900 of illustrative stages involved in removing artifacts and/or other unwanted fragments in a segmented image of tissue (e.g., DAPI image of nuclei) according to some embodiments of the present invention. In some embodiments of the present invention, process 900 may be performed by post-processing module 108 (FIG. 1) or other suitable computing equipment. In some embodiments, process 900 may be performed on a tissue image that has already been preprocessed according to process 200 (FIGS. 2A-2C) to remove non-uniform intensity variations, and/or binarized according to process 500 (FIG. 5) or process 600 (FIGS. 6A-6D) to extract from an image the portions of the image corresponding to tissue foreground or positive signal, and/or processed according to process 700 (FIG. 7) to separate touching or connected components of positive or foreground signal in the tissue image, and/or processed according to process 800 (FIG. 8) above.

Figure 10:
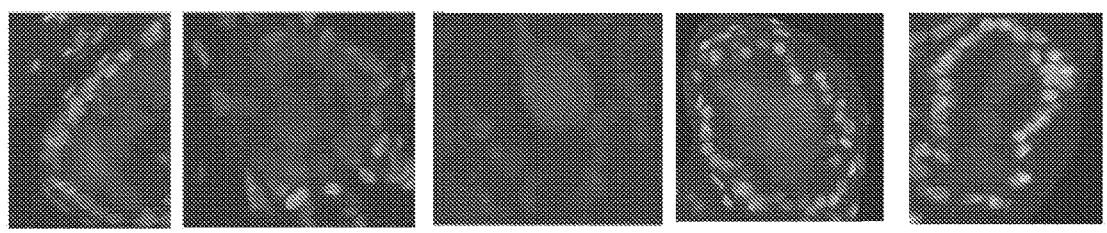
FIG. 10 shows images of lumen artifacts that can be removed by processing according to some embodiments of the present invention.

In some embodiments of the present invention, process 900 may include receiving a nuclei image at stage 902, and detecting and removing lumen artifacts at stage 904 in order to produce an output nuclei image. In some embodiments, at least a portion (e.g., most) of the unwanted artifacts may have been located within lumen holes previously extracted during the generation of the cytoplasm mask (e.g., according to process 800, FIG. 8). However, not every lumen hole extracted in the previous step may have been a real lumen hole. For instance, over-estimating the CK18 signal can result in merging neighboring glands. As a result, gaps between those glands can be misclassified as lumen holes. Further, nuclei may occasionally be present in the lumen holes. Hence, not every object present in the lumen hole is an artifact. For those reasons, in some embodiments of the present invention, process 900 may involve determining different features and measurements from each DAPI object (and connected component) inside the lumen in order to distinguish artifacts from stromal nuclei. In some embodiments of the present invention, a classification problem like this one is solved by supervised learning with examples. This may entail deriving multiple feature-based models of the artifacts from examining a series of examples. The learned models may then be used to identify lumen artifacts at stage 904. Examples of lumen artifacts that can be removed during processing are shown in FIG. 10.

In some embodiments of the present invention, stage 904 may involve the use (e.g., by one or more computers) of a rule-based system that considers the morphological characteristics and texture of objects and/or their connected components in determining if they are likely artifacts. Connected component features may include, for example, one or more (e.g., all) of the size of the connected component $Z_c$, and its average and standard deviation of intensities $A_c$ and $S_c$ respectively. As for object-based (nuclei) features, they may include one or more (e.g., all) of nucleus size, eccentricity $C_n$ and elongation $E_n$. In some embodiments, assuming that $P_n$ is the percentage of the object area inside the lumen, $Z_n$ is the average nucleus size, $AV_n$ is average of the average nuclei intensities, and $ST_n$ is their standard deviations, a rule-based classifier may be defined as follows:

$$F_1 = \frac{Z_c - 2Z_n}{|Z_c - 2Z_n|} + \frac{A_c - 2AV_n}{|A_c - 2AV_n|}$$

$$F_2 = F_{1+} \frac{S_c - 2ST_n}{|S_c - 2ST_n|} + \left(\frac{1.5 - E_n}{|1.5 - E_n|}\right) \times \frac{C_n - 0.5}{|C_n - 0.5|}$$

if ($P_n$ < 0.8 or $F_1$ < 2 or $F_2$ < 2)

class = normal else class = artifact

Figure 11A:
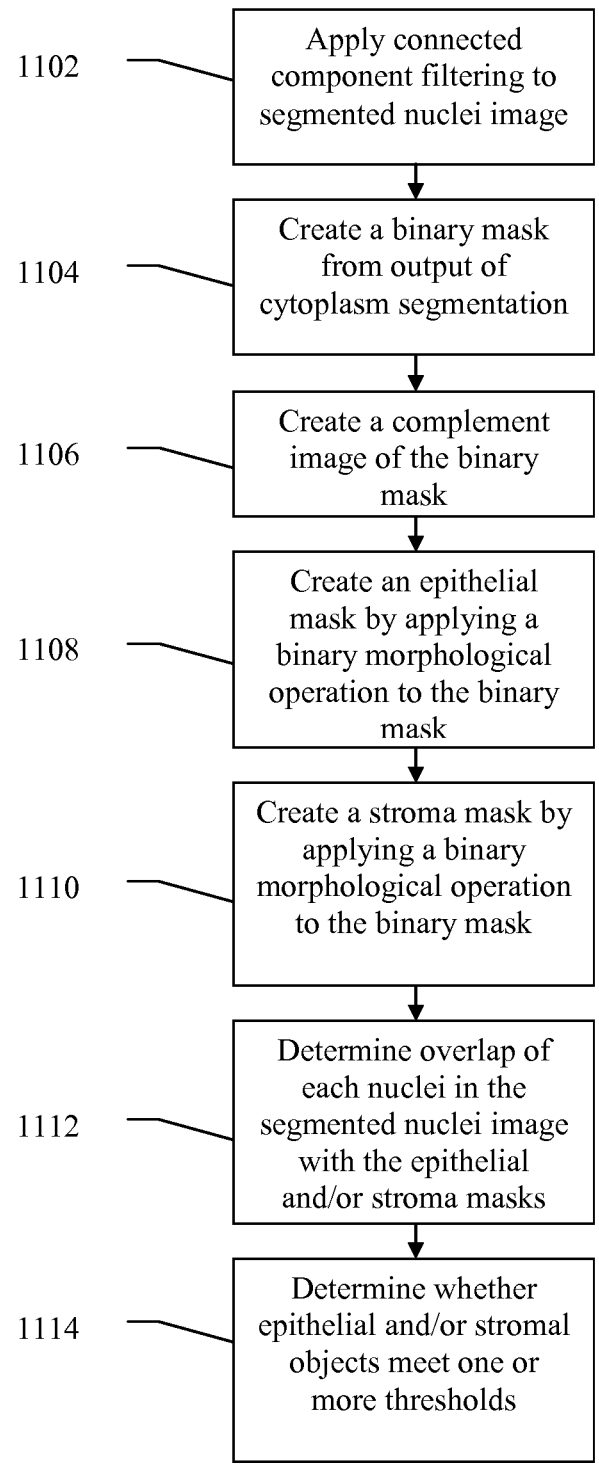
FIG. 11A is a flowchart of illustrative stages involved in classifying nuclei into epithelial and stromal nuclei according to some embodiments of the present invention.

FIG. 11A is a flowchart of illustrative stages involved in classifying nuclei into epithelial and stromal nuclei according to some embodiments of the present invention. In some embodiments, a geometric method based on overlap ratios may be applied to a boundary of cytoplasm to classify nuclei into epithelial and stromal categories.

At stage 1102, a filter (e.g., connected component filter) may be applied to the output of a nuclei segmentation. At stage 1104, a mask (e.g., binary mask) may be created from the output of a cytoplasm segmentation. At stage 1106, a complement image may be created from the binary mask of the cytoplasm segmentation to create a new image. Relative to an initial image, an image complement may be generated by, for example, replacing all high-pixel values in the initial image with low pixel values, and replacing all of the low pixel values in the initial image with high pixel values, which may also be referred to as image inversion.

At stage 1108, an operation (e.g., binary morphological operation) such as binary erosion, binary dilation, binary closing or binary opening may be applied to the binary mask of the cytoplasm segmentation output (e.g., erode the mask by 2 pixels) to create an epithelial mask. At stage 1110, an operation (e.g., a binary morphological operation) such as binary erosion, binary dilation, binary closing or binary opening may be applied to the complement of the binarized cytoplasm segmentation output (e.g., erode the mask by 5 pixels) to create a stroma mask. At stage 1112, for each nuclei object in the nuclei segmentation output image, its overlap with the epithelial and/or stroma masks may be determined. In some embodiments, if the overlap with the epithelial mask is greater than a given fraction (e.g., predetermined, fixed fraction, e.g., 0.6), the nuclei object may be labeled as an epithelial object. In some embodiments, if the overlap with the stroma mask is greater than a given fraction (e.g., predetermined, fixed fraction which could be the same or different from the fraction above, e.g., 0.5), the nuclei object may be labeled as a stroma object. In some embodiments, if the nuclei is neither labeled as epithelial nor stroma (e.g., due to insufficient overlap), it may be labeled as unclassified.

At stage 1114, for each nuclei labeled as epithelial and/or stroma objects, it may be determined whether the nuclei's one or more morphological shape features (e.g., eccentricity, circularity, roundness, etc.) and/or one or more texture features (e.g., energy, standard deviation of grayscale values, etc.) meet one or more thresholds (e.g., confirm that all nuclei labeled stroma nuclei have eccentricity greater than 0.5). In some embodiments, stage 1114 may be optional and may be omitted from the process of FIG. 11A.

Figure 11B:
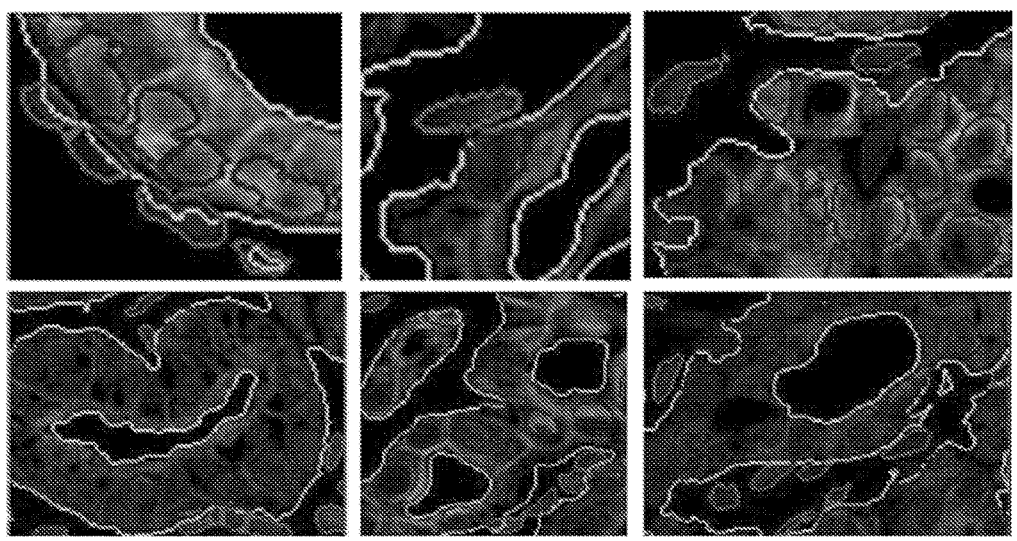
FIG. 11B shows illustrative segmented images having nuclei boundary classifications according to some embodiments of the present invention.

FIG. 11B shows examples of nuclei boundary classifications according to some embodiments of the present invention. In the original image, epithelial nuclei had a blue boundary and hue, stroma nuclei had a red boundary and hue, and cytoplasm had a green boundary and hue. However, for ease of reproduction, these images have been included without color in this application. A color version is provided in applicants' above-incorporated U.S. Provisional Application No. 61/400,642, filed Jul. 30, 2010.

Figure 11C:
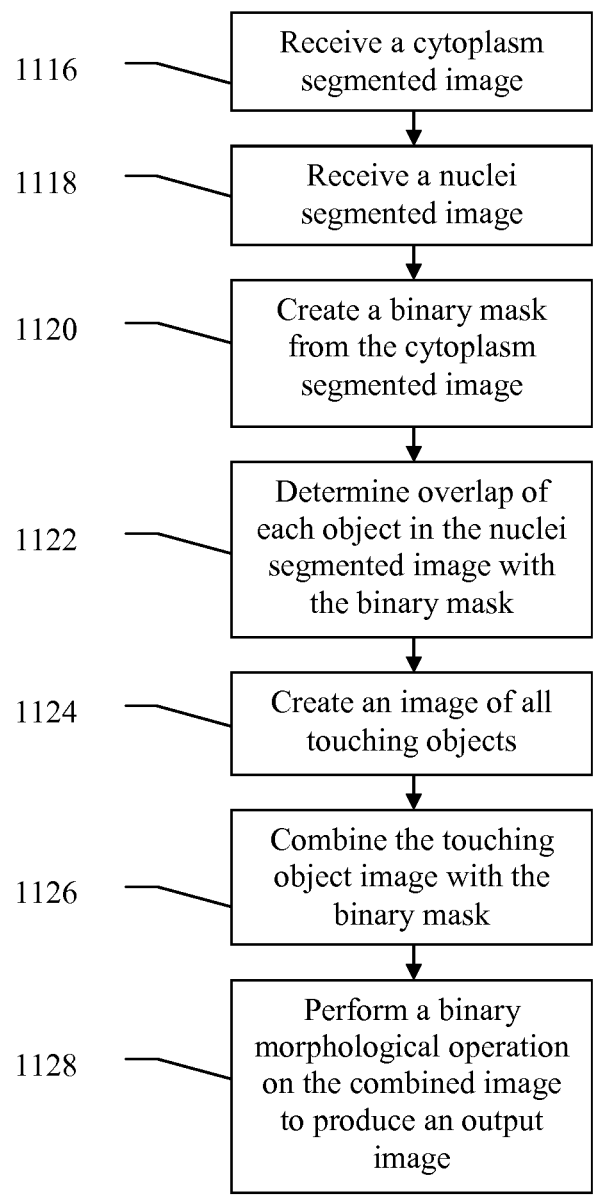
FIG. 11C is a flowchart of illustrative stages involved in adjusting boundaries of cytoplasm objects within a tissue image to avoid dividing border nuclei according to some embodiments of the present invention.

FIG. 11C is a flowchart of illustrative stages involved in adjusting boundaries of cytoplasm objects within a tissue image to avoid dividing border nuclei according to some embodiments of the present invention. At stage 1116, an image resulting from cytoplasm segmentation may be received. At stage 1118, an image resulting from nuclei segmentation may be received. At stage 1120, a mask (e.g., binary mask) may be created from the image resulting from the cytoplasm segmentation. At stage 1122, for each nuclei object in the image resulting from the nuclei segmentation, its overlap with the cytoplasm mask may be determined. In some embodiments, if the overlap with the cytoplasm mask is greater than a given fraction (e.g., predetermined, fixed fraction, e.g., 0.1), the nuclei object may be labeled as a touching object. At stage 1124, a touching object image may be created from all the touching objects. At stage 1126, an operation (e.g., binary logical AND operation) may be performed to combine the touching object image with the cytoplasm mask. At stage 1128, an operation (e.g., binary morphological operation) such as binary erosion, binary dilation, or binary closing (e.g., perform binary closing with pixel size 5) may be performed on the combination image to obtain an output image.

Figure 11D:
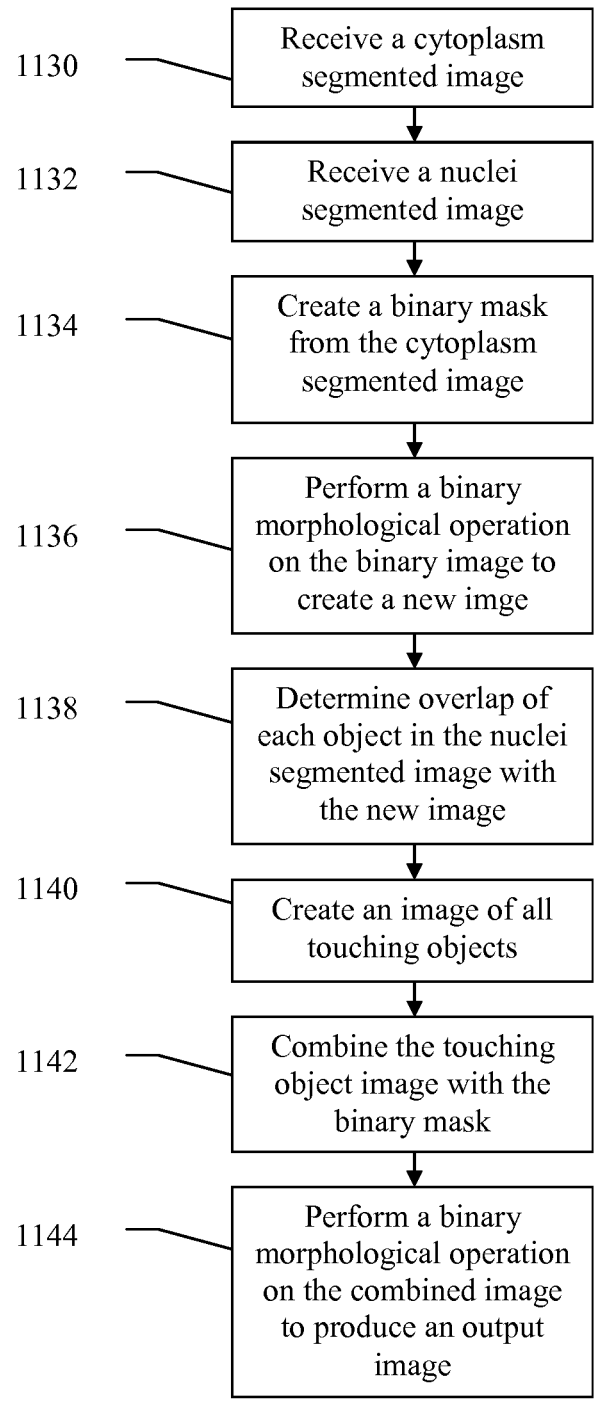
FIG. 11D is a flowchart of illustrative stages involved in adjusting boundaries of cytoplasm objects in a tissue image having a scalloped appearance according to some embodiments of the present invention.

FIG. 11D is a flowchart of illustrative stages involved in adjusting the boundaries of cytoplasm objects given a scalloped appearance, for example, caused by weak stain around the nuclei along the boundary according to some embodiments of the present invention. At stage 1130, an image resulting from cytoplasm segmentation may be received. At stage 1132, an image resulting from nuclei segmentation may be received. At stage 1134, a mask (e.g., binary mask) may be created from the image resulting from the cytoplasm segmentation. At stage 1136, an operation (e.g., a binary morphological operation) may be performed such as binary erosion, binary dilation, or binary closing (e.g. perform binary closing with pixel size 10) on the binary mask. At stage 1138, for each nuclei object in the image resulting from the nuclei segmentation, its overlap with the modified cytoplasm mask resulting from stage 1136 may be determined. In some embodiments, if the overlap with the cytoplasm mask is greater than a given fraction (e.g., predetermined, fixed fraction, e.g., 0.1), the nuclei object may be labeled as a touching object. At stage 1140, a touching object image may be created from all the touching objects. At stage 1142, an operation (e.g., binary AND operation) may be performed to combine the touching object image with the cytoplasm mask. At stage 1144, an operation (e.g., binary morphological operation) such as binary erosion, binary dilation, or binary closing (e.g., perform binary closing with pixel size 5) may be performed on the combination image to obtain an output image.

Example: Integrated Cellular Segmentation of Prostate Gland Tissue 981 5 μM sections of formalin-fixed paraffin-embedded human prostate tissues were rehydrated and stained using nuclear DAPI and CK18. The DAPI and CK18 emission images were captured using a Nuance multispectral camera at 20× by 10× resolution. Non-cancer tissue regions of the DAPI-CK18 images were digitally masked out by a pathologist. As a result, three gray levels were present in the images: the masked area (black), tissue background (dark gray), and tissue foreground (bright regions representing the nuclei or cytoplasm). Ground truth was created from 48 DAPI-CK18 images using a semi-automatic labeling tool and using the process described in FIG. 23D. The generated ground truth was reviewed by two senior pathologists.

Segmentation performance was measured using the standard Dice and Jaccard metrics (below) and also using 'Dice Average' and 'Jaccard Average,' which are extensions of the traditional metrics to multiple object, multiple impingement systems (such as cellular images).

$$\text{Dice index} = \frac{2(A \cap B)}{A+B}; \text{Jaccard index} = \frac{(A \cap B)}{A \cup B}$$

The overall segmentation accuracy for image processing and segmentation according to some embodiments set forth herein exceeded 94% using all four metrics. The artifact removal process was tested using 981 actual prostate cancer tissue images. To judge the efficacy of the process, trained personnel were asked to rate overall artifact condition of the resultant images as 'satisfactory' or 'not satisfactory'. The artifact removal resulted in a drastic reduction in images with visible artifacts. Only 10% of images were rated as 'not satisfactory' compared, for example, to 37% of images for the process described in the above-incorporated Al-Kofahi paper, which lacks Applicants' artifact removal process. From experiments it was observed that the most of the improvement in performance was the result of introducing both the initial non-uniform intensity normalization and final artifact removal stages as described herein.

Epithelial Unit Separation

FIGS. 12A-D are flowcharts of illustrative stages involved in segmenting an image of tissue to identify, for example, epithelial units. In some embodiments of the present invention, these processes receive as input, for example, two biomarker images of the same tissue: a CK18 image showing epithelial cytoplasm, and a DAPI image showing epithelial and stromal nuclei. In some embodiments, these images are previously segmented, using the segmentation procedure(s) described above to produce labeled masks of the connected epithelial area. In some embodiments, the epithelial unit separation is performed using the processes described below that have complementary effects and between the two they capture most or all of the separations. Advantageously, some embodiments of the present invention separate touching but not fused epithelial units and/or group epithelial nuclei into discrete rings that do not depend on lumens or initial lumen segmentation.

Figure 12A:
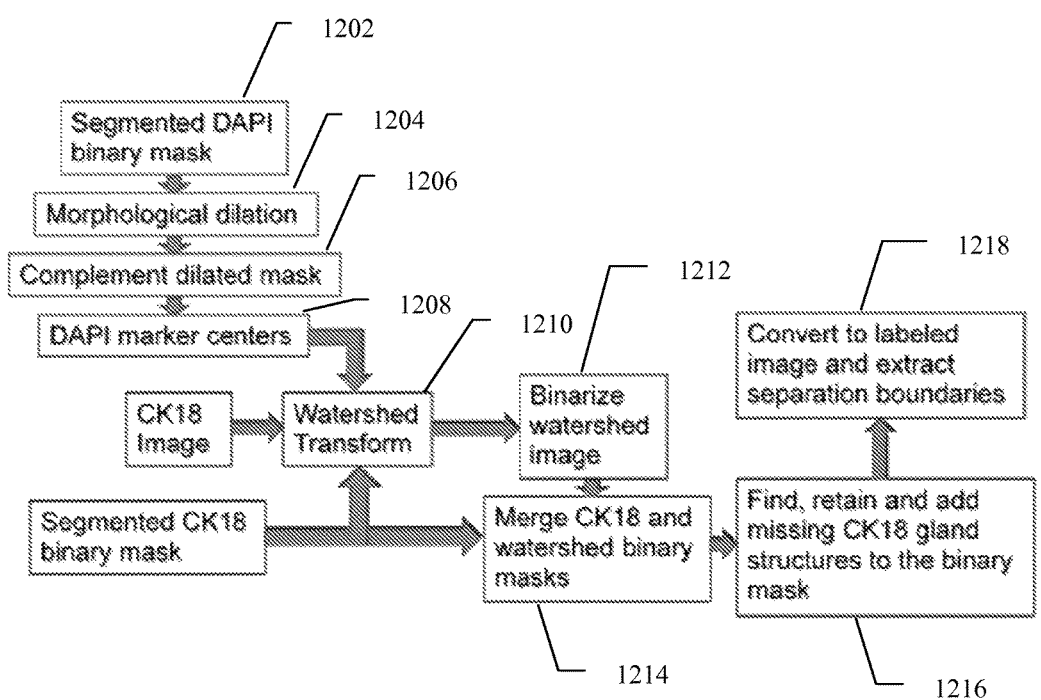
FIGS. 12A-C are flowcharts of illustrative stages involved in segmenting an image of tissue to identify epithelial units according to some embodiments of the present invention.

FIG. 12A is a flowchart of illustrative stages involved in epithelial unit separation according to some embodiments of the present invention. In some embodiments, this process utilizes initialization of a watershed algorithm from the interior or marker centers. A marker center may be a binary structure obtained by dilating, for example, a segmented epithelial DAPI nuclei mask and complementing the dilated mask. In some embodiments of the present invention, the processes of one or more of FIGS. 12A-D may be performed on a tissue image that has already been preprocessed according to process 200 (FIGS. 2A-2C) to remove non-uniform intensity variations, and/or binarized according to process 500 (FIG. 5) or process 600 (FIGS. 6A-6D) to extract from an image the portions of the image corresponding to tissue foreground or positive signal, and/or processed according to process 700 (FIG. 7) to separate touching or connected components of positive or foreground signal in the tissue image, and/or processed according to processes 800 (FIG. 8) and/or 900 (FIG. 9) above.

At stage 1202, a segmented nuclei (e.g., DAPI) binary mask is received. At stage 1204, the segmented nuclei binary mask is variably dilated using morphological dilation. At stage 1206, the complement of the dilated mask is generated. At stage 1208, marker centers are extracted from the complement of the dilated mask. At stage 1210, using the marker centers, a smoothed cytoplasm (e.g., CK18) image (e.g., generated by smoothing the CK18 image using a Gaussian low pass filter and an averaging filter), and/or segmented cytoplasm (e.g., CK18) binary mask as input, a new image of intensity valleys and peaks (minima and maxima) is generated and a watershed transform is applied over the new image to obtain watershed lines of separations. At stage 1212, the watershed image is binarized. At stage 1214, the segmented cytoplasm (e.g., CK18) binary mask and watershed binarized image are merged. At stage 1216, missing epithelial units from the segmented cytoplasm (e.g., CK18) binary mask are searched for and retained using one or more logical operations between the binarized watershed image and the segmented cytoplasm (e.g., CK18) binary mask. For example, in some embodiments, a logical OR operation may first be used to merge all separations that are marked for elimination, and the binarized watershed based image and the segmented cytoplasm mask may be merged. At stage 1218, the image is labeled (e.g., labeled using connected components) and separation boundaries and/or regions are extracted from the labeled image, for example, by subtracting the separations marked for elimination from initial separations obtained from the watershed segmentation.

Figure 12B:
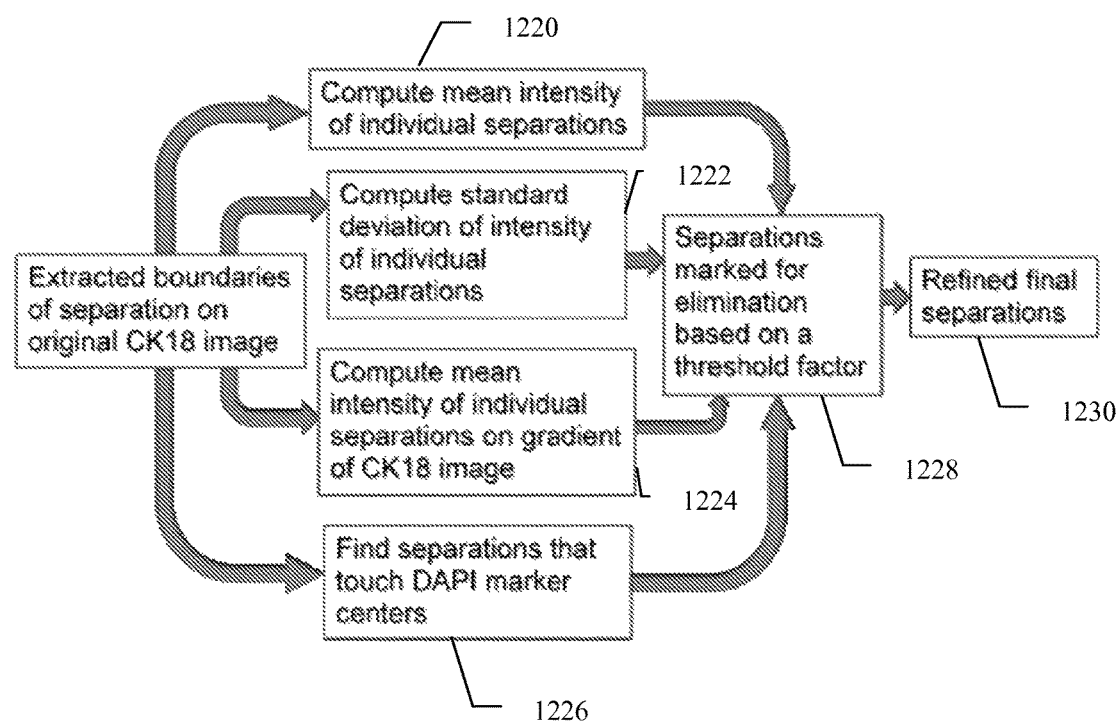

FIG. 12B is a flowchart of illustrative stages involved in epithelial unit separation refinement according to some embodiments of the present invention. In some embodiments, this process utilizes initialization of a watershed algorithm from the interior or marker centers. In some embodiments, the process of FIG. 12B removes false separations using image criteria such as, for example, the derivative, standard deviation, mean intensity, and/or marker contact criteria.

At stages 1220 and 1222, respectively, an intensity (e.g., mean intensity) and standard deviation thereof (e.g., standard deviation of mean intensity) are computed on individual separations of a cytoplasm (e.g., CK18) intensity image (e.g., the original or pre-processed CK18 image). At stage 1224, the standard deviation of, for example, mean intensity is computed on individual separations on a gradient of the cytoplasm (e.g., CK18) image. At stage 1226, separations that touch any nuclei (e.g., DAP I) marker centers are identified. At stage 1228, based on a threshold criterion (e.g., obtained by dividing the lumen area by the segmented cytoplasm area), potentially false separation boundaries are eliminated (e.g., these separation boundaries may not lie in the epithelial cytoplasm gaps). At stage 1230, final or refined separation boundaries are extracted.

Figure 12C:
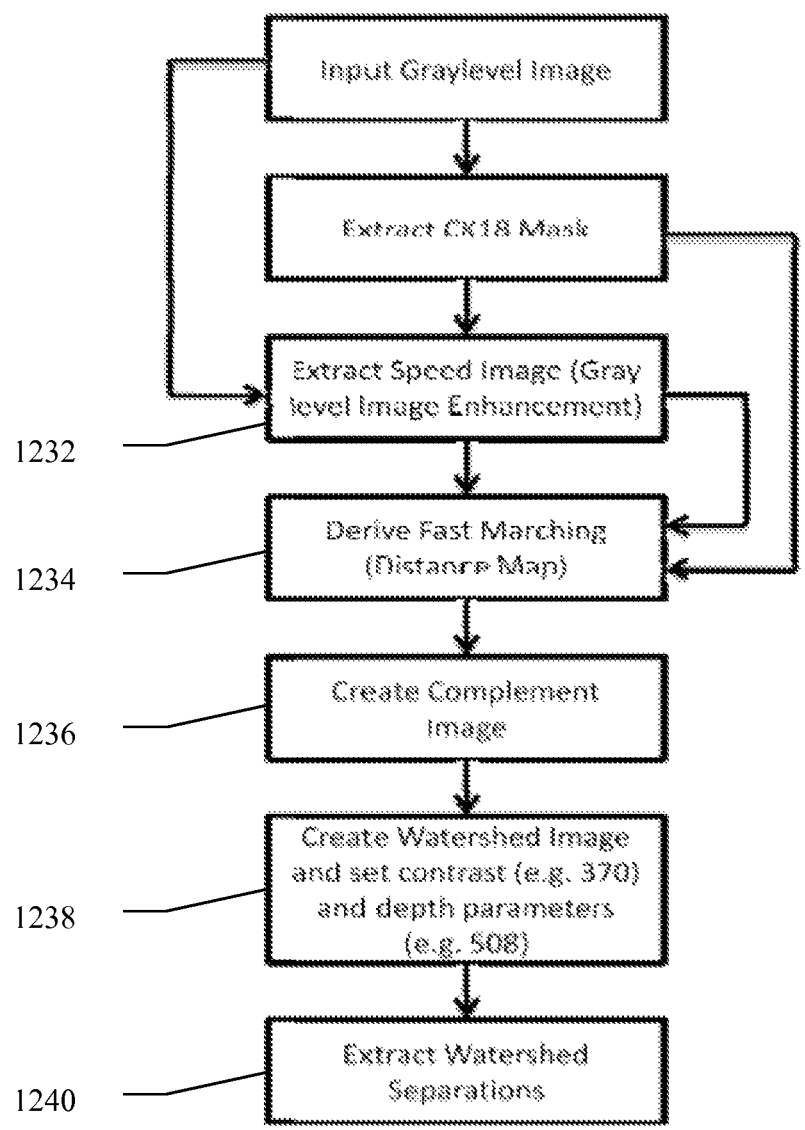

FIG. 12C is a flowchart of illustrative stages involved in enhancing ridges in tissue images according to some embodiments of the present invention. For example, in some embodiments, the dark, low-contrast linear ridges formed by the visible cytoplasm membranes around the outer boundary of touching or almost touching cytoplasm (e.g., CK18) areas may be enhanced. In some embodiments of the present invention, such a process may include the use of a fast-marching process to propagate the initial cytoplasm (e.g., CK18) border. An example of a suitable fast-marching process according to some embodiments of the present invention is described in J. A. Sethian, "Level Set Methods and Fast Marching Methods," Cambridge University Press, 1999, which is hereby incorporated by reference herein in its entirety. The resultant image, a representation of a distance map, may include high values far from the borders, and low values along edges reachable by rapid propagation. In some embodiments of the present invention, implementation of such a process may be in C++.

At stage 1232, a speed image may be created, which includes the CK18 edge+ridge strength. For example, in some embodiments, the speed image may have values in the range 0-1, with propagation speed proportional to grey level, and distance (difference between neighboring fast marching output pixels) proportional to (1/grey level). The speed image may be designed to promote propagation along dark valleys between bright epithelial units and also along the outside (dark side) of bright borders of epithelial units. In some embodiments, the speed may be a rescaled edge strength image, defined as: (0.08+original_grey_level^2)/(dark side of bright edges+dark valleys), with dark side of bright edges=Dilation[CKimage, 2]−CKImage, and dark valleys=BottomHat[CKimage, 2]. At stage 1234, a Fast Marching edge strength propagation method is performed using the speed image, initialized from the CK18 borders, to create a distance map, which is then inverted at stage 1236. At stage 1238, a watershed segmentation is performed of the inverted distance map and watershed separations are extracted at stage 1240.

Figure 13:
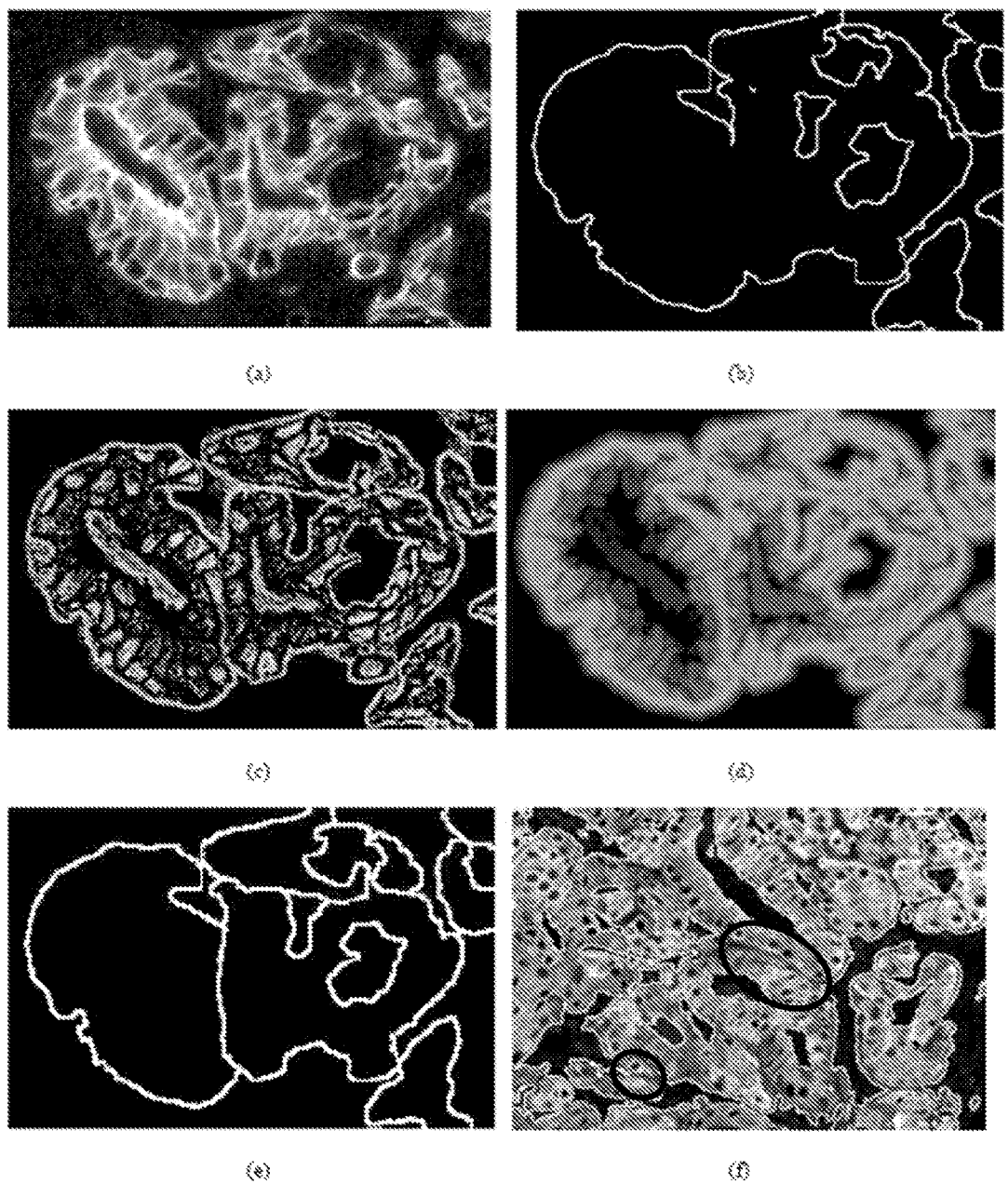
FIG. 13 shows images demonstrating separation of touching epithelial units according to some embodiments of the present invention.

FIG. 13 shows images demonstrating separation of touching epithelial units according to some embodiments of the present invention. Image (a) is an input CK18 image. Image (b) is a CK18 segmentation image. Image (c) is a combined edge and ridge strength image. Image (d) shows the results of fast marching initialized from image (b) propagating with speed from (c). Image (e) shows watershed separation. Image (f) shows a larger example with borders of certain ones of the newly identified segments being circled. In the original image (f) (included in color with above-incorporated U.S. Provisional Application No. 61/456,009, filed Oct. 28, 2010), the borders of new segments were overlaid in red. Image (f) is presented in black and white herein for ease of reproduction.

In some embodiments of the present invention, processes for separating epithelial units (e.g., touching glands) may be the same or similar for various different types of tissue images including, for example, H&E images, IF images, IHC images, and/or other images resulting from other types of staining. For example, for an H&E image, prior to the separation an H&E image segmentation process may be used to segment the H&E image. Once the segmentation is complete, the rest of the processing stages may be the same as those used for, for example, epithelial unit separation in IF images.

Lumen Generation

Figure 12D:
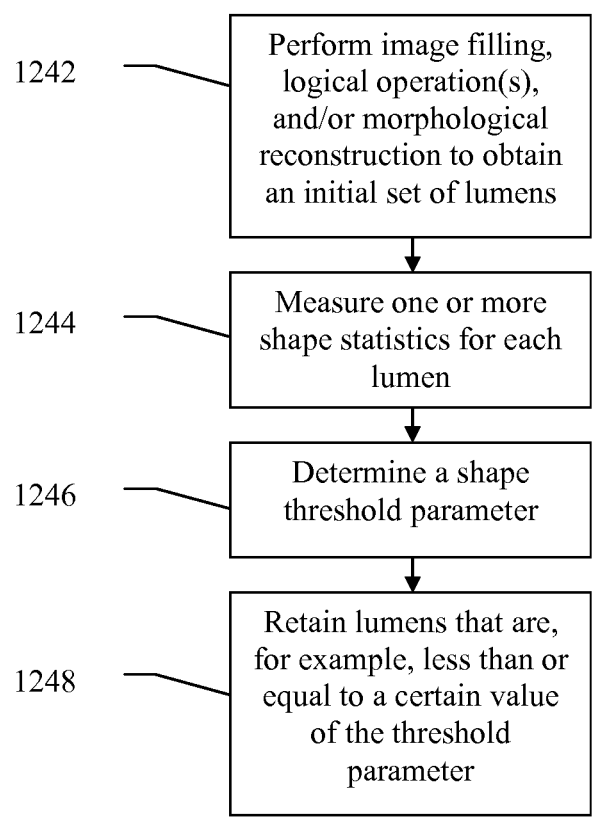
FIGS. 12D-E are flowcharts of illustrative stages involved in lumen generation according to some embodiments of the present invention.
Figure 12E:
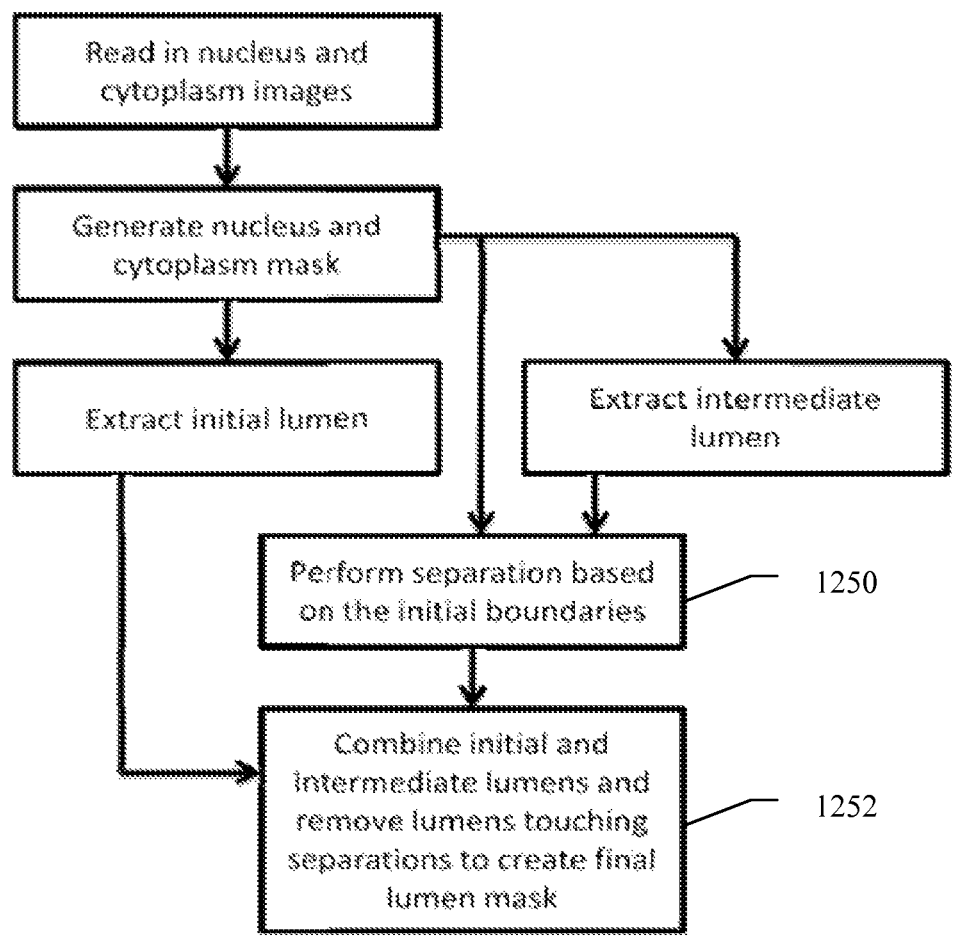

FIGS. 12D-E are flowcharts of illustrative stages involved in lumen generation (e.g., creation of a lumen mask image) according to some embodiments of the present invention. In some embodiments, a lumen mask image generated according to the process(es) of FIG. 12D and/or FIG. 12E may be used to facilitate further processing of tissue images after, for example, segmentation of nucleus and cytoplasm images as described above in connection with process 500 (FIG. 5) and/or process 600 (FIG. 6A). For example, areas of the background in the cytoplasm mask obtained from cytoplasm segmentation are either lumen or stroma. The correct classification of lumen and stroma regions may be important in constructing predictive morphologic features and/or subsequent tissue image processing stages including, for example, separating epithelial units according to the processes of FIGS. 12A-C.

In some embodiments of the present invention, an initial lumens mask image and an intermediate lumens mask image may be generated from cytoplasm and nucleus mask images generated by, for example, process 500 (FIG. 5) and/or process 600 (FIG. 6A). For example, in some embodiments, the initial lumens mask may be generated by extracting holes in the cytoplasm mask, selecting compact shaped regions (e.g., regions with aspect ratio less than 0.10), and/or determining that there are very few internal nuclei (e.g., none, or less than 5 internal nuclei). While few lumens may be missed in this initial process, many of the lumens may be misclassified. In some embodiments, the intermediate lumen mask image may be used as an input to one or more of the processes of, for example, FIGS. 12A, 12B, and/or 12C (e.g., an input to stage 1232) to separate the cytoplasm mask into individual epithelial units. In some embodiments, final lumen generation may be accomplished by combining the initial lumens and epithelial unit separations to form a combined lumen mask.

Referring to FIG. 12D (e.g., intermediate lumens mask generation), at stage 1242, starting with a segmented cytoplasm (e.g., CK18) mask, image filling, logical operation(s), and/or morphological reconstruction may be performed to obtain an initial set of lumens. Image filling may include filling one or more (e.g., all) holes (e.g., lumens or other holes in stroma). This may be the first step towards extracting lumens from the cytoplasm mask. Logical operation(s) may include, for example, an XOR logical operation of the newly filled and original cytoplasm mask, although other logical operation(s) can also be used in other embodiments. Morphological reconstruction may include, for example, repeated dilation performed between the XOR output image and the filled image in order to extract the lumens or other holes in the stroma.

At stage 1244, one or more shape statistics are measured for each lumen including, for example, one or more (e.g., all) of lumen perimeter, area, eccentricity, roundness, and extent. At stage 1246, a shape threshold is determined. For example, one shape statistic (e.g., eccentricity) may be multiplied with a complement of one or more additional statistics (e.g., roundness, perimeter, area, and/or extent) to obtain a shape threshold having a range, for example, that can be between 0-1 only. For example, in some embodiments, the threshold parameter may be:

Shape Threshold=Eccentricity*(1−Roundness)*(1−Perimeter)*(1−Area)*(1−Extent)

At stage 1248, lumens that are less than or equal to, for example, a certain value of the threshold parameter (e.g., 0.15 shape threshold value) are retained, and the retained lumens constitute the identified shape-based lumens.

Referring to FIG. 12E (e.g., subsequent or final, comprehensive lumen classification achieved via iterative refinement in one or more, e.g., 4 stages), at stage 1250 epithelial unit separation (e.g., according to one or more of the processes of FIGS. 12A, 12B, and/or 12C) is performed based on a lumen mask (e.g., the intermediate lumen mask resulting from the process of FIG. 12D) and nuclei and cytoplasm masks (e.g., resulting from processes 500 (FIG.

5) and/or 600 (FIG. 6A)). At stage 1252, a combined (e.g., final) lumen mask is generated by combining the initial lumens mask (e.g., generated as described above) and the epithelial unit separations. In some embodiments, lumens in the combined lumen mask that touch separations in the cytoplasm mask may be removed, and/or holes touching the image edges or pathology mask may be eliminated, with the resulting image being the final lumen mask.

Figure 12F:
FIG. 12F shows an example output of a lumen mask according to the process of FIGS. 12D-E according to some embodiments of the present invention.

FIG. 12F shows an example output according to the process of FIGS. 12D-E according to some embodiments of the present invention. In the original image, lumens were shown in green and separations were shown in yellow, although the image has been provided in black and white herein for ease of reproduction. For illustration, one of the lumens has been circled and one of the separations has been encased by a square.

Ring Segmentation

Figure 12G:
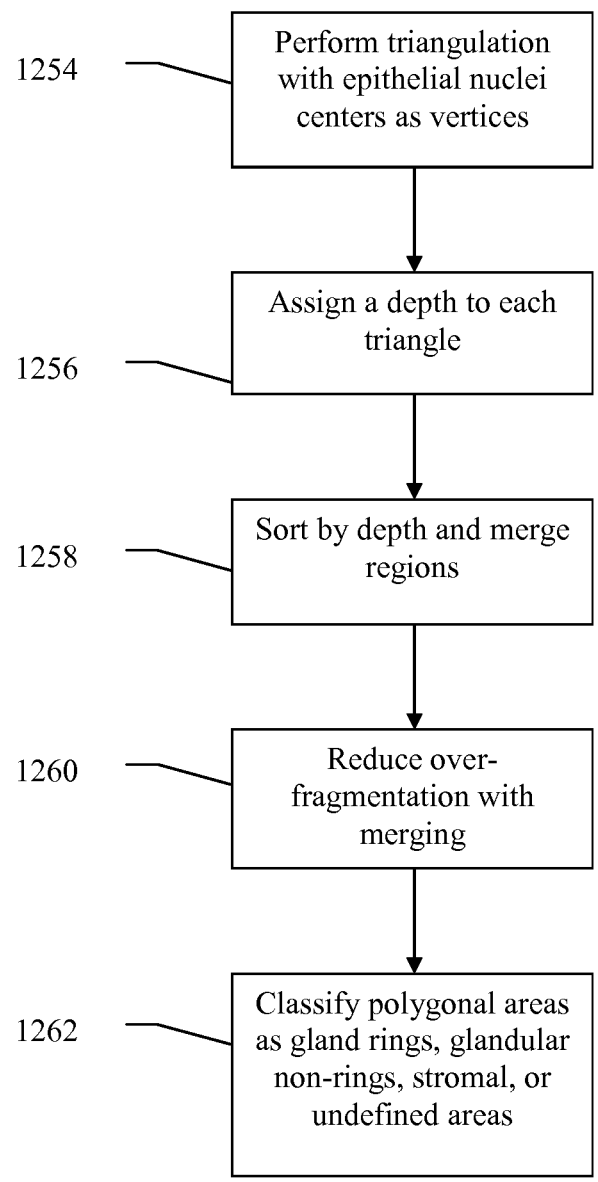
FIG. 12G is a flowchart of illustrative stages involved in ring segmentation by a graph process based upon clustering a triangulation of epithelial nuclei according to some embodiments of the present invention.

FIG. 12G is a flowchart of illustrative stages involved in ring segmentation by a graph process based upon clustering a triangulation of epithelial nuclei according to some embodiments of the present invention. Some embodiments of the present invention operate based on the principle that a key geometric property of a "ring" of points, possibly including some interior points not on the ring boundary is that the points are more closely spaced around the boundary than in the interior or exterior of the ring. In some embodiments of the present invention, a suitably initialized watershed process on a graph captures this property.

At stage 1254, Delaunay triangulation with epithelial nuclei centers as vertices is performed. In some embodiments of the present invention, the triangle connectivity graph is the Voronoi diagram. At stage 1256, a "depth" is assigned to each triangle, for example, equal to the length of the longest side. At stage 1258, a sort by depth is performed, and then starting from the deepest triangles, neighboring regions (e.g., 3 neighboring regions) are examined and regions are merged if the length of the common side is at least, for example, 90% of the depth of the neighbor, and if both regions touch the same epithelial units. In some embodiments, at stage 1260, a merging step reduces over-fragmentation to complete the partitioning of the image into polygonal rings. For example, according to some embodiments, an advantage of a graph-based watershed method over a pixel-based algorithm is that it is more convenient to track region statistics within the algorithm and to apply fine-tuned region merging criteria. Merging criteria that may be used according to various embodiments of the present invention include, for example, one or more of: (i) merging two touching regions if region contrast=Min (region1 diameter, region2 diameter)—touching edge length <300 pixels, with region diameter defined as Max(triangle edge lengths in region); (ii) merging touching regions if contrast ratio=touching edge length/region width >0.75 for either region; (iii) merging touching regions if the smaller region has width <10 pixels; and/or (iv) not merging if the two regions overlap different epithelial units.

Figure 14:
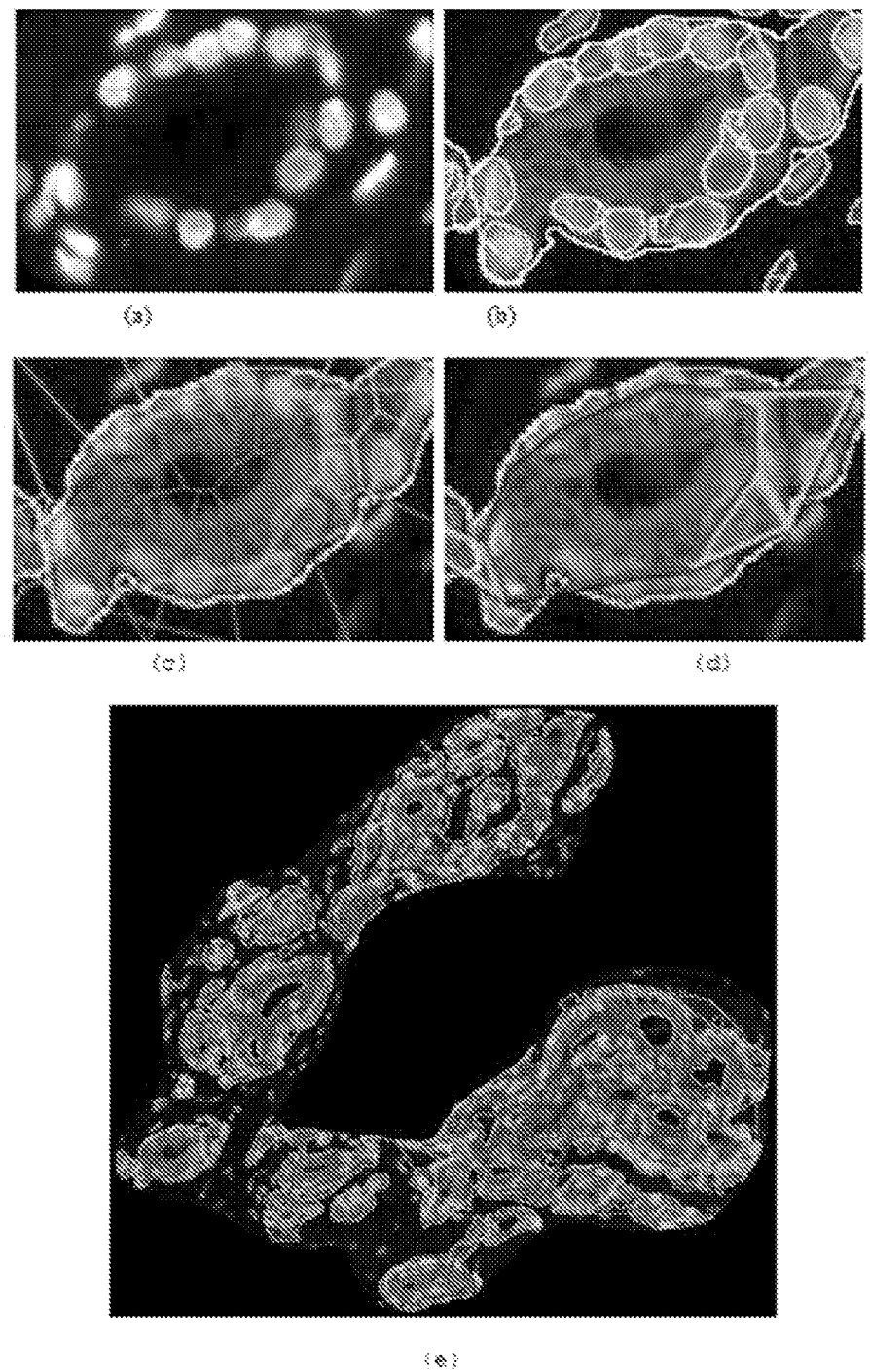
FIG. 14 shows images illustrating segmentation of epithelial nuclei into labeled gland rings according to some embodiments of the present invention.

FIG. 14 shows images of segmentation of epithelial nuclei into labeled gland rings according to some embodiments of the present invention. These images are provided in black/white herein for ease of reproduction. Color images are provided in above-incorporated U.S. Provisional Application No. 61/456,009, filed Oct. 28, 2010. Image (a) shows an input nuclear DAPI image. Image (b) shows a CK18 image overlaid with epithelial unit borders (shown in color image in white) and DAPI nuclei borders (shown in color image in blue). Image (c) shows a Voronoi diagram from epithelial nuclei centers, colored by watershed segmentation labels. Image (d) shows polygonal regions classified as gland ring (shown in color image in red), gland non-ring (shown in color image in green), stromal (shown in color image in black), and confused/undefined (shown in color image in blue). Image (e) is a larger example.

Ring Classification

According to some embodiments of the present invention, rings are polygonal regions of tissue that are identified and output by a segmentation process (e.g., the ring segmentation process described above). The goal of ring classification according to some embodiments of the present invention is to classify the rings into, for example, one or more (e.g., all) of five different types: (1) gland rings; (2) epithelial non-rings; (3) stroma regions; (4) under-segmented regions; and/or (5) incomplete regions.

In some embodiments, gland rings may be rings characterized by a ring of nuclei with a central clearing possibly containing a lumen. Epithelial non-rings may be characterized by dense fields of nuclei not in rings, isolated fragments of nuclei or nuclei on the outside of a ring sandwiched between neighboring rings or sandwiched between a ring and stroma. Stroma regions may be rings bordered by epithelial nuclei in different epithelial units or rings which border concavity of stroma in the same epithelial unit. Under-segmented regions may be rings with both stroma and epithelium which cannot be classified into any of the other categories. Incomplete regions may be rings bisected by image edges or a pathology mask.

Referring back to FIG. 12G, at stage 1262 polygonal areas resulting from ring segmentation may be classified into one or more (e.g., all) of the five types/classes, including gland rings, epithelial non-rings, stroma regions, under-segmented regions and/or incomplete regions using, for example, the criteria identified above. Additional details regarding how to classify the polygonal areas according to some embodiments of the present invention are provided below.

Figure 17:
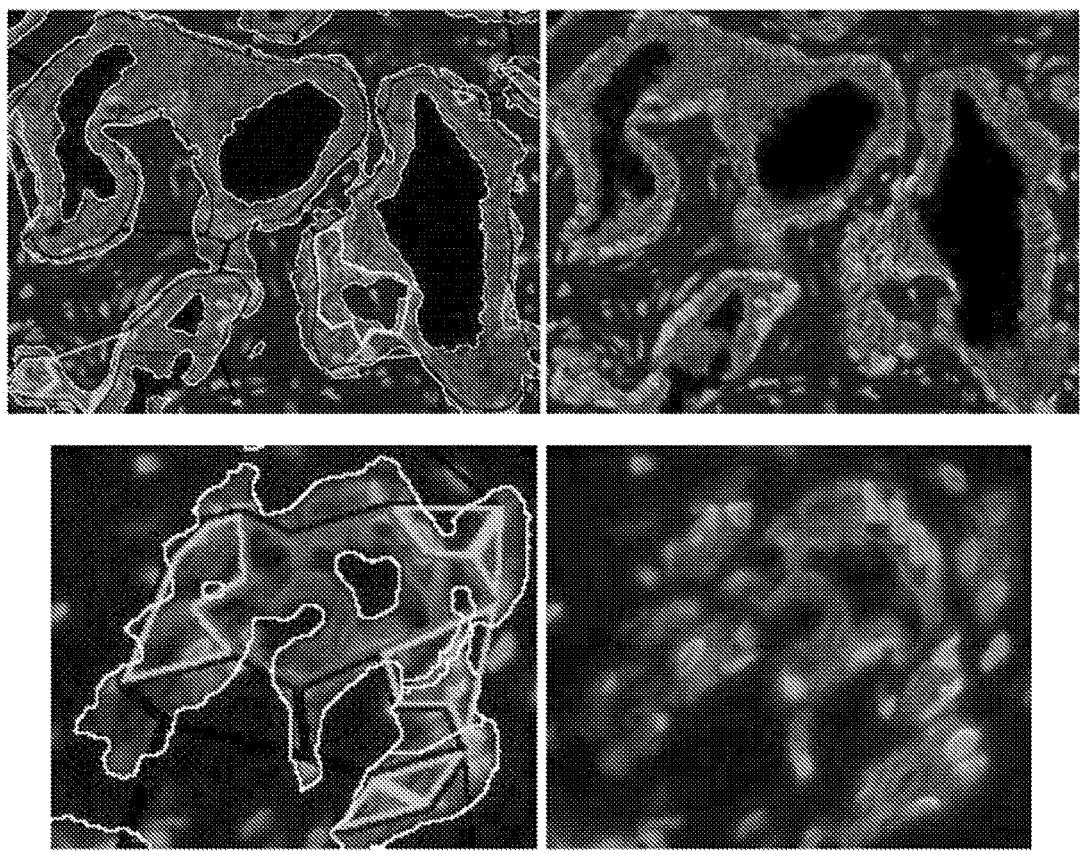
FIG. 17 shows an example of gland ring segmentation on a dark-field image according to some embodiments of the present invention.
Figure 18A:
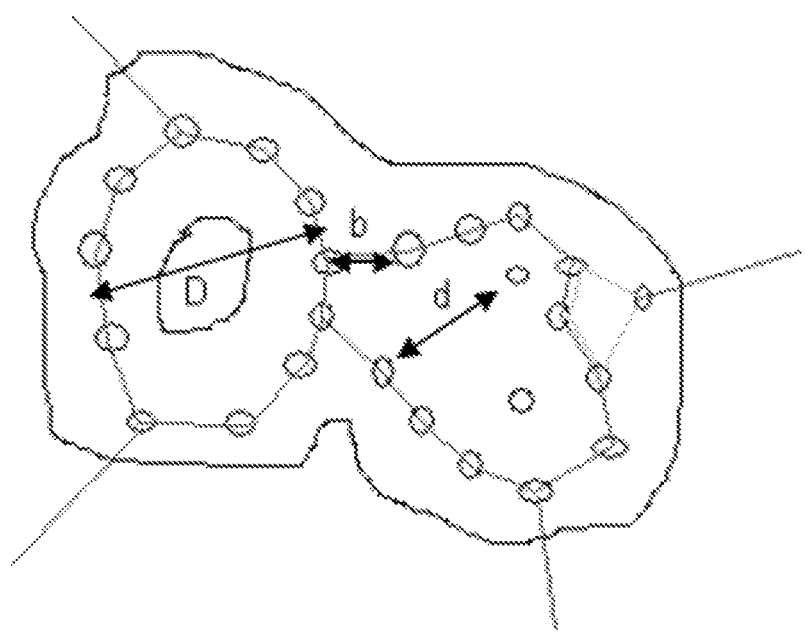
FIG. 18A shows schema for generating gland ring features according to some embodiments of the present invention.

According to some embodiments of the present invention, there may be three levels/types of ring features: (i) basic ring metrics, (ii) features for classification of ring types, and (iii) features for prognosis. Table 2 below describes basic ring metrics according to some embodiments of the present invention, which are also illustrated in FIG. 18A. In Table 2, a '+' in the "Dir" column indicates that a larger value is better for patient outcome, or at least not worse. The border density feature, d/b, at low values, detects poor ring segmentations as well as small rings with widely spaced nuclei (as shown in green rings in the original colored image corresponding to FIG. 17). Table 3 below describes illustrative ring classification features that may be used to classify rings into, for example, the five classes listed above. In some embodiments, additional ring features may be provided for use in prognosis (e.g., Table 4 below—Ring Feature Statistics) by, for example, one or more predictive models. In some embodiments of the present invention, any one or more (e.g., all) of the features in, for example, Tables 2, 3, and/or 4 may be used for prognosis within a predictive model alone or in combination with one or more additional features (e.g., clinical, molecular, and/or morphological features).

In some embodiments of the present invention, adjacencies and connectivities of one or more basic ring metrics (e.g., Table 2) may be used to construct a more detailed set of one or more features (e.g., Table 3) for the purpose of classifying rings into the five types or classes. For example, in some embodiments of the present invention, a rule-based method may be provided that uses one or more of the basic ring metrics in Table 2 and/or the ring classification features in Table 3 to classify each ring into, for example, one of the five classes 1-5, as illustrated below in Table 1:

TABLE 1

Ring Classification Decision Rule

| Ring Classification | Decision Rule |
|---|---|
| 5 | Touching image border |
| 4 | Confused - under segmented, with mixed stroma and cytoplasm: (numBlobs > 1 and lowck==0) or (numStromalSegments==0 and ring2==0) |
| 3 | Stroma:<br>stroma1==1 or (ringOK==0 and stroma2==1) |
| 1 | Gland ring:<br>(ringOK==1 and ((big==1 and crowded==0) or (medium==1 and small==0)) or<br>(ringOK==0 and (big==1 and lumenBorderOK==1) |
| 2 | Non-ring epithelial area:<br>Otherwise |

TABLE 2

Basic Ring Metric

| Ring Metrics | Dir | | Definition |
|---|---|---|---|
| Outer diameter | + | D | Outer diameter of ring = 4 area/perimeter (exact for regular polygons, overestimate for long objects) |
| Inner diameter | + | D | Inner clearing free of nuclei = $2^{nd}$ largest chord in nuclei triangulation |
| Border gap | – | b | Gap between nuclei around border = $2^{nd}$ largest gap |
| Clearing | + | L | Lumen or clearing diameter = excess of inner diameter over border gap = d – b (or = Max(Min(D, d) – b, 0)) |
| Border density | | d/b | Density of the border nuclei gaps compared to the interior gap Range: >=1 |
| Lumen ratio | + | Lr | =L/d = (d – b)/d = 1 – b/d = density rescaled 0-1 |
| Ltouch | + | Lt | Proportion of border touching inner clearing = L/D Range: 0-1 |
| Stouch | + | St | Proportion of border touching stroma = ratio border touching stroma + ratio border separated from stroma by a narrow band of non-ring padding of width < 15 pixels (green in the diagram above) Range: 0-1 |
| SDist20 | + | Sd20 | Ratio of border less than 20 pixels from stroma |
| SDist | – | Sd | Mean distance of border pixels from stroma |
| Padding | – | | Width of epithelial padding between ring and stroma = non-ring area adjacent to ring (non-ring border proportion x ring border length |

TABLE 3

Ring Classification Features

| Ring Classification Features | Description |
|---|---|
| numBlobs | Number of connected cytoplasm areas within the region after connecting together areas separated by small concavities in the cytoplasm border. A concavity is formed where the region edge (the straight line connecting adjacent nuclei) crosses the cytoplasm border. A "small" concavity has area < edge_length$^2$ |
| numStromalSegments | Number of connected background areas crossed by region edges, not including small concavities (nonblobsedges) |
| concavityArea | Total area of small concavities |
| lowCk | 1 (true): low cytoplasm density in region: Lumen_area (=area of background areas not touching region edges) < 100 and (cytoplasm area/region area) < 0.7 |
| ck18Width | ck18_area/region_perimeter |
| ck18AreaRatio | ck18_area/region_area |
| ck18WidthOK | 1 (true): large average ck width, not significantly smaller than neighbors:<br>ck18AreaRatio > 0.75 or<br>ck18Width > 10 or<br>ck18Width > 0.5 ck18Width of neighboring regions |
| stroma1 | 1 (true): strong evidence for stromal region: lowCk and numStromalSegments==0 |
| nucArtifactsFound | 1 (true): evidence of nuclei artifacts in stroma/lumen: #stromal nuclei > 5 and foreground/background intensity ratio < 2.5 |
| stroma2 | 1 (true): weaker evidence for stromal region: lowCk and not nucArtifactsFound and (# stromal nuclei + numStromalSegments – 2ck18WidthOK) >= 0 |
| ring1 | 1 (true): strong evidence for a gland ring region. All the following conditions are true:<br>#border nuclei > 3<br>ck18WidthOK<br>(stromal nuclei total area < 10 or nucArtifactsFound) not touching pathology mask or image edges numBlobs==1 |
| ring2 | 1 (true): weaker evidence for gland ring region: numStromalSegments==0 and stroma2==0 |
| ringOK | ring1 or ring2 |
| aspectRatio | With m = Sqrt(1 – 4 region_area/((region_perimeter/2)$^2$), aspect ratio = (1 – m)/(1 + m) |
| lumenOK | 1 (true): strong evidence that background area is lumen not stroma:<br>ck18AreaRatio < 0.9 and lumen_area > 50 and lumen_area/concavityArea > 0.5 |
| borderOK | 1 (true): tight border nuclei spacing compatible with gland ring:<br>largest_border_gap < region_diameter |
| lumenBorderOK | concavityArea/region_area < 0.15 and (borderOK or lumenOK or aspectRatio > 0.16) |
| big | Lumen area > 400 or (region_diameter > 35 and region area > 2000 and lumenBorderOK) |
| medium | lumen area > 100 or (region_diameter > 22 and concavityArea/region_area < 0.15 and borderOK) |
| small | #border_nuclei < 5 and region_area < 500 |
| crowded | #border_nuclei < #all_nuclei/2 |

In some embodiments of the present invention, apparatus, methods, and computer-readable media are provided that utilize features based on connectivity of cytoplasm within rings with corrections for concavities where lumen or stroma crosses the ring boundary. For example, with reference to Table 3 above, embodiments of the present invention may detect small concavities and ignore these in calculating blob connectivities. This procedure may be useful, for example, whenever connectivities of overlapping blobs are analyzed, especially blobs with holes and concave borders.

Biomarker Signal Segmentation/Quantitation—Low Signal-to-Noise Images

Figure 15:
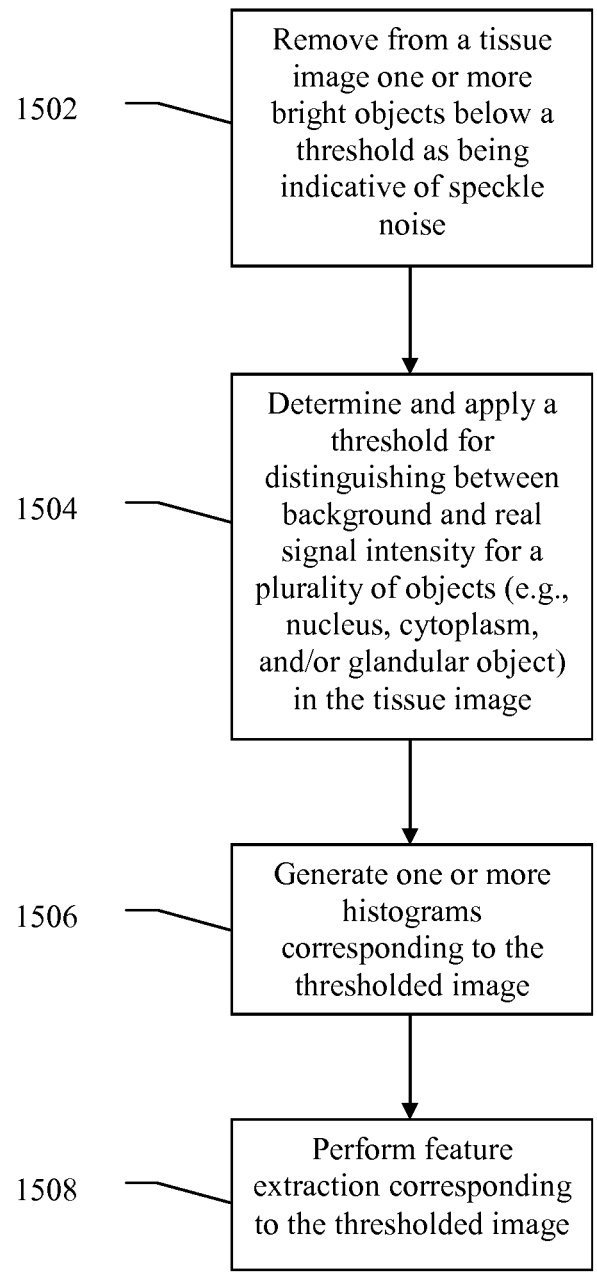
FIG. 15 is a flowchart of illustrative stages involved in localizing and quantifying biomarker signal in, for example, tissue images having poor signal-to-noise ratio (SNR) according to some embodiments of the present invention.

FIG. 15 is a flowchart 1500 of illustrative stages involved in localizing and quantifying biomarker signal according to some embodiments of the present invention. Applicants have determined that this process works well for, for example, tissue images having poor signal-to-noise ratios (SNR) and other images. For example, biopsy tissues, surgical resection specimens, and cell aspirates frequently suffer through variations in tissue handling and processing including mechanical shear during tissue sectioning. Tissue micro arrays (TMAs) are often constructed using standardized protocols intended to mitigate tissue history effects by allowing for the evaluation of all tissue images at the same time under similar conditions. Thus, in some embodiments of the present invention, process 1500 may be utilized to improve image analysis of TMA and/or biopsy tissues that can have, for example, low SNR.

In some embodiments of the present invention, process 1500 may be performed on a tissue image (e.g., DAPI and/or CK18) that has already been preprocessed according to process 200 (FIGS. 2A-2C) to remove non-uniform intensity variations, and/or binarized according to process 500 (FIG. 5) or process 600 (FIGS. 6A-6D) to extract from an image the portions of the image corresponding to tissue foreground or positive signal, and/or processed according to process 700 (FIG. 7) to separate touching or connected components of positive or foreground signal in the tissue image, and/or processed according to processes 800 (FIG. 8) and/or 900 (FIG. 9) above. In some embodiments, processing before utilization of process may include, for example, classifying nuclei in a tissue image into epithelial nuclei (DAPI+/CK18+) and/or stromal nuclei (DAPI+/CK18−) using a colocalization process and/or identification of cytoplasm glands and glandular objects. Process 1500 may be preceded by other processing in other embodiments.

At stage 1502, one or more bright objects having a size below a threshold are removed from an image of tissue (e.g., nuclei image) as being indicative of and characterized as speckle noise. In some embodiments, two thresholds are utilized, one for size and one for brightness. The size threshold may be utilized to remove small artifacts (e.g., nucleus and cytoplasm fragments generated during tissue process), while the brightness threshold may be utilized to remove speckles (e.g., point speckles created during the staining process). For example, in some embodiments, relative signal intensity in a biomarker image is indicative of a targeted biological process and/or attribute for which the biomarker is designed to capture. Absolute intensity of a biomarker signal in one image relative to another may be influenced by strong nonspecific binding as a result of tissue history (e.g. extraction, processing and storage steps) as well as impurities in labeling reagents. This non-specific binding constitutes background noise in the image.

In some embodiments of the present invention, to limit the influence of noise due to tissue history and other elements of the assay, biomarker quantitation may be limited to segmented objects (e.g., nuclei and/or cytoplasm and/or glandular objects). Alternatively or additionally, in some embodiments, the amount of speckle noise that is allowed in each object (e.g., nucleus and/or cytoplasm and/or or glandular object) is limited using an experimentally determined threshold (e.g., determined automatically or based on review by a pathologist of image processing results using multiple threshold values). For example, the resulting average object (e.g., nuclei) intensity I may be given as:

$$I = 0, \text{ if } \sum_n b < \tau, \text{ or} \quad (1)$$

$$I = \frac{1}{m} \sum_n b, \text{ otherwise.}$$

In (1), b are valid nuclei biomarker object pixels (e.g., nuclei pixels), $\tau$ is the speckle noise threshold, m is the total number of object pixels, and n is the total number of nuclei in the image.

At stage 1504, a threshold (cut-off) may be determined for distinguishing between background and real signal intensity for each object (e.g., nucleus). In some embodiments, each object (e.g., nuclei) in each of a plurality of sub-compartments (e.g., epithelia and stroma) may be treated separately. In some embodiments, the signal intensity threshold T may be determined as a function of biomarker background characteristics. For example, in order to find this function, objects (e.g., nuclei) B may be split into two non-overlapping classes: 1) real signal colored objects $B_r$ (e.g., with mean, standard deviation and average intensities given by $\mu_r$, $\sigma_r$, and α-th percentiles $q_{r,\alpha}$, where α=5, 10, . . . , 100; and 2) background colored objects $B_b$ (e.g., with $\mu_b$, $\sigma_r$, $q_{r,\alpha}$ and α-th percentiles $q_{b,\alpha}$). In some embodiments, a linear relationship is modeled between the threshold T and the background characteristics:

$$T = \beta^T X, \quad (2)$$

where $\beta = [\beta_0, \beta_1, \ldots, \beta_p]^T$ are model parameters of a model, and $X = [1, X_1, \ldots, X_p]^T$ are background features. In other embodiments, non-linear modeling may be used. Note that in (2) or according to other models in accordance with other embodiments of the present invention, the threshold T may change according to the properties of each image. In some embodiments, indirect linear regression analysis via concordance index (CI) optimization may be used to determine β. For example, a set of images may be selected for training the model. For each image: a) objects $B_c$ and $B_b$ may be identified; b) background features may be extracted; and c) CI may be computed. The value of β that optimizes the CI may be selected as optimal.

At stages 1506 and 1508, after positive object identification, sub-compartment histogram generation (stage 1506) and feature extraction (stage 1508) may be performed. In some embodiments of the present invention, histograms (e.g., epithelial and stroma histograms $H_E$ and $H_S$) are extracted by binning the actual signal colored objects (e.g., nuclei $B_r$), for example, separately in each sub-compartment. In some embodiments, the binning could also involve using compartments such as, for example, peri-epithelium and sub-compartments of the stroma. The histograms (e.g., epithelia and stroma histograms) may be analyzed separately to obtain relative intensity features such as, for example, cumulative expressions at each α-th percentile. Alternatively or additionally, the histograms may be analyzed in relation to each other to obtain features related to the relative expression of, for example, epithelia and stroma nuclei at each α position.

Figure 16:
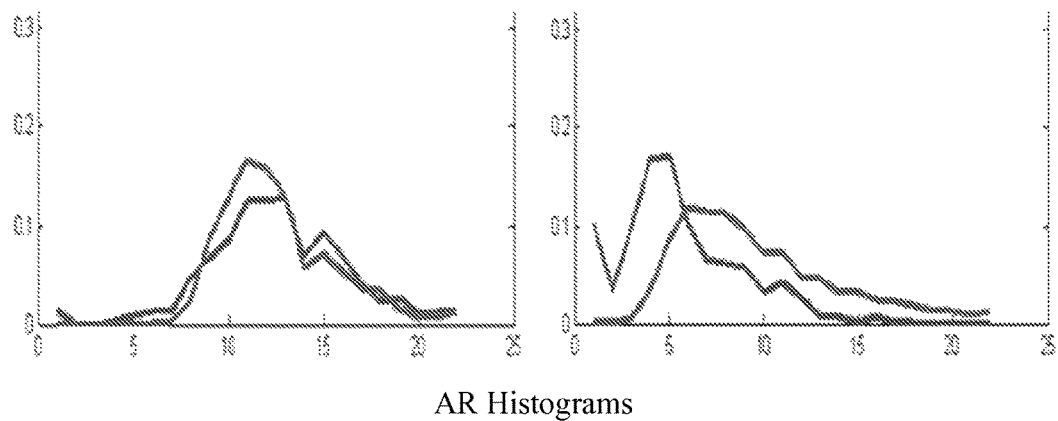
FIG. 16 shows typical AR and Ki67 biomarker expression histograms for progressive cancer and dormant prostate cancer according to some embodiments of the present invention.
Figure 16:
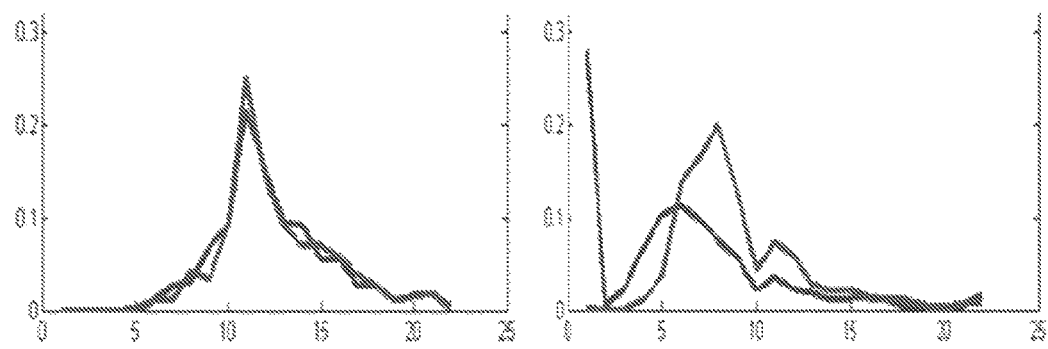

FIG. 16 shows typical AR biomarker expression histograms for progressive cancer (top left) and dormant prostate cancer (top right) according to some embodiments of the present invention. FIG. 16 also shows typical Ki67 biomarker expression histograms for progressive cancer (bottom left) and dormant prostate cancer (bottom right) according to some embodiments of the present invention.

In some embodiments of the present invention, apparatus, methods, and computer-readable media are provided for reducing the influence of segmentation errors while averaging biomarker positive objects by excluding no/poor signal regions (e.g. by avoiding zero pixel elements). The output of a segmentation of the nuclei image may be received. One or more (e.g., all) objects in the nuclei labeled image may be filled with its corresponding intensity in original nuclei image (e.g., DAPI image). For each filled nuclei label object, pixels below an intensity threshold (e.g., fixed threshold, e.g., zero) may be eliminated. For each filled nuclei labeled object, objects below a size threshold (e.g., fixed size threshold, e.g., 20 pixels) may be identified and removed. For each filled nuclei labeled object, the average intensity of the pixels may be calculated. The original nuclei labels may be filled with the corresponding average intensity values calculated.

In some embodiments of the present invention, apparatus, methods, and computer-readable media are provided for estimating and correcting for the noisy background of a biomarker image by sampling the signal in a band (or strip) region bordering a sub compartment (e.g., the cytoplasm). A biomarker image (e.g., AR image) may be received. A cytoplasm mask may be received. The cytoplasm mask may be dilated, for example, by a fixed size (e.g., 10 pixels). The original cytoplasm mask may be subtracted from the dilated mask to create a band. The biomarker image values may be sampled within the band and its average values may be calculated (e.g., after excluding pixels less than a fixed threshold, e.g., zero). The intensity of regions of the original biomarker image above a fixed intensity value (e.g., 5000) may be reduced by the calculated threshold value.

Feature Extraction

According to another aspect of some embodiments of the present invention, predictive features for use in predictive models are provided. Predictive models according to some embodiments of the present invention may be configured for use in treating, diagnosing, and/or predicting, for example, the occurrence (e.g., recurrence) of a medical condition (e.g., cancer) in a patient. In some embodiments of the present invention, one or more of the features described herein may be utilized within a predictive model that includes one or more morphometric features and/or one or more molecular features. Alternatively or additionally, in some embodiments, such predictive models may include one or more clinical features. Examples of suitable types of clinical, molecular, and morphometric features are described in, for example, commonly-owned U.S. application Ser. No. 12/584,048, filed on Aug. 31, 2009, which is hereby incorporated by reference herein in its entirety.

In some embodiments of the present invention, one or more of the features described herein may be extracted from images processed (e.g., pre-processed, segmented, and/or post-processed) according to some or all of the teachings set forth herein (e.g., according to FIGS. 1-16 and their corresponding descriptions). Illustrative systems and methods for, for example, generating predictive models based on one or more features and having various endpoints (e.g., prediction of disease progression or recurrence, likelihood of favorable pathology/indolent disease, automated Gleason grading of tissue images, etc.) are described in the commonly-owned applications listed at the end of the present specification, all of which are hereby incorporated by reference herein. In some embodiments of the present invention, one or more of the features described herein may be used within a predictive model predictive of one of these endpoints, or another endpoint. In some embodiments of the present invention, one or more of the features described herein may be extracted from a tissue image including segmentations of bright-field images, dark-field images, or other images. For example, in some embodiments, feature(s) described herein may be extracted from tissue images resulting from Hematoxylin and Eosin (H&E) staining, immunofluorescence (IF) detection, immunohistochemistry (IHC), similar and/or related staining processes, and/or other processes.

Ring Features

In some embodiments of the present invention, predictive features of glandular objects such as rings are provided. In some embodiments, these features are generated without using initial lumen segmentation. Rather, such rings may be detected based on nuclei geometry. A segmentation of nuclei of a cellular region into individually contiguous (or labeled) regions may be provided. The centroid of each nuclei region may be extracted and each image may then be partitioned into polygonal regions with epithelial nuclei at the vertices, for example, as described above with regard to Ring Segmentation and Ring Classification. FIG. 17 shows an example of ring segmentation on a dark-field image, which has been provided in black and white for ease of reproduction. In the original image, good rings were shown in red, rings with less than 50% border touching stroma were shown in yellow, rings with nuclei density less than 1.5 were shown in dark green, epithelial non-ring regions were shown in light green, stromal area with epithelial border was shown in black, confused/undefined area was shown in blue, and touching border/pathology mask was shown in black.

In some embodiments of the present invention, prognostic ring features are combined and/or averaged over, for example, part of an image or an entire image to create a family of image features. This family of image features may be parameterized in, for example, one or more of four ways:
(i) by statistic (two alternatives);
(ii) by region type (7 alternatives);
(iii) by weight (10+alternatives); and/or
(iv) by variable (20+alternatives),
thus potentially creating in total more than 4300 possible features. For example, a consistent feature naming convention may be formed as
"Statistic_Weight_RegionType_Variable".

Table 4 below describes statistics that may be used to generate ring features according to some embodiments of the present invention. In addition, Table 5 below describes regions, Table 6 below describes weight variables, and Table 7 below describes ring feature variables that may be used to generate ring features according to some embodiments of the present invention. Table 8 below describes examples of the features that may be generated for use within a predictive model in some embodiments of the present invention. In Table 8, a '+' in the "Dir" column means that a larger value is better for patient outcome.

TABLE 4

Ring Feature Statistics

| Statistic | Definition |
|---|---|
| Ratio<br>The "Ratio" method takes the weighted average of the variable within regions of type r, normalized over all regions. Region type r is a subset of {1, 2, 3}, 1: rings, 2: epithelial non-rings, 3: stromal regions | $$\frac{\sum_{j=1}^{num\_regions} regionflag_j \, weight_j \, variable_j}{\sum_{j=1}^{num\_regions} weight_j}$$<br>$regionflag_{rj}$ is an indicator function: = 1 if region j has region type r, or = 0 otherwise |

TABLE 4-continued

Ring Feature Statistics

| Statistic | Definition |
|---|---|
| Mean<br>The "Mean" method takes the mean of the weighted variable over regions of type r | $$\frac{\sum_{j=1}^{num\_regions} regionflag_{rj} weight_j variable_j}{\sum_{j=1}^{num\_regions} regionflag_{rj}}$$ |

TABLE 5

Ring Feature Region Types

| Region Type | Region Number | Description |
|---|---|---|
| Ring | 1 | Epithelial gland ring |
| NonR | 2 | Epithelial non-ring |
| Strom | 3 | Stromal region |
| Epi | 12 | Epithelial Ring or Non-ring |
| All | 123 | |

TABLE 6

Ring Feature Weights

| Weight | Desc |
|---|---|
| NumEN | Number of epithelial nuclei in region |
| AreaEN | Area of epithelial nuclei in region |
| NumBEN | Number of epithelial nuclei on border of region |
| AreaBEN | Area of epithelial nuclei on border of region |
| AreaCK | Area of CK18 mask in region |
| AreaCKL | Area CK + lumens of region type 1 rings |
| TotArea | Total area of region including CK, lumens and stroma |
| Perimeter | Length of region perimeter |
| Stouchlen | Perimeter × stouch (proportion of border touching stroma) |
| StouchAreaBEN | Area of border epithelial uclei adjacent to stroma |
| Num | =1 (used for counting rings) |
| Ltouch | Proportion of border adjacent to lumen or clearing = L/D (see diagram) |
| Stouch | Proportion of border adjacent to stroma |
| BorderGap | $2^{nd}$ largest gap between nuclei around border of region = d (see diagram) |

TABLE 6-continued

Ring Feature Weights

| Weight | Desc |
|---|---|

TABLE 7

Ring Feature Variables

| Variable | Desc |
|---|---|
| Ltouch | Proportion of border adjacent to lumen or clearing = LD (see diagram) |
| LumenRatio | Ratio of lumen or clearing to border gap = L/d (see diagram) |
| Stouch | Proportion of border adjacent to stroma |
| Stouchpxx | Stouch raised to power xx/10, eg., Stp05 = sqrt(stouch) |
| InvaStouchpxx | (1 − Stouch^xx/10) |
| Stouchxx | Stouch + xx/10 |
| SpLtouch | Stouch + Ltouch |
| SxLtouch | Stouch x Ltouch |
| StouchBEN | Proportion of epithelial nuclei adjacent to stroma |
| Sdist20 or Sd20 | Ratio border < 20 pixels from stroma, (variant of Stouch) |
| Sdist | Mean distance of region border from stroma |
| SdistStd | Stdev of distance of border from stroma |
| aaGn | =1 if feature aa > n, =0 otherwise |
| CkG2 | ck area >= 2000 pixels |
| BlobG4 | Blob area >= 4000 pixels |
| StG50 | Stouch > 50% |
| DiL30 | Diameter <= 30 |
| DeG15 | Density >= 1.5 |
| Blob | Connected epithelial unit in cytoplasm mask |
| Perimeter | Length of region perimeter |
| SoftaaGThr or xxGZThr | Soft thresholding of feature aa with linear ramp +/− 0.1 on either side of threshold = Thr/10 |
| Solid | 1 for regions with stouch < 0.4, =−1 for rings with stouch < 0.9, or 0 otherwise |
| Solidz4090 | soft thresholding of Solid – jumps at 0.5 |
| Solidz406090 | soft thresholding of Solid, without jump at 0.5 |
| Solidz4060 | soft thresholding = 1 for stouch < 0.3, =−1 for rings with stouch > 0.7 with ramps =/−0.1, centered at 0.4 and 0.6 |
| Solidzxxyy | ramps at xx/10, yy/10 |
| SolidStouch50 | (1-2stouch) for stouch < 0.5, (1-2stouch) for rings, or 0 otherwise |

TABLE 8

Example Ring Features

| Example Ring Features | Dir | Desc |
|---|---|---|
| EpiNucRing,<br>Ratio_AreaEN_x_Ring | + | = Ratio epithelial nuclei in rings with code = 1<br>$= \frac{\text{(epi nuc area with code 1)}}{\text{(total epi nuc area, excluding codes 4, 5)}}$ |
| EpiNucMidRed09,<br>Ratio_AreaEN_Ring_StG40 | + | $= \frac{\text{(epi nuc area with code 1 and stouch > 0.4)}}{\text{(total epi nuc area, excluding codes 4, 5)}}$ |
| EpiNucMidRed15,<br>Ratio_AreaEN_Ring_StG40_DeG15 | + | $= \frac{\text{(epi nuc area with code 1, stouch > 0.4, density > 1.5)}}{\text{(total epi nuc area, excluding codes 4, 5)}}$ |
| MeanLTouchRedS50,<br>Mean_LTouch_Ring_StG50 | + | = Mean of Ltouch for rings with code 1, stouch > 0.5 |
| EpiNucGreen,<br>Ratio_AreaEN_NonR | − | $= \frac{\text{(epi nuc area with code 2)}}{\text{(total epi nuc area, excluding codes 4, 5)}}$ |

TABLE 8-continued

Example Ring Features

| Example Ring Features | Dir | Desc |
|---|---|---|
| RatioRed, Ratio_Ring_vs12 | + | = (# rings with code 1) / (# rings with code 1 or 2) |
| RatioSeparateRed, Ratio_Ring_StG09_vs12 | + | = (# rings with code 1 and stouch >= 0.9) / (# rings with code 1 or 2) |

Table 9 below shows how ring prognostic features generated according to some embodiments of the present invention are associated with many aspects of the Gleason grading system such as, for example, the fusion of multiple rings in one epithelial unit, the degree to which rings touch lumen and stoma, the formation of epithelial sheets with and without cribriform rings, and the fragmentation of glands. The Gleason grading system is the gold standard for morphological analysis of H&E stained tissue images of the prostate. These aspects of Gleason grading have not previously been captured by automated systems as they depend on understanding the need for the combination of epithelial unit separation and gland ring segmentation processes and, to the inventors' knowledge, there are no previous epithelial unit separation processes. Previous gland ring processes have also been limited by the need for lumen seeds to initialize a propagation procedure, problematic for high Gleason grades where lumens shrink and disappear.

TABLE 9

Correspondence between Ring Features and Gleason Morphology

| Gleason Morphology | Region type 1, Stouch ranges | | | | Code 2 |
|---|---|---|---|---|---|
| | 1-0.9 | 0.9-0.5 | 0.5 = 0.1 | 0.1-0 | |
| 3Ring | + | | | | |
| 3Fragmented | +small | | | | + |
| 3-4Ring | + | + | | | + |
| 4Ring | | + | + | | |
| 4Fragmented | | + | + | | + |
| 4Cribrifrom | | | + | +hi density | |
| 4Solid | | | + | + | + |

Figure 18B:
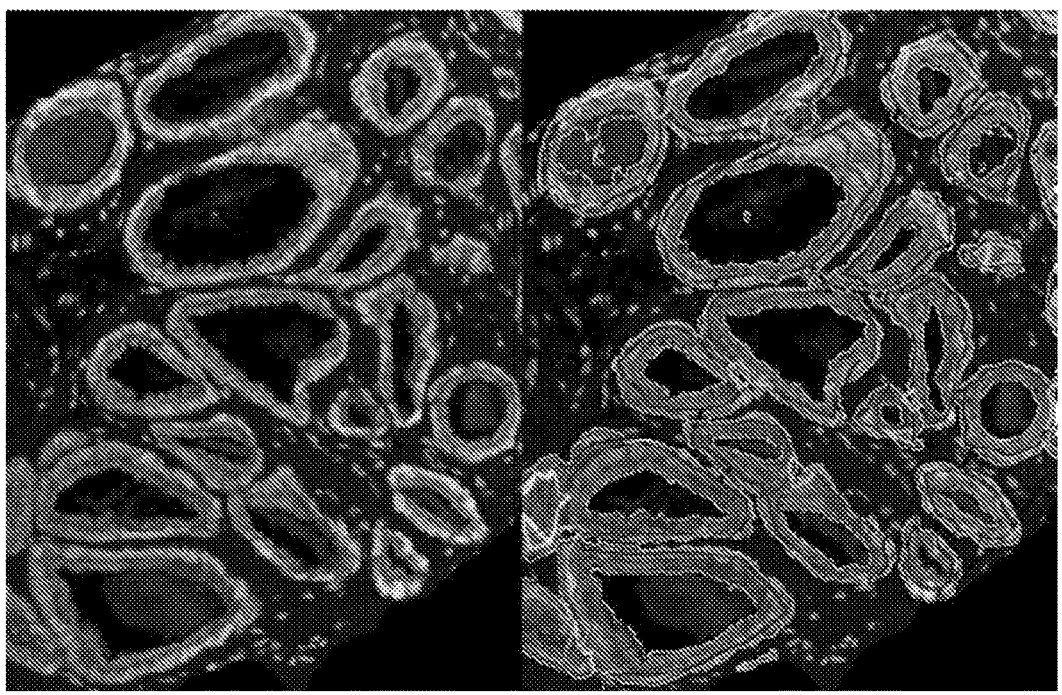
FIGS. 18B-D show images of gland rings detected on Gleason patterns 3, 4 and 5 in tissue according to some embodiments of the present invention.
Figure 18C:
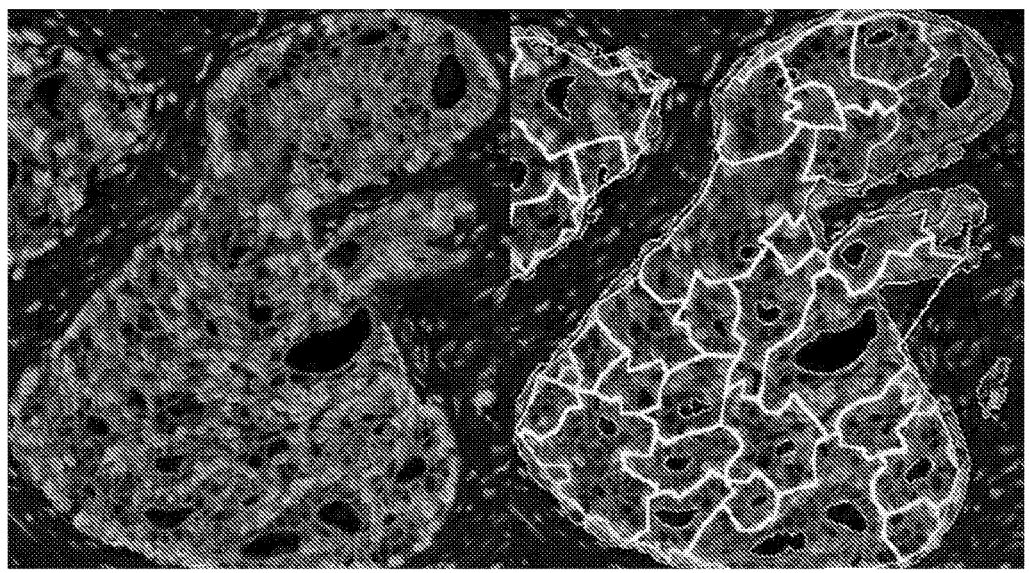
Figure 18D:
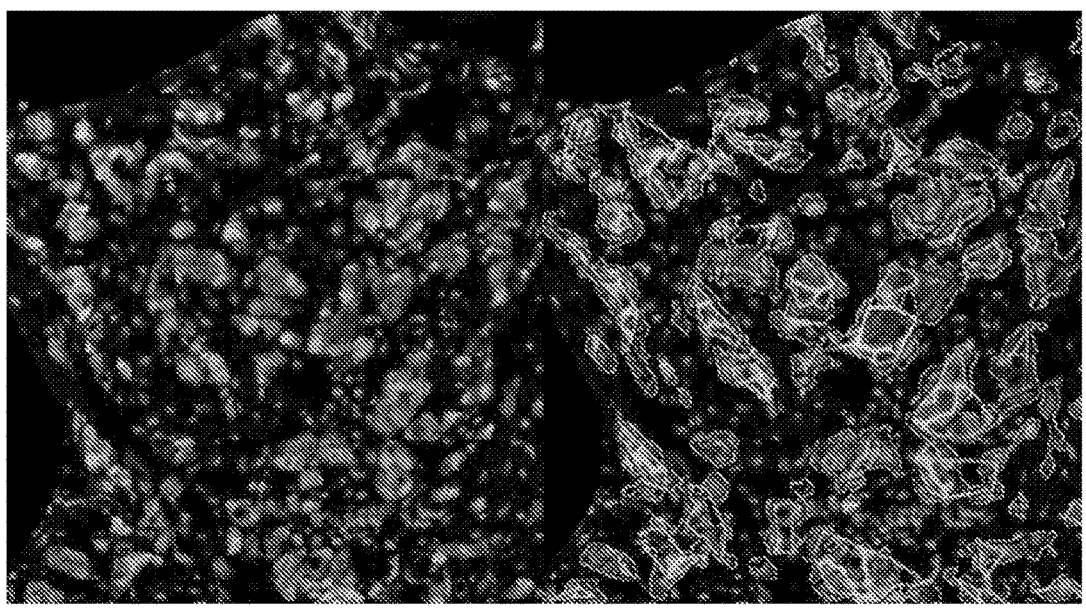

FIGS. 18B-D are images of gland rings detected on Gleason patterns 3, 4 and 5 in tissue according to some embodiments of the present invention. In the original images, fused rings with less than 50% of border touching stroma were shown in yellow, however, the images have been included in black and white herein for ease of reproduction.

Table 10 below provides additional information regarding the correspondence between features described above and gland architecture. For example, it demonstrates how aspects of glandular architecture including fused rings, lumens or clearings in rings, Cribriform, ring size, Non-ring nuclei clusters, Cytoplasm fragmentation, Cytoplasm border, Nuclei spacing, Ring Shape, Ring dimensionality, Ring spacing, Ring arrangement, and Stroma Nuclei are represented by the features. The 'CI per case' in Table 10 refers to the concordance index value calculated from the average feature values for each patient (e.g., by using the median feature values for each patient regardless of the number of images available for that patient). The 'Approx CI per image' refers to the concordance index values calculated from all the feature values of all the patients.

Further, rather than use the actual event time (e.g., event month=56), the outcome parameter consisted of a binary grouping of all the 'event' cases regardless of time into one group and all the 'non-event' cases regardless of censoring into another group.

TABLE 10

Features Categorized by Gland Architecture

| Gland Architecture | Representative Features | CI Per case | Approx CI per image |
|---|---|---|---|
| Fused rings | Ratio nuclei area in rings with stromal touch > S (50%), and lumen diameter > Diam (3 pixels), etc: | | |
| | RatioAreaNucsRedS50Diam30 | 0.71 | 0.63 |
| | RatioAreaNucsRedS50 | 0.71 | 0.63 |
| | RatioAreaNucsRed (==EpiNucRing) | | 0.63 |
| | Ratio nuclei area in rings with stromal touch > S (40%) and density ratio (d/b, see below) > 1.0, 1.5, 2.0 respectively: | | |
| | EpiNucMidRed10 | 0.71 | 0.64 |
| | EpiNucMidRed15 | 0.70 | 0.63 |
| | EpiNucMidRed20 | | 0.63 |
| | Ratio nuclei area weighted by stromal touch %: | | |
| | RatioAreaNucsRedStouch | 0.72 | 0.64 |
| | Ratio CK18 area weighted by stromal touch %: | | |
| | RatioAreaCKRedStouch | 0.70 | 0.62 |
| | Ratio border nuclei adjacent to stroma: | | |

TABLE 10-continued

Features Categorized by Gland Architecture

| Gland Architecture | Representative Features | CI Per case | Approx CI per image |
|---|---|---|---|
| | RatioAreaBNucsRedStouch | | 0.65 |
| | Ratio nuclei area weighted by lumen touch %: | | |
| | RatioAreaNucsRedLtouch | 0.66 | 0.65 |
| | Ratio border nuclei area weighted by lumen touch %: | | |
| | RatioAreaBNucsRedLtouch | | 0.66 |
| | Ratio nuclei in rings in epithelial blobs with <= 1, 2, 4 . . . rings | | |
| | EpiBlobRed1NucR | | 0.58 |
| | EpiBlobRed2NucR | | 0.59 |
| | EpiBlobRed4NucR | | 0.6 |
| | EpiBlobRed8NucR | | 0.61 |
| | EpiBlobRed16NucR | | 0.63 |
| | EpiBlobRed32NucR | | 0.62 |
| Lumens or clearings in rings | MeanLtouchRed | 0.64 | 0.63 |
| | MeanLumenRatioRed | | 0.63 |
| | MeanDensityRed | | 0.62 |
| Cribriform | Mean density (d/b) for fused rings, stromal touch < S (50%) | | |
| | Mean_DensityRings_Yellow_S50 | 0.62 | 0.56 |
| | Ratio nuclei touching lumen, not touching stroma | | |
| | RatioAreaNucsRedLtouchNotStouch | | |
| Ring size | Diameter of central clearing in good rings | | |
| | MeanDiameterRed_S50 | 0.59 | 0.56 |
| | Outer diameter of ring = approx. 4 area/perimeter | | |
| | MeanOuterDiameterRedS50 | 0.61 | 0.56 |
| | Average #nuclei in ring = #nucs/#rings = n/r | | |
| | Note: MST proportion edge 3 = approx. 2.5 r/n assuming that MST connects each ring to 2.5 other rings on average = 2.5/Mean_NumNucs_RedGreen | | |
| | MeanNumNucsRed_S50 | | 0.6 |
| | MeanNumNucsRedGreen_S50 | | 0.6 |
| Non-ring nuclei clusters | Ratio area nuclei in non-ring clusters | | |
| | RatioAreaNucsNonRing(=EpiNucGreen) | 0.33 | 034 |
| | Ratio area nuclei in small non-ring clusters (area < 2000) in bigger blobs (area > 4000) | | |
| | RatioAreaNucsNonRingSmallCK2BibBlob4 | 0.36 | 0.36 |
| | Ratio nuclei in non-ring clusters adjacent to good rings | | |
| | EpiBobRingRatioNumNucsNonRing (=EpiBlobRedNucG) | | 0.44 |
| Cytoplasm fragmentation | Ratio area nuclei in small non-ring clusters in small blobs | | 0.41 |
| | RatioAreaNucsGreenSmallCK2SmallBlob4 | | |
| Cytoplasm border | Mean, std of curvature | | |
| Nuclei spacing | Spacing around ring border (=approx. MST mean length): | | |
| | MeanBorderGapRedS50 | | 0.46 |
| Ring shape | Elongation feature: minor axis/major axis = approx 4Pi area/perimeter^2 | | |
| Ring dimensionality | # of different nuclei reachable in n steps or in a fixed distance along edges of the MST or Voronoi graphs | | |
| Ring spacing | Stromal area features | | |
| Ring arrangement | Sausage or Y arrangement of rings in CK blobs: MST of rings initialized with rings, without connections between rings - proportion edge 2 vs. proportion edge 3 of connecting edges | | |
| Stromal nuclei | Elongation, clustering | | |

Epithelial Unit Features

In some embodiments of the present invention, predictive features of glandular objects such as epithelial units are provided. Epithelial units may be generated from the process described above in connection with FIGS. 12A-D. In some embodiments of the present invention, one or more epithelial unit features may be constructed from basic measurements such as, for example, area or nuclei density. In some embodiments, one or more epithelial unit features may be constructed from the ring characterization processes described above in connection with the Ring Features. For example, in one embodiment, one or more epithelial unit features may be constructed using the weighted averaging method described above in Table 4.

Biomarker Features

In some embodiments of the present invention, predictive biomarker features are provided. In some embodiments, biomarker feature generation may begin with the segmentation of individual cellular objects (cell nuclei and cytoplasm) and sub-compartments (epithelia and stroma). Biomarker feature generation may include two steps: sub-compartment histogram generation and feature extraction. Histograms (e.g., epithelial and stroma histograms $H_E$ and $H_S$) may be extracted by binning actual signal colored objects (e.g., nuclei $B_r$), for example, in each sub-compartment separately. Epithelia and stroma histograms may be analyzed separately to obtain relative intensity features such as, for example, cumulative expressions at each α-th percentile.

Alternatively or additionally, the histograms also may be analyzed together to obtain features related to the relative expression of objects (e.g., epithelia and stroma nuclei), for example, at each α position. In some embodiments, fractional positive percentiles may be calculated.

Figure 19:
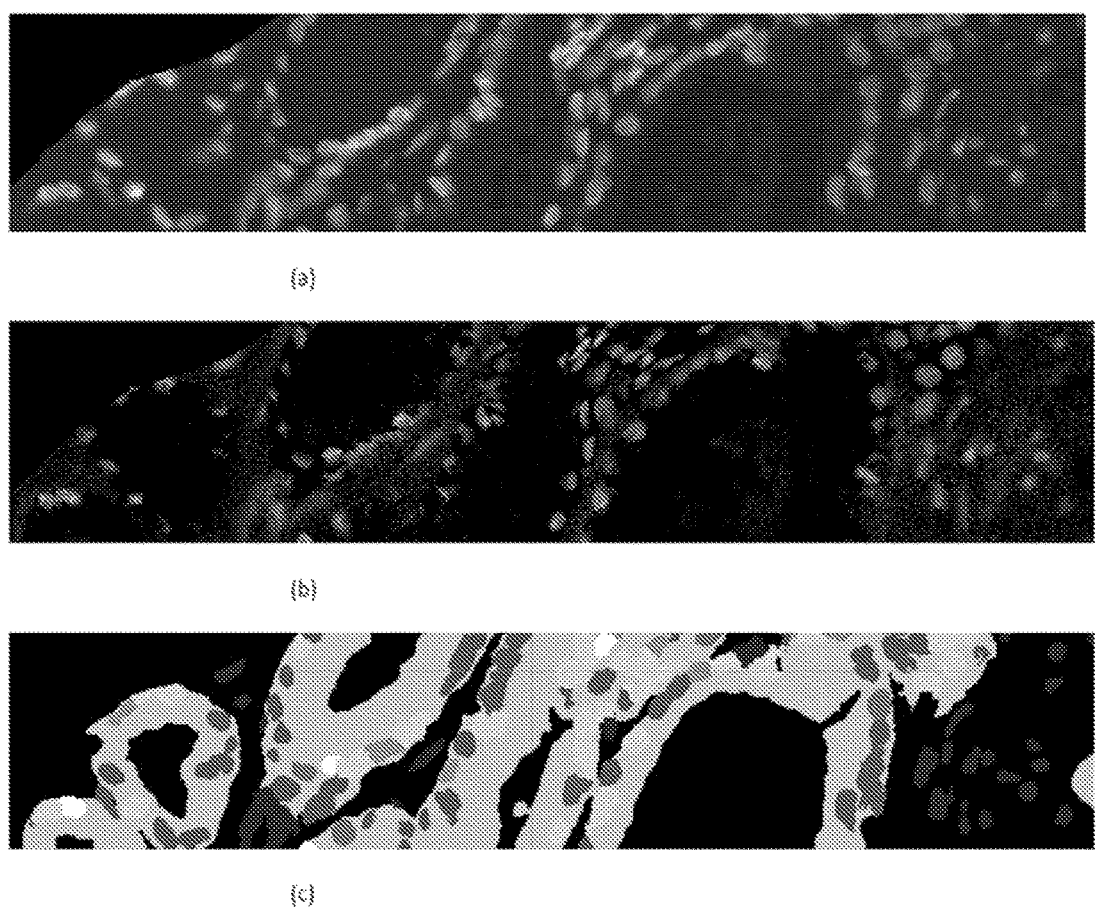
FIGS. 19 and 20 show illustrative AR and Ki67 segmented images according to some embodiments of the present invention.
Figure 20:
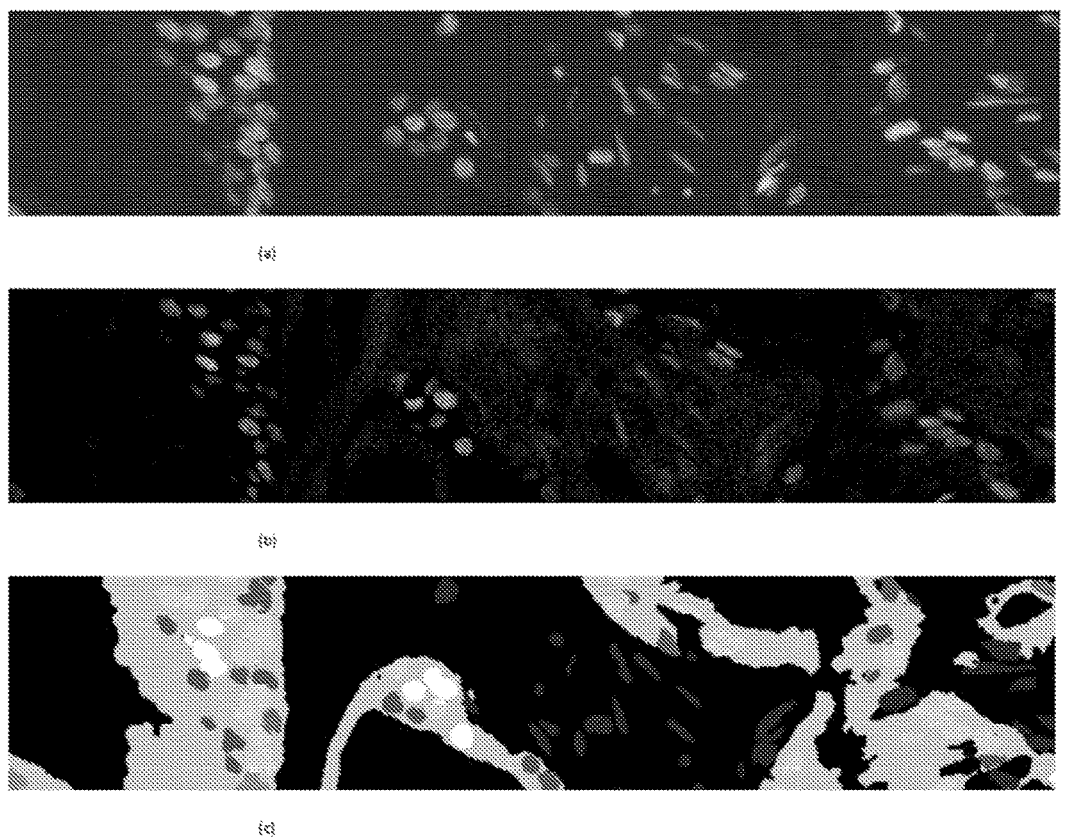

FIG. 19 shows an illustrative AR segmentation (image c) obtained from grayscale AR (image b) and DAPI (image a) expression images. FIG. 20 shows an illustrative Ki67 segmentation (image c) derived from gray-scale DAPI (image a) and Ki67 (image b) images. FIGS. 19 and 20 were originally in color but have been provided in black and white herein for ease of reproduction.

Table 11 below includes descriptions, according to some embodiments of the present invention, feature classes for AR (and Ki67) nuclei biomarkers with their favorable value indication and concordance index (CI) on a subset of 309 patients whose 980 biopsy images were studied.

TABLE 11

Descriptions of feature classes for AR (and Ki67) nuclei biomarkers

| Feature Name | Description | Favorable Value | CI on MV06 |
|---|---|---|---|
| AR_EpithDiffN | The difference between the fraction of epithelial nuclei whose intensity is greater than N % of the maximum nuclei intensity (positivity) and the fraction of stroma nuclei whose intensity is greater than N % of the maximum positivity | Low | 0.33 |
| AR_EpithRatioN | The ratio of the fraction of epithelial nuclei with intensity values greater than N % of maximum positivity to all nuclei (epithelial and stroma) above N % positivity | Low | 0.31 |
| AR_StromValueN | The fraction of stroma nuclei with intensity values lies between N % and (N + 25)% of the maximum intensity | High | 0.67 |
| AR_StromHistN | The fraction of stroma nuclei with intensity values that are less than N % of the maximum intensity | Low | 0.31 |
| AR_EpithAbsenceN | The fraction of nuclei whose intensity are between N % and (N + 10)% of the maximum intensity that are not epithelial nuclei | High | 0.65 |
| AR_EpithMaxRiseN | The ratio of the maximum intensity difference between all epithelial nuclei histograms bins that are N % apart to the maximum intensity difference between all stroma nuclei bins that are N % apart | Low | 0.35 |
| AR_EpithRelRiseN | The ratio of the intensity difference between N % and (100 − N)% positive epithelial nuclei to the intensity difference between N % and (100 − N)% positive stroma nuclei | Low | 0.35 |
| Ki67_PositiveFractionN | The fraction of epithelial nuclei above N % of the total positive value | Low | 0.33 |
| Ki67_PositiveRatioN | The number of epithelial nuclei whose normalized intensity value is greater than N % divided by the total number of epithelial nuclei | Low | 0.34 |

Table 12 below shows four examples of cases demonstrating relative values of certain AR features according to some embodiments of the present invention. Cases 1 and 2 had favorable outcomes while cases 3 and 4 had unfavorable outcomes. In some embodiments of the present invention, image processing and feature extraction as described herein can be applied to tissue samples obtained from biopsy or tissue micro array sections as it is robust to variability in image quality and heterogeneity in staining conditions. Advantageously, it may automate traditional methods of "normalizing" signal intensity by relative, objective appearance. In some embodiments, features constructed from the relative analysis of multi-compartment histograms as described herein are robust to tissue variations.

TABLE 12

Four examples cases demonstrating relative values of AR features (Cases 1 and 2 were favorable while cases 3 and 4 were unfavorable).

| Feature Name | Example Cases | | | | Favorable value |
|---|---|---|---|---|---|
| | Case 1 | Case 2 | Case 3 | Case 4 | |
| AR_EpithDiff90 | −0.03 | −0.02 | 0.03 | 0.03 | Low |
| AR_EpithRatio90 | 0.00 | 0.00 | 1.00 | 1.00 | Low |
| AR_StromValue50 | 0.10 | 0.12 | 0.01 | 0.02 | High |
| AR_StromValue75 | 0.06 | 0.04 | 0.00 | 0.00 | High |
| AR_StromHist30 | 0.52 | 0.56 | 0.82 | 0.77 | Low |
| AR_StromHist40 | 0.70 | 0.74 | 0.96 | 0.92 | Low |
| AR_StromHist50 | 0.83 | 0.83 | 0.99 | 0.98 | Low |
| AR_StromHist60 | 0.90 | 0.89 | 1.00 | 0.99 | Low |
| AR_StromHist70 | 0.94 | 0.96 | 1.00 | 1.00 | Low |
| AR_StromHist80 | 0.97 | 0.98 | 1.00 | 1.00 | Low |
| AR_EpithAbsence50 | 0.13 | 0.09 | 0.03 | 0.05 | High |
| AR_EpithAbsence60 | 0.06 | 0.06 | 0.01 | 0.01 | High |
| AR_EpithAbsence70 | 0.04 | 0.07 | 0.00 | 0.01 | High |
| AR_EpithAbsence80 | 0.03 | 0.02 | 0.00 | 0.00 | High |
| AR_EpithAbsence90 | 0.03 | 0.02 | 0.00 | 0.00 | High |
| AR_EpithRelRise95 | 81.07 | 85.28 | 193.58 | 205.51 | Low |
| AR_EpithRelRise90 | 83.64 | 83.26 | 207.74 | 191.48 | Low |
| AR_EpithRelRise85 | 83.33 | 82.61 | 199.09 | 207.20 | Low |
| AR_EpithRelRise80 | 77.43 | 91.21 | 204.06 | 196.60 | Low |
| AR_EpithRelRise75 | 75.72 | 92.32 | 215.09 | 185.77 | Low |

Texture Features

In some embodiments of the present invention, predictive texture features are provided. For example, in some embodiments, texture features may be obtained by analyzing the texture of nuclei (e.g., DAPI nuclei). As a disease progresses (example, from Gleason pattern 3 to 4), the texture of DAPI nuclei becomes coarser, making it advantageous to analyze textural differences.

Figure 21:
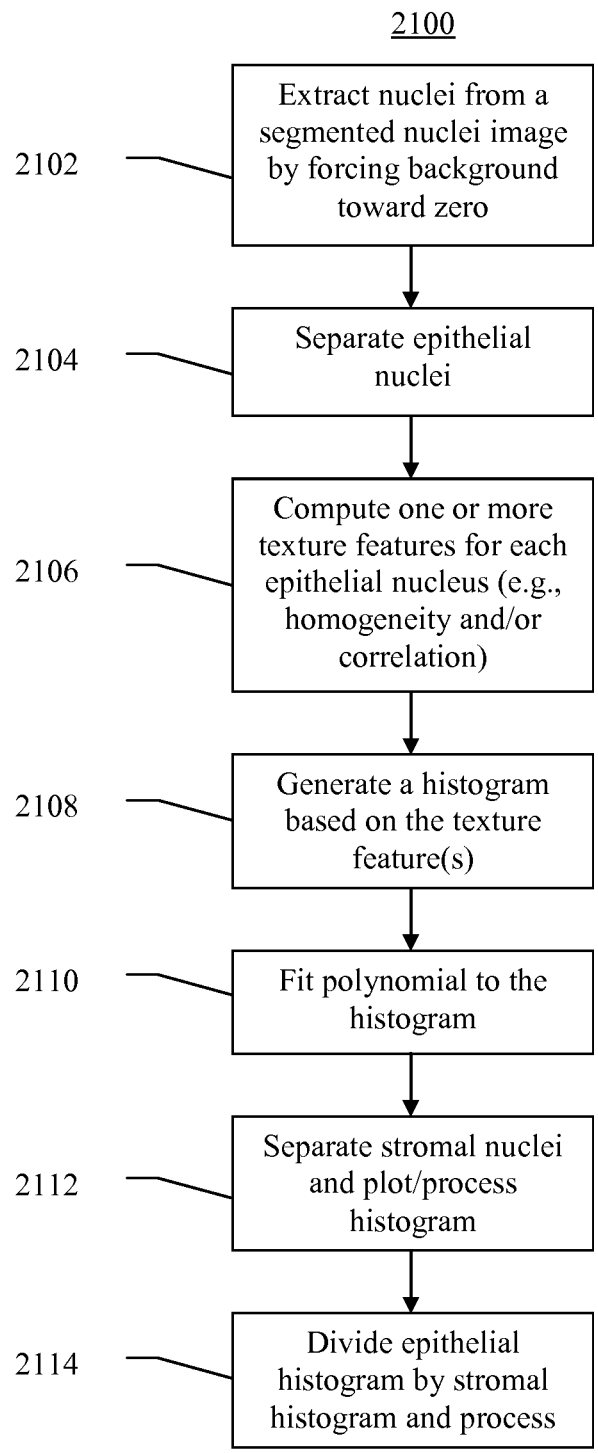
FIG. 21 is a flowchart of illustrative stages involved in extracting texture features from a tissue image according to some embodiments of the present invention.

FIG. 21 is a flowchart 2100 of illustrative stages involved in extracting texture features from a tissue image according to some embodiments of the present invention. At stage 2102, nuclei may be extracted (e.g., DAPI nuclei from a DAPI image) by forcing background to zero based on a segmented nuclei labeled mask. At stage 2104, epithelial nuclei may be separated using a cytoplasm segmentation mask or masks. At stage 2106, for each epithelial nucleus, one or more texture features including, for example, homogeneity and correlation may be computed. In some embodiments, homogeneity may be defined as:

$$\sum_{i,j} \frac{p(i,j)}{1 + |i-j|}$$

In some embodiments, correlation may be defined as:

$$\sum_{i,j} \frac{(i - \mu i)(i - \mu j) p(i,j)}{\sigma_i \sigma_j}$$

where, p(i,j) is obtained from a gray-level co-occurrence matrix that calculates how often a pixel with gray-level (grayscale intensity) value i occurs horizontally adjacent to a pixel with the value j.

At stage 2108, a histogram may be plotted based on the homogeneity and the correlation of the individual nuclei and, for example, the histogram may be normalized by dividing by the total sum (y-axis). In some embodiments, the histogram may also be stretched between 0 to 1 (x-axis).

Figure 22A:
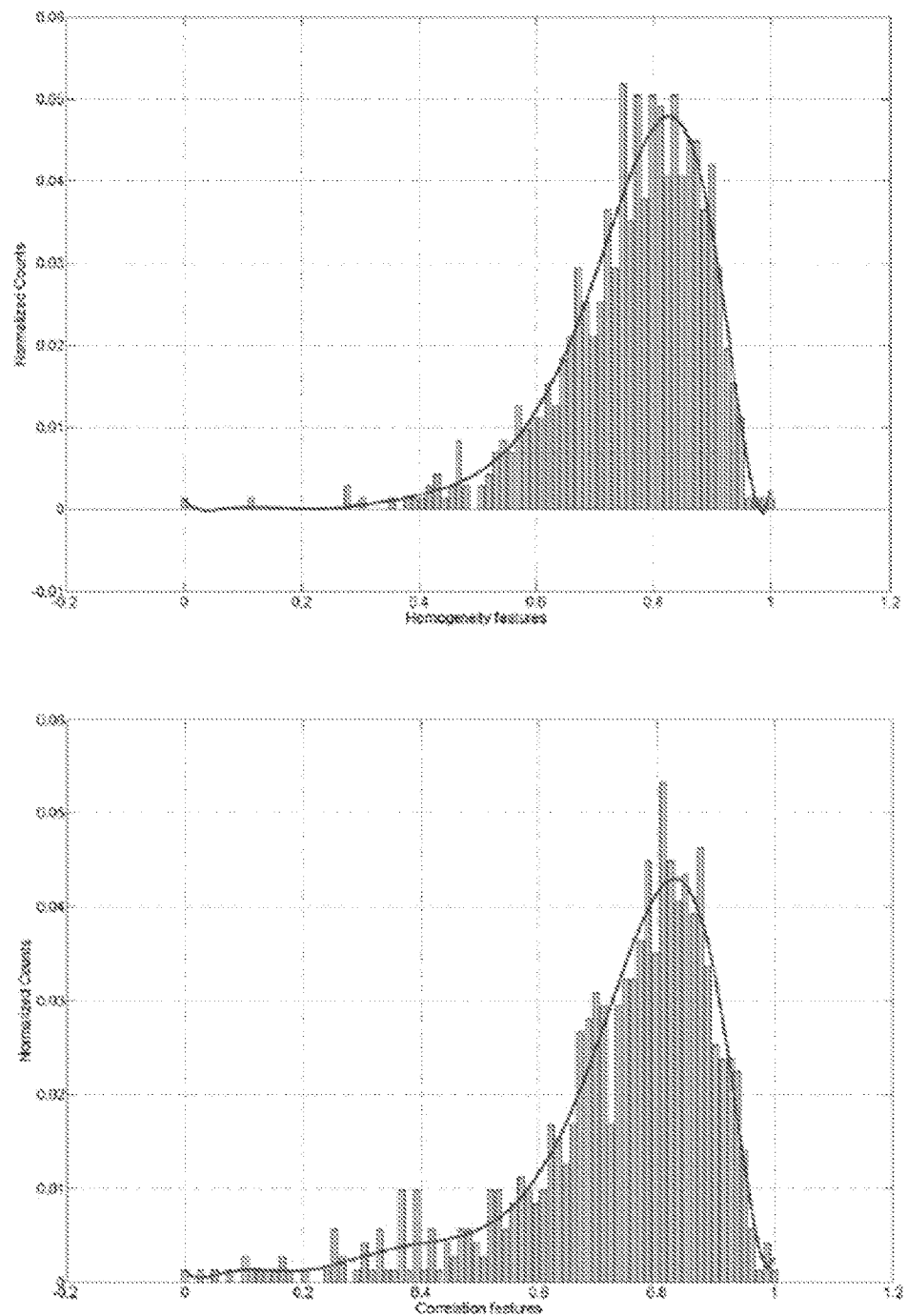
FIG. 22A shows histogram plots and corresponding polynomial curves fit of texture features homogeneity and correlation according to some embodiments of the present invention.

At stage 2110, a polynomial curve may be fit to the histogram to minimize or get rid of fluctuations in the count. In some embodiments, each bin for the fitted curve of the histogram may become a feature. FIG. 22A shows histogram plots and corresponding polynomial curves fit of homogeneity and correlation, wherein counts may be obtained from the curve for 80 bins that form 80 features for each category. In some embodiments, these features may be based on epithelial nuclei only (ho_epixx, cr_epixx).

At stage 2112, stromal nuclei may be extracted from the nuclei (e.g., DAPI) image and the histogram may be plotted using the same or a similar process as described above.

At stage 2114, the epithelial histogram of homogeneity and correlation may be divided by their respective stromal histograms. This may normalize the histogram between various images. A polynomial curve may be fit to the new histogram (e.g., ratio of epithelial and stromal histograms) to obtain a new set of features (ho_epistromxx, cr_epistromxx). In some embodiments of the present invention, the first and second histograms (e.g., epithelial and stromal histograms) could also be subtracted from each other or added together before extracting one or more predictive features based on a result thereof. In some embodiments of the present invention, a histogram normalization process may be used, for example, as an alternative or in addition to polynomial fitting. A suitable histogram normalization process according to some embodiments of the present invention is described in, for example, above-incorporated Gonzalez R. C and Woods R. E. Digital Image Processing, Second Edition, Prentice-Hall Inc, 2002.

Example 1: Ring Feature Generation

Features were developed for predicting significant prostate cancer disease progression (including treatment resistance, metastasis and death-of-disease) post radical prostatectomy (RP) from IF images of positive biopsies. This study employed a multi-institutional cohort of 306 patients. Formalin fixed, paraffin embedded biopsy tissue samples for patients treated with RP between 1989 and 2003 for localized or locally advanced prostate cancer (cT1c-cT3) were studied. The samples were labeled with the DAPI counterstain, and the CK18 biomarker, and were imaged using a CRI Nuance multispectral imaging system. After an experienced pathologist manually reviewed images to make sure that the segmentations were accurate, gland ring features were defined as proportions of epithelial nuclei in several categories, Table 13.

TABLE 13

Feature definitions

| Feature | Description |
|---|---|
| S-touch | Proportion of ring border touching stroma |
| EpiNucRing | Proportion of epithelial nuclei in gland rings (red) |
| EpiNucGreen | Proportion of epithelial nuclei in glandular non-rings (green) |

TABLE 13-continued

Feature definitions

| Feature | Description |
|---|---|
| EpiNucMidRed | Proportion of epithelial nuclei in gland rings (red) with S-touch > 0.4 |
| RatioRed | (# gland rings)/(# gland rings (red) + # glandular non-rings (green)) |
| OguWigu5x | Morphological lumen-based H&E feature for comparison: Proportion of epithelial nuclei in symmetrical gland-unit areas around lumens |

The "EpiNucRing" feature is analogous to the H&E "OguWigu5x" feature, which is described in Donovan et al., "Personalized Prediction of Tumor Response and Cancer Progression from the Prostate Needle Biopsy," Journal of Urology, 2009, 182: 1, 125-132, which is hereby incorporated by reference herein in its entirety. The "EpiNucGreen" feature is almost the inverse of the "EpiNucRing" feature. Since few epithelial nuclei occur in fragments within stromal areas, they are generally classified as either gland ring or non-ring. This is borne out in the cross-correlation between these two features of −0.91, Table 14.

TABLE 14

Feature cross correlations in the range −1 to 1, comparing the proposed IF features to a H&E gland-unit feature (OguWigu5x)

| | F2 | F3 | F4 | F5 |
|---|---|---|---|---|
| F1: OguWigu5x | 0.52 | −0.3 | 0.32 | 0.08 |
| F2: EpiNucMidRed | 1 | −0.48 | 0.44 | 0.06 |
| F3: EpiNucGreen | −0.48 | 1 | −0.91 | −0.77 |
| F4: EpiNucRing | 0.44 | −0.91 | 1 | 0.79 |
| F5: RatioRed | 0.06 | −0.77 | 0.79 | 1 |

The IF feature with the highest correlation to OguWigu5x, 0.52, is EpiNucMidRed, which is a filtered version of EpiNucRing excluding rings which do not touch stroma for at least 40% of their boundary. This has the effect of reducing the gland ring nuclear proportion for areas of densely merged epithelial units, such as cribriform sheets.

Concordance indices (CIs) in Table 15 below are calculated comparing feature values to the time elapsed between when the biopsy was performed and the occurrence of significant disease progression (metastasis or death as a result of prostate cancer). EpiNucMidRed is correlated to and more stable than the H&E "OguWigu5x" feature described above. The correlation is related to the correlation between the touching stroma and the touching lumens present in good rings. All the features except EpiNucGreen correlate positively with outcome, having CIs greater than 0.5, meaning that a higher value of the feature is better for the patient. This interpretation corresponds with the clinical and pathological correlation of glandular objects with disease progression. It is interesting to note the advantageous operation of the epithelial unit separation process to increase the CI of the EpiNucMidRed feature up to 0.70. This can be explained as a more accurate and generally larger value for S-touch, the percentage of border touching stroma, now including parts of the border where epithelial units touch but are not fused together. These features have been further refined by, for example, replacing the hard thresholds of stouch >40% and density >1.5 in EpiNucMidRed by soft linear ramp thresholds from, for example, 0.3 to 0.5 for stouch and from 1 to 2 for density. This results in greater robustness of CIs over different datasets. The updated version of this feature is named Ratio_AreaEN_Ring_SoftStG40_DeG15, as shown in Table 8 above.

TABLE 15

Univariate concordance indices comparing the proposed IF features to a H&E gland-unit feature (OguWigu5x)

| Feature | CI w/out CK18 Separation | CI with CK18 Separation |
|---|---|---|
| OguWigu5x | 0.63 | n/a |
| EpiNucMidRed | 0.64 | 0.70 |
| EpiNucGreen | 0.40 | 0.33 |
| EpiNucRing | 0.63 | 0.64 |
| RatioRed | 0.61 | 0.65 |

Example 2: AR and Ki167 Features

5 µM sections of formalin-fixed paraffin-embedded human prostate tissues were rehydrated and stained using DAPI and CK18 as well as androgen receptor (AR) and Ki67. The biomarker emissions were captured using a Nuance multispectral camera at 20× by 10× resolution. Non-cancer tissue regions were masked out from the image. A cohort of 926 images from 306 patients was used. The segmentation of the nuclei and cytoplasm objects was based on the DAPI and CK18 images. The univariate concordance index for each of four features (two each from the AR and Ki67 biomarkers) was calculated. The selected features are described in Table 16 below.

TABLE 16

Predictive histogram features for nuclei biomarkers

| Biomarker | Feature | CI |
|---|---|---|
| AR | Difference between the histogram of epithelial and stroma expression at the 95-100% bin level. The higher the worse for the patient as it means there are significantly more bright epithelial nuclei than stroma nuclei. | 0.33 |
| AR | Fraction of bright stroma nuclei within the 90-100% bin of all expressions. The higher the better for the patient as it means the stroma nuclei are almost as bright as (or brighter than) epithelial nuclei. | 0.69 |
| Ki67 | Difference between histogram of epithelial and stroma expression at the 0-5% bin level. The higher the better for the patient as it means there are significantly more dull epithelial nuclei than stroma nuclei. | 0.65 |
| Ki67 | Fraction of epithelial nuclei that have an expression above the 25-30% bin of all expressions. The higher the worse for the patient as it means the epithelial nuclei in have a brighter average expression than the stroma nuclei. | 0.36 |

Two multivariate models were also trained in the context of a systems pathology paradigm. In this example, disparate information from patient's clinical (e.g., age), histological (via image features extracted from hematoxylin and eosin-stained tissue specimens, and molecular (via features measuring the expression of protein biomarkers) profiles were combined in a supervised learning framework to predict cancer recurrence. One of the models utilized features from a previous method while the other utilized features described herein. Analysis show a 0.04 improvement in the predictive power (CI) of the model based on the new features.

Androgen receptor (AR) and Ki67 biomarker expression in prostate biopsy samples were quantified and extracted histogram features were shown to be associated with disease progression in a univariate analysis. It manifested improved performance over prior systems. The features were also selected in a multivariate model integrating other clinical and histological features, proving their independent prognostic value. The utility of this integrated approach to biomarker quantification was demonstrated by predicting prostate cancer disease progression within eight years after a radical prostatectomy.

Ring Combination Features

In some embodiments of the present invention, predictive features are provided that are combinations of other features, for example, biomarker features with gland morphology features. In some embodiments, the combined features may adapt the prognostic weight of other features with particular morphological architecture of the tissue image. For example, in one embodiment, AR biomarker intensity values are generated and combined with ring features for each ring in an image. The combined AR biomarker and ring values for each ring are then aggregated over, for example, the entire tissue image using a Naïve Bayes probability or other method.

According to various embodiments of the present invention, one or more of the following approaches may be used for generating combined features. First, features may be localized per ring. Second, features may be multiplied by one or more features within a morphologic parameter set (e.g., Gleason triangle components). Third, the features may be combined by, for example, multiplying the feature values (e.g., first converting the feature values into probability values and then combining them by multiplying their Naïve Bayes probability values). Each of these approaches is described in greater detail below.

Localizing Features Per Ring:

in some embodiments, this approach may involve calculating the value of a feature at each ring in an image. The process of calculating the feature value at each ring may take into account information from the all or some part of the tissue image (e.g., the average epithelial value, the maximum stroma value, and the image intensity value).

Example 1

Per Gland Relative Rise AR value at 70% (ARRR70) is calculated from the value of the 70% of the histogram of AR values per ring and the value of the 70% of the histogram of AR value in all of the stroma. It is further normalized by a ratio, N, which is a function of the number of nuclei in the ring.

ARRR70=(AR 70% rise in ring/AR 70% rise in stroma)Sqrt($N/(N-1)$)

Example 2

Per Gland Ki67 Positive Ratio (Ki67PR) is calculated from the number of positive Ki67 nuclei in a ring and the number of epithelial nuclei in that ring.

Ki67PR=Number of positive Ki67 in ring/Number of epithelial nuclei in ring

Multiplying Features by a Morphologic Parameter:

in some embodiments according to this approach, morphologic parameters provide a partial classification of a ring into two or more morphologic categories, where the sum of the partial classification values obtained equals 1.

Example 1

The morphologic parameter "Gleason triangle" includes (e.g., consists of) three components: "pattern 3", "pattern 4 fragmented" and "pattern 4 sheet" as shown in Table 17 below. These components characterize different aspects of the morphology of the glandular region. Each ring classified using the Gleason triangle may have three component classification values which sum to 1. Two examples are shown in the table. In the first example the region has "s" partial classification value in the range 0 to 1 (alternatively, has "s" partial membership) to the "pattern 3" component of the Gleason triangle. It also has "1-s" partial classification value to the "pattern 4 sheet" component and "0" classification value to the "pattern 4 fragmented" component. The second region has "0", "s", and "1-s" partial classification values to "pattern 3", "pattern 4 fragmented" and "partial 4 sheet" components, respectively. Isolated rings may have a high "s" value while fused rings or sheets may have a low "s" value. Thus, "s" could be the 'stouch', 'ltouch', or similar feature value described above in connection with the Ring Features.

TABLE 17

| Description of Gleason triangle features | | | |
|---|---|---|---|
| | Pattern 3 | Pattern 4 fragmented | Pattern 4 sheet |
| Region Type | s3 | s4f | s4s |
| 1 | S | 0 | 1 - s |
| 2 | 0 | s | 1 - s |

Combining Features:

in some embodiments of the present invention, according to this approach there may be one or more (e.g., four) different schemes for combination of feature values, as illustrated below in connection with Table 18. These may include: localization per gland, localization per image, naïve Bayes per ring, and naïve Bayes per image. The schemes may make use of a technique that converts a prognostic feature into an approximate event probability by a least squares linear fit of the feature to 0 (non-event) or 1 (event). An alternative scheme may replace 0 and 1 by the event time. When the event time is unknown or censored, an iterative scheme can update the event times subject to the censoring constraints to optimize the outcome probability. In some embodiments, this linear rescaling of the feature does not change the concordance index (CI) or the prognostic value of the feature, but allows the feature to be treated as a probability value.

TABLE 18

Comparison of Feature Combination Schemes

| Suffix | Feature scheme | Example with s = stouchxLtouch | Approx CI Set 1 | Approx CI Set 2 |
|---|---|---|---|---|
| xxLG | Localized per ring | SLt3xARRR7SLt4FxARRR7SLt4SxARRR7n3LG | 0.724 | 0.819 |
| xxLI | Localized per image | SLt3xARRR7SLt4FxARRR7SLt4SxARRR7n3LI | 0.721 | 0.825 |
| xxNBG | Naïve Bayes per ring | SLt3xARRR7SLt4FxARRR7SLt4SxARRR7n3NBG | 0.731 | 0.771 |
| xxNBI | Naïve bayes per image | SLt3xARRR7SLt4FxARRR7SLt4SxARRR7n3NBI | 0.734 | 0.785 |

Example 1

Localizing per ring ARRR70. This involves multiplying the ring values of ARRR70, by each of the three morphology components (s3, s4f, and s4s). A weighted average of the resultant AR components is then taken over the image as shown in Table 4—"Ring Feature Statistics", using the nuclei area as a weight function and normalizing over region types 1 and 2. A least squares fit of these three components to 0 (non-event) or 1 (event) creates a probability score which is the output feature value.

Example 2

Localizing per image ARRR70. This involves calculating the weighted average of the ARRR70 per ring feature over the entire image, and the weighted average of the Gleason triangle components per ring over the entire image. The weighting method here uses nuclei area as a weight and normalizes over region types 1 and 2. The weighted average of ARRR70 and each of the three morphology components are multiplied to obtain three values. A least-squares fit of the result to 0 (non-event) or 1 (event) to creates a probability score which is the output feature value.

Example 3

Naïve Bayes per ring ARRR70. This involves multiplying the ring values of ARRR70, by each of the three morphology components (s3, s4f, and s4s). A weighted average of the resultant AR components is then taken over the image, as in Example 1. The three components are separately converted into three probability scores (p3, p4f, p4s) which are then combined assuming the non-event probabilities are independent using the formula:

Probability score=$1-(1-p3)(1-p4f)(1-p4s)$

Example 4

Naïve Bayes per image ARRR70. This involves calculating the weighted average of the ARRR70 per ring feature over the entire image, and the weighted average of the Gleason triangle components per ring over the entire image as in Example 2. The weighted average of ARRR70 and each of the three Gleason components are multiplied to obtain three values which are separately converted into three probability scores (p3, p4f, p4s). The three probability scores are then combined assuming the non-event probabilities are independent as in Example 3.

Example 5

Localizing per image 'minimum spanning tree (MST) proportional edge 3' feature which is described in above-incorporated Donovan et al., "Personalized Prediction of Tumor Response and Cancer Progression from the Prostate Needle Biopsy," Journal of Urology, 2009, 182: 1, 125-132. This involves calculating the weighted average of the 'MST proportional edge 3 features' per ring over the entire image, and the weighted average of the Gleason triangle components per ring over the entire image. The weighting method here uses nuclei area as a weight and normalizes over region types 1 and 2. The weighted average of 'MST proportional edge 3' feature and each of the three morphology components are multiplied to obtain three values. A least-squares fit of the result to 0 (non-event) or 1 (event) to creates a probability score which is the output feature value.

Example 6

Localizing per image energy feature which is described above in connection with FIG. 6C. This involves calculating the weighted average of the energy features per ring over the entire image, and the weighted average of the Gleason triangle components per ring over the entire image. The weighting method here uses nuclei area as a weight and normalizes over region types 1 and 2. The weighted average of the energy feature and each of the three morphology components are multiplied to obtain three values. A least-squares fit of the result to 0 (non-event) or 1 (event) to creates a probability score which is the output feature value.

Example 7

Localizing per image a high molecular weight cytokeratin (HMWCK) feature. HMWCK is a biomarker whose absence in epithelial units defines invasive cancer. This involves calculating the weighted average of the HMWCK feature per ring over the entire image, and the weighted average of the Gleason triangle components per ring over the entire image. The weighting method here uses nuclei area as a weight and normalizes over region types 1 and 2. The weighted average of the HMWCK feature and each of the three morphology components are multiplied to obtain three values. A least-squares fit of the result to 0 (non-event) or 1 (event) to creates a probability score which is the output feature value.

Figure 22B:
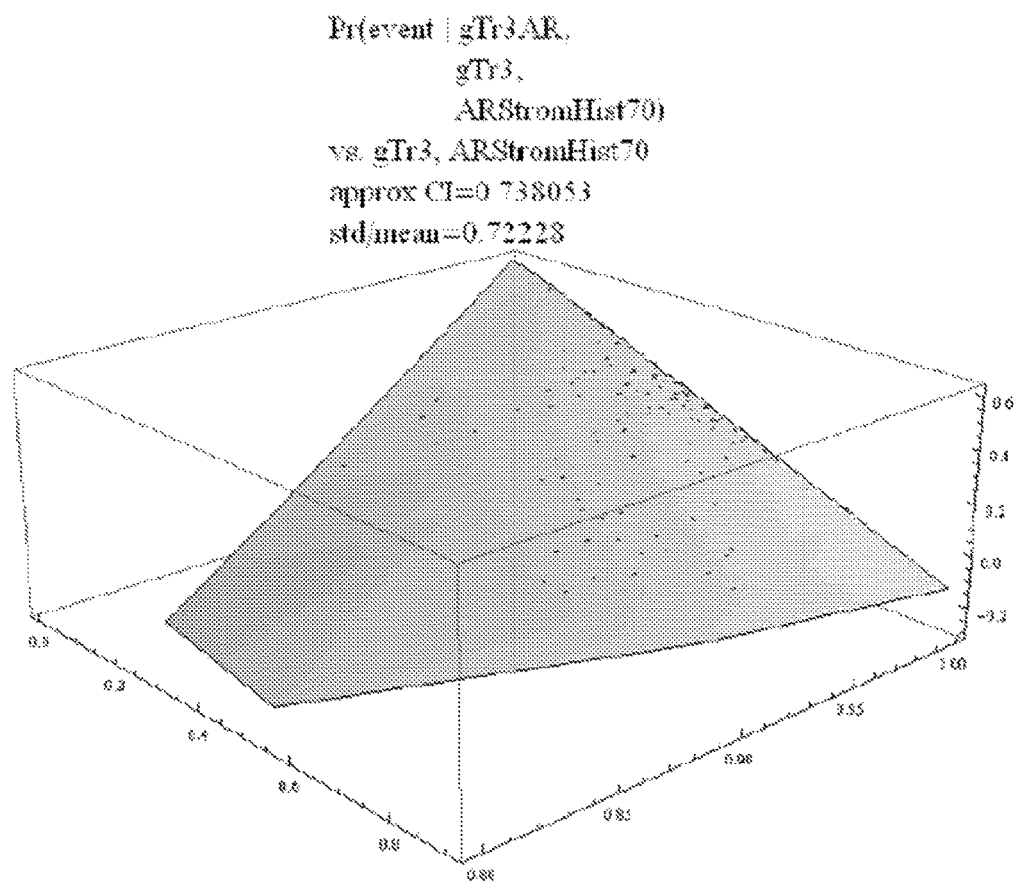
FIG. 22B shows an example of bilinear feature combination according to some embodiments of the present invention.

In some embodiments of the present invention, instead of using the Gleason triangle components, the triple ["s", "b", "sb"] (where "s" is a morphological component and "b" is a biomarker or other feature and "sb" is their product) could be used. This morphological parameter set can be utilized with the four schemes described above. The "Localized per image" scheme creates a bilinear interpolation of "s" and "b" probability scores. This is shown in FIG. 22B, which shows an example of bilinear feature combination. In the original image, red dots were early events, and blue dots were late events, with AR axis 0.8-1, morphology (gTr3=stouch) axis 0-1, event probability vertical axis. FIG. 22B has been included herein in black and white for ease of reproduction. Differing prognostic values of the biomarker at low and high values of the morphological feature can be seen as different slopes of the surface at low and high values.

Stability Analysis

Figure 23A:
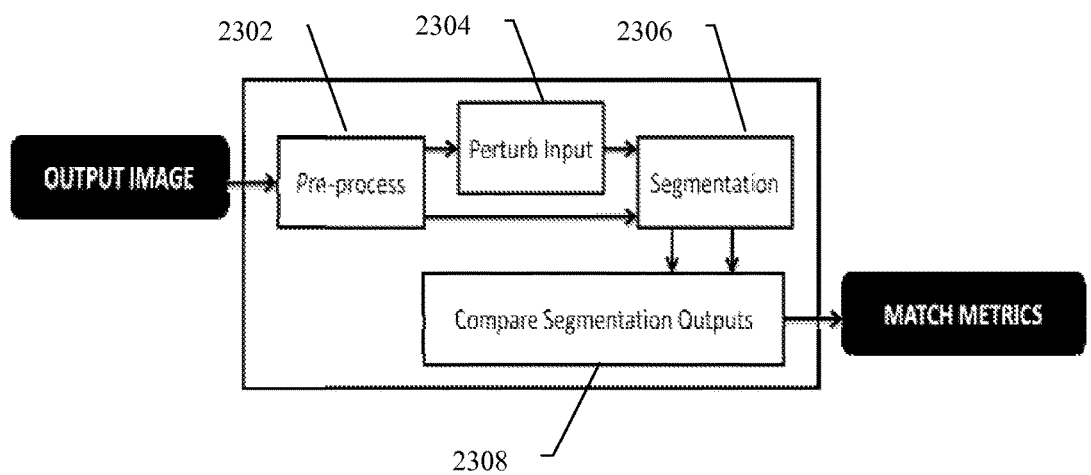
FIG. 23A is a flowchart of illustrative stages involved in assessing the performance of one or more segmentation algorithms, for example, without using ground truth images, according to some embodiments of the present invention.

FIG. 23A is a flowchart 2300 of illustrative stages involved in assessing the performance of one or more segmentation algorithms according to some embodiments of the present invention. Advantageously, in some embodiments, process 2300 may operate without the use of ground-truth images. This is in contrast to prior approaches for segmentation evaluation, which usually involve evaluating a segmentation result using one-to-one segmentation object comparison to manually-obtained, known ground-truth, and which assume that the ground-truth images are accurate, reliable and representative of the entire image set. These assumptions frequently are not met in applications such as image cytometry where ground-truth delineation is tedious and only a handful of ground-truth images are used in practice. Also, after a segmentation process is deployed, monitoring segmentation quality obtained from images that were not used to develop the process can become a critical issue, yet without ground-truth images obtained from the new images being tested only the subjective assessment of an expert is possible. Thus, embodiments of the present invention that evaluate segmentation results without the need for ground-truth solve these and other problems. In other embodiments of the present invention, based on statistical and partition stability analysis, images (e.g., tissue images) may be ranked based on how difficult they are to segment, for example, for the purpose of automatically identifying difficult images and removing them from a cohort of images for use in an image analysis application. In some embodiments of the present invention, stability analysis may be used to select predictive or prognosis features for use in, for example, a predictive model.

Figure 24:
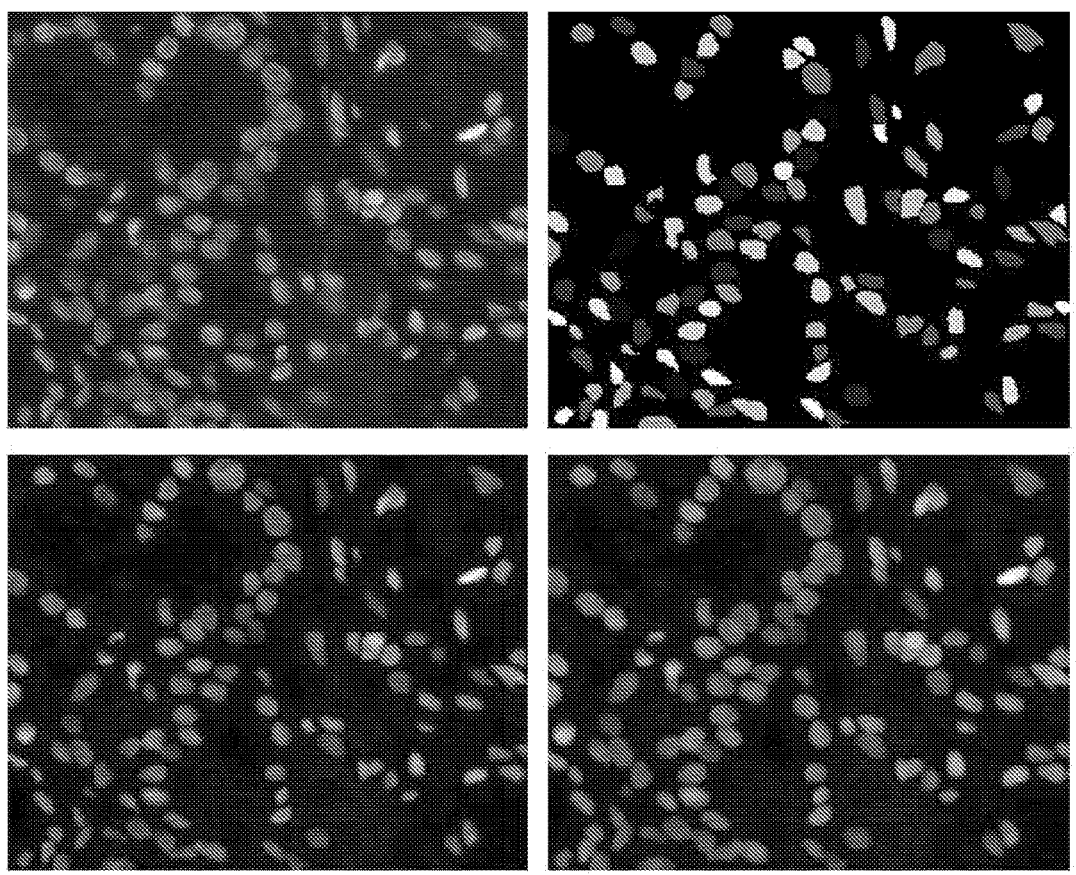
FIG. 24 shows the result of the process shown in FIG. 23D for generating phantom images for use in ground-truth based segmentation assessment, where the original image (top, left) and ground-truth mask (top, right) are used to generate phantom images (bottom, left) and (bottom, right)

An input image may be received at stage 2302 (e.g., an input image resulting from preprocessing according to process 200 (FIG. 2)). At stage 2304, one or more perturbed variants of an image of tissue are generated by applying a perturbation (e.g., slight linear blur) to the image. For example, FIG. 24 shows an original image (top, left) and a phantom image (bottom, left) having different blur and variance parameters.

At stage 2306, the original and perturbed (e.g., slightly blurred) images are then segmented using one or more segmentation processes. For example, statistical stability analysis may be applied to multiple, different segmentation processes under consideration to rank the stability of such segmentation approaches. In some embodiments, the most stable segmentation approach is selected for use in the development of predictive models and/or evaluation of tissue images for new patients to be evaluated by existing models.

At stage 2308, a match between the segmentation output of the original image to the segmentation output of each of its slightly perturbed variants is then evaluated to assess stability and produce one or more match metrics. For example, in an illustrative implementation, 48 realistic phantom images obtained from actual biopsy prostate cancer tissue were utilized. The images contained only cancer tissue as all non-cancerous regions were previously masked out.

Table 19 below provides a comparison of the approach for segmentation evaluation according to some embodiments of the present invention to traditional ground truth based validation. Embodiments of the present approach arise from, for example, the observation that segmentation errors can be classed as statistical or structural. Statistical errors reflect failure to account for random variations in pixel values while structural errors result from inadequate image description models. Observations show that statistical errors predominate image analysis, for example, in cytometry.

TABLE 19

| Criteria | Ground-truth based validation | Stability-based validation |
| --- | --- | --- |
| Evaluation method | Metrics measure the overlap between an algorithm's output of an image to the image's ground-truth | Metrics measure the consistency of segmenting perturbed versions of an image using the algorithm |
| Possibility of use after algorithm deployment | No | Yes |
| Representativeness of results | Generalization to larger image sets is necessary but often difficult | Generalization to larger image sets is not required |

Stability Example 1: Analyzing and Ranking Segmentation Algorithms

Figure 23B:
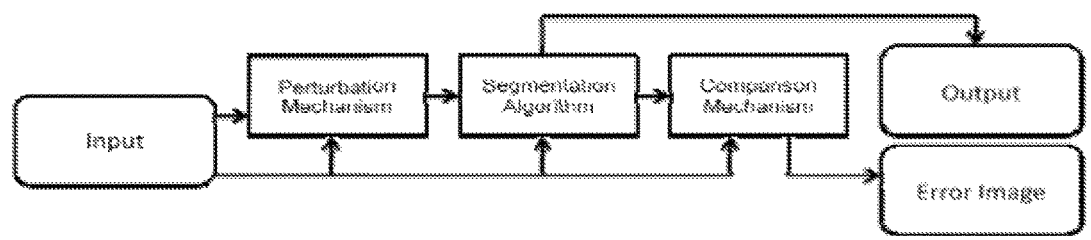
FIG. 23B is a flowchart of illustrative stages involved in determining the stability of an image or segmentation by statistical stability analysis.
Figure 23C:
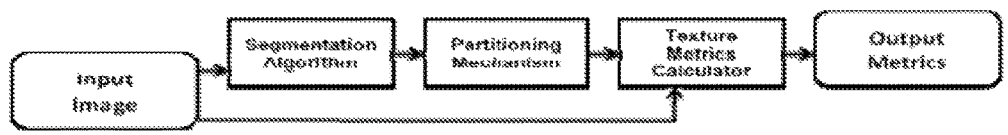
FIG. 23C is a flowchart of illustrative stages involved in determining the stability of an image or segmentation by partition stability analysis.
Figure 23D:
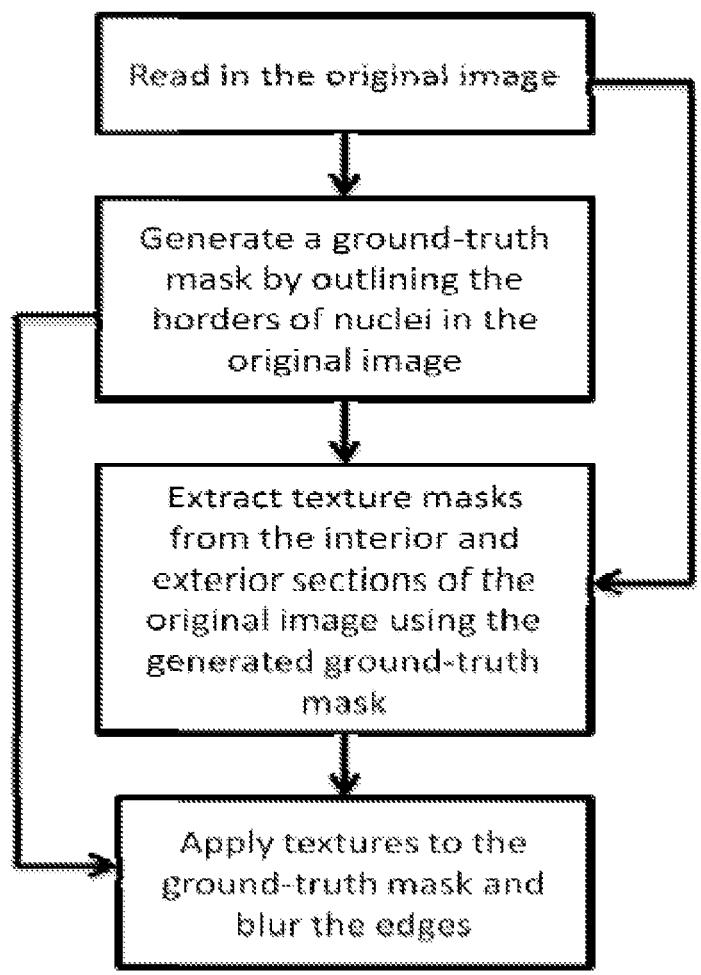
FIG. 23D is a flowchart of illustrative stages for generating phantom images for use in ground-truth based segmentation evaluation.

Ground-truth images were created for each of 48 phantom images using the process shown in FIG. 23D. Four different segmentation approaches with varying, and large, performance differences were evaluated. The purpose was to see how well the statistical perturbation method would distinguish the performance of these approaches using their segmentations of the phantom images. For each segmentation approach-image pair, a ground truth match score and four different statistical validation scores were obtained. Analysis of the results of this showed that statistical validation and ground-truth validation scores correlate in over 96% of cases. The statistical validation approach reduces segmentation review time and effort by over 99% and enables assessment of segmentation quality long after an algorithm has been deployed.

More specifically, sixteen 5 μM sections of formalin-fixed paraffin-embedded human prostate tissues were rehydrated and stained using nuclear counterstain 4'-6-diamidino-2-phenylindole (DAPI) and cytokeratin 18 (CK18). DAPI and CK18 emission images were captured using a Nuance multispectral camera at 20× by 10× resolution. Non-cancer tissue regions of the DAPI-CK18 images were digitally masked out by a pathologist. As a result, three gray levels were present in the images: the masked area (black), tissue background (dark gray), and tissue foreground (bright regions representing the nuclei or cytoplasm). Three ground truth images were created from each of the 16 DAPI-CK18 images using a semi-automatic labeling tool. The generated ground truth was reviewed by two senior pathologists.

Ground Truth Generation:

The ground truth images were obtained using a semi-automatic procedure that involves manual delineation of the boundaries of cells using a border tracing tool. It allows selection of points along the boundary of interest that approximate its spline control points which it uses to calculate the best B-spline approximation of the closed curve. The user can edit the curve by adding or deleting points. The shape of the cells in the phantom images were traced from actual prostate cancer cells using the semi-automated tracing tool. The texture of the nuclei, cytoplasm and background were sampled from the actual images and registered to the ground truth images. Care was taken to replicate any texture variations along the border of the actual images on the phantoms. Effort was made to normalize the statistical distribution of the overall intensity and the distribution of the phantoms to match those of the actual image templates. FIG. 24 shows the actual images, labeled ground truth mask and two of the three phantom images generated from the texture of the actual images and the ground truth mask. Specifically, the top, left image is of actual prostate cancer tissue used to generate the phantom images. The top, right image is a labeled ground truth mask obtained by tracing nuclei from the actual prostate cancer image. The bottom right and left images are phantom images obtained from the images above, respectively. The phantom images have different blur and variance parameters.

Image Processing and Segmentation Approaches:

FIGS. 25A-25D show four different image processing and cellular segmentation approaches according to some embodiments of the present invention. These approaches included modular components for binarization (of the nucleus image), binarization (of the cytoplasm image), seed-detection (of the nucleus image), size estimation (of the nucleus image), segmentation (of the nucleus image), segmentation (of the cytoplasm image), edge-refinement (of the cytoplasm image), pre-processing (of the nucleus image), hole-filling (of the cytoplasm image), and artifact removal (of the nucleus image) using, for example, the corresponding processes for these modular components described above (e.g., pre-processing as set forth in process 200 (FIG. 2)).

Figure 25A:
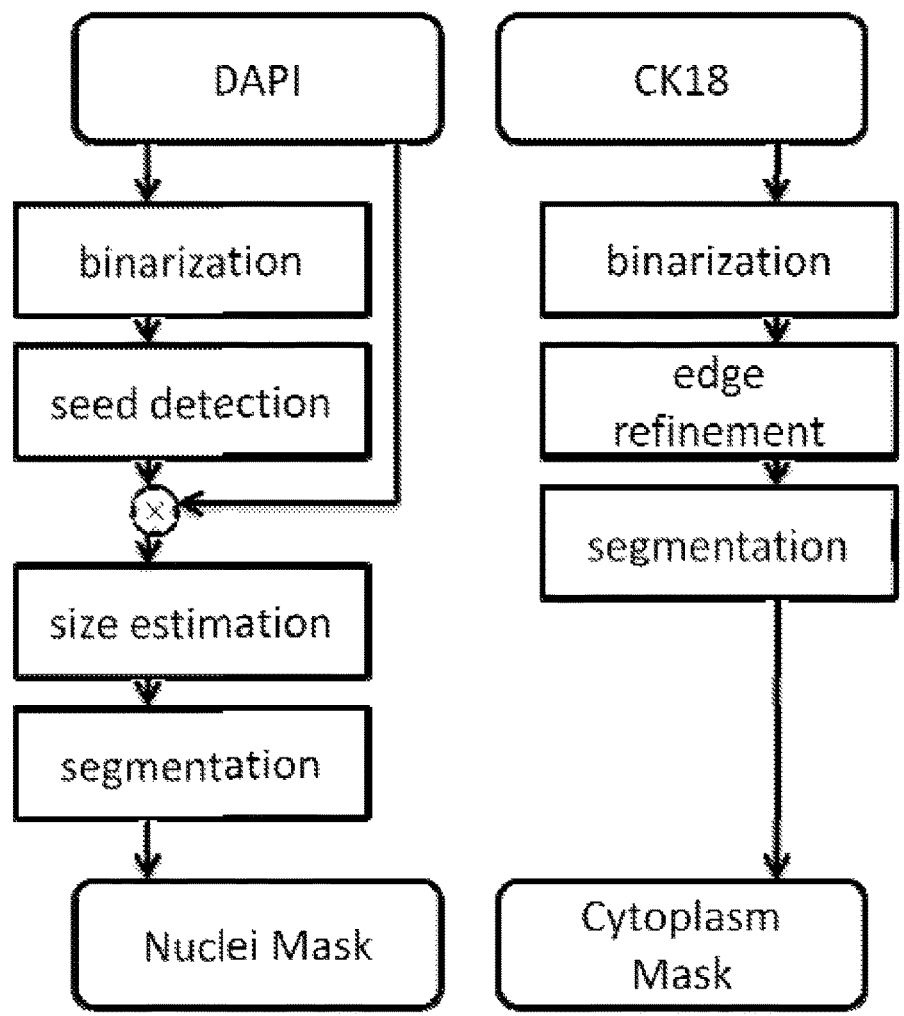
FIGS. 25A-25D show four different image processing and segmentation approaches according to some embodiments of the present invention.
Figure 25B:
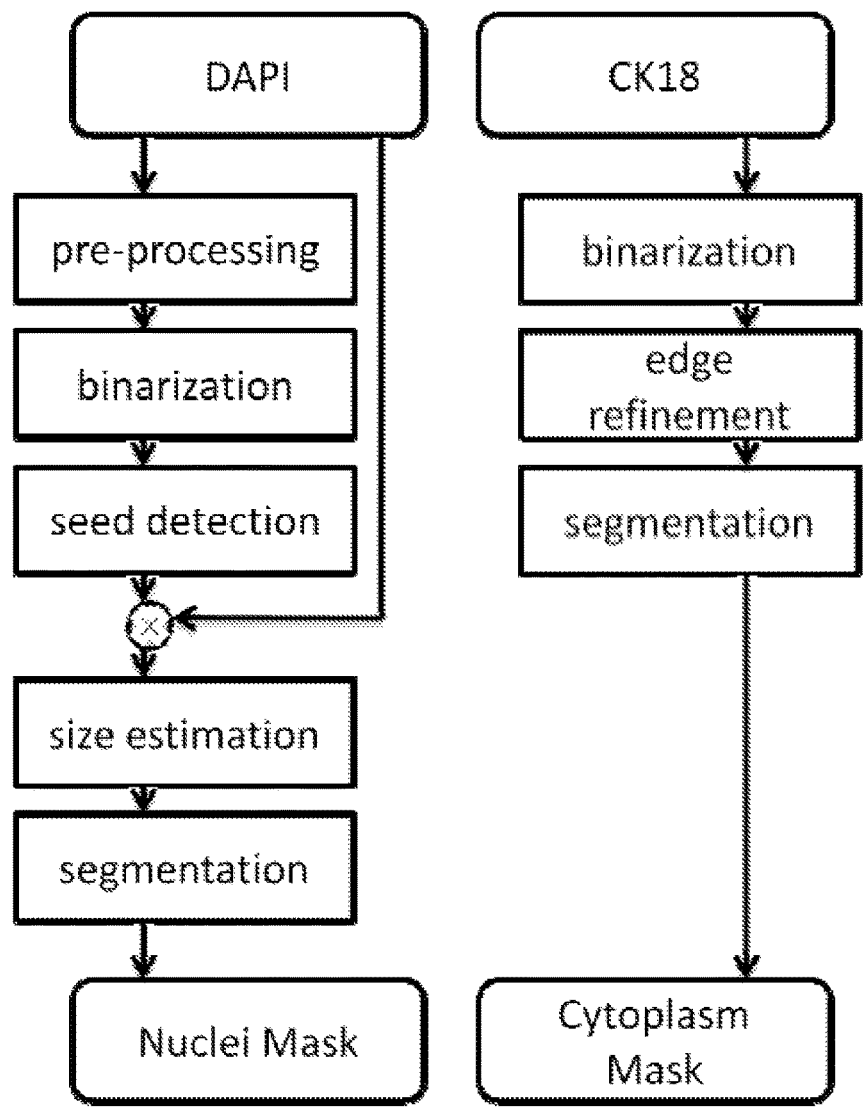
Figure 25C:
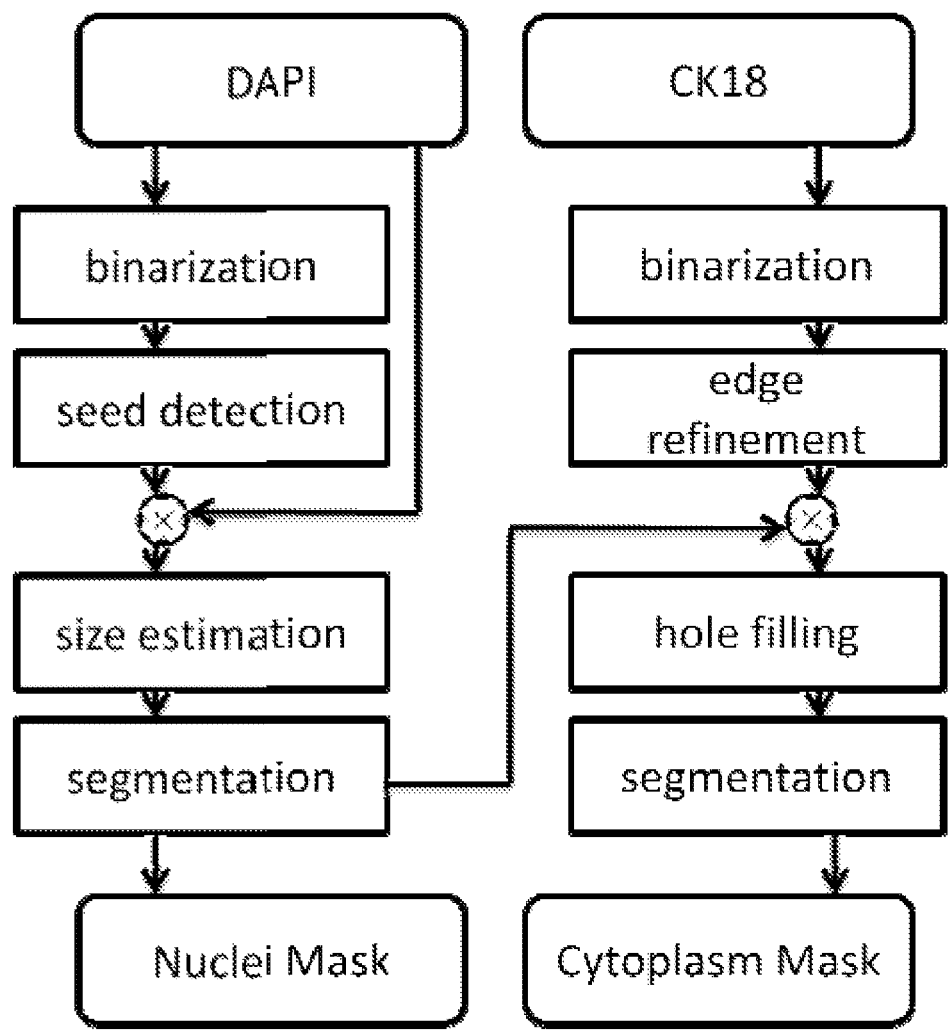
Figure 25D:
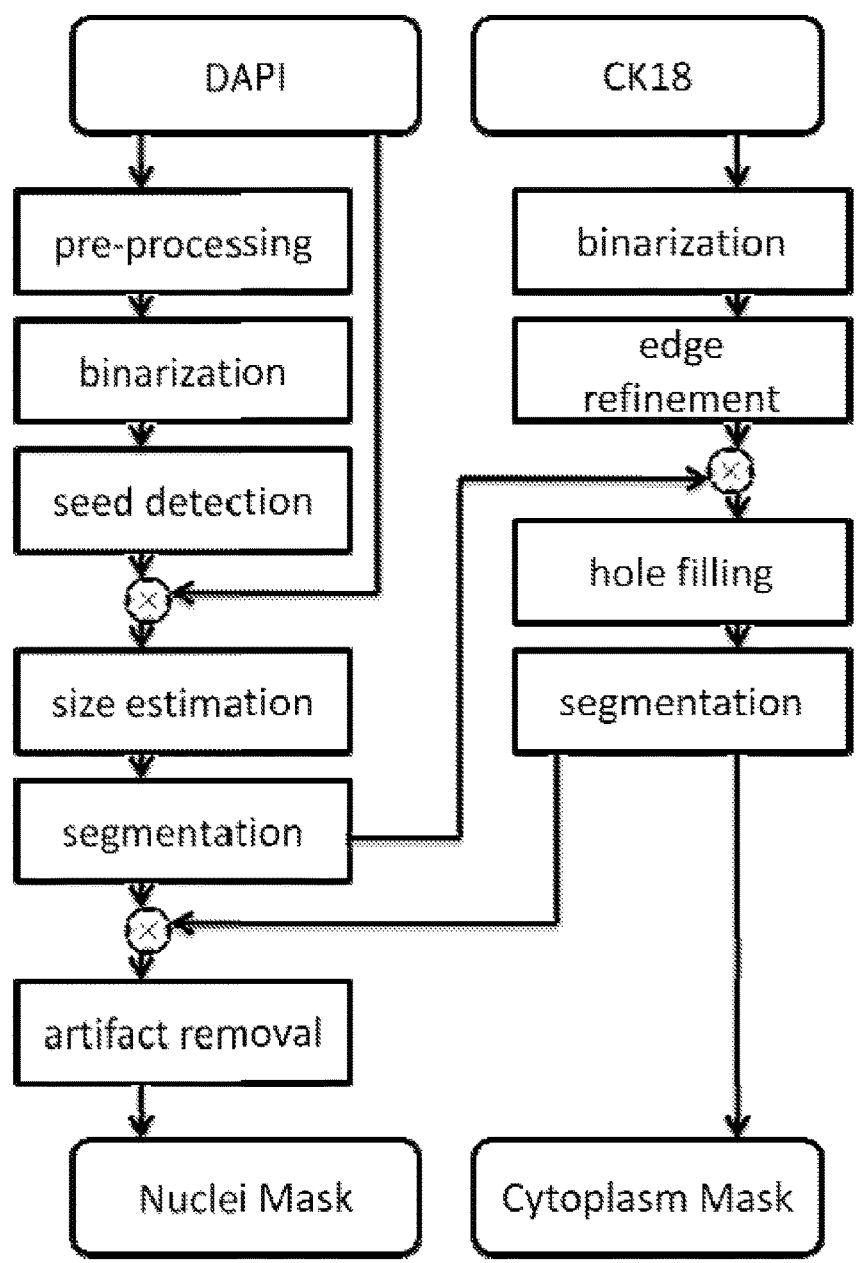

The approach shown in FIG. 25A was the simplest including (e.g., consisting of) binarization, seed-detection, size estimation and segmentation of the nucleus image and parallel binarization, edge-refinement and segmentation of the cytoplasm image. The approach shown in FIG. 25B has in addition a pre-processing step including (e.g., consisting of) non-uniformity correction of the original DAPI image (described in detail above according to some embodiments). The approach shown in FIG. 25C does not utilize the pre-processing step but uses the nucleus mask to fill holes in the cytoplasm mask. The approach shown in FIG. 25D contains all the foregoing steps, which are described above according to various embodiments.

Figure 25E:
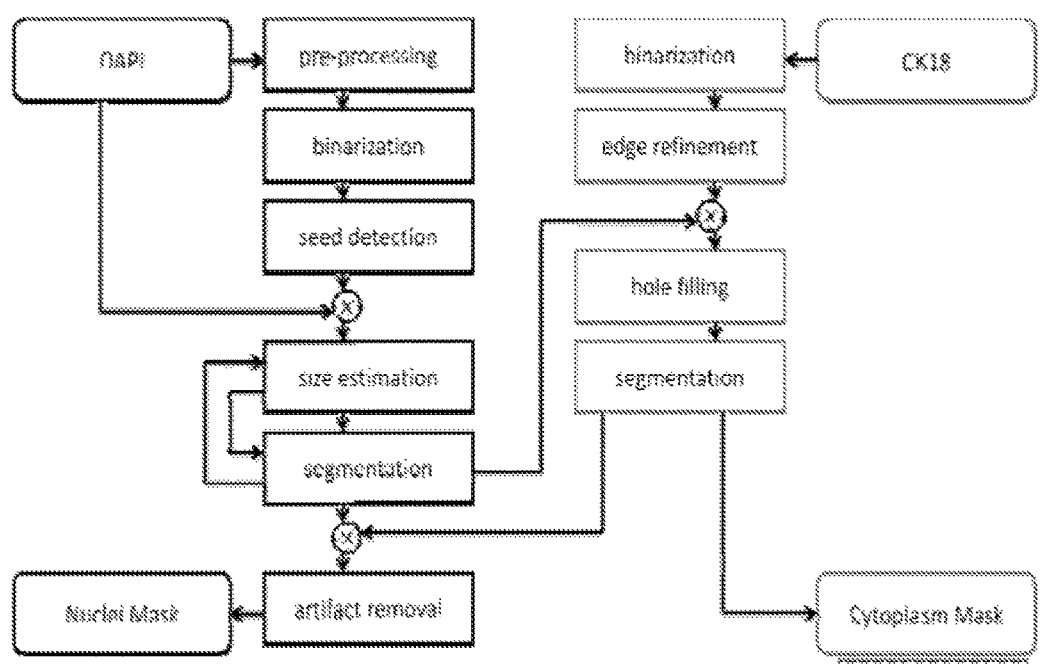
FIGS. 25E-F show another image processing and cellular segmentation approach according to another embodiment of the present invention, which includes an iterative size estimation process.
Figure 25F:
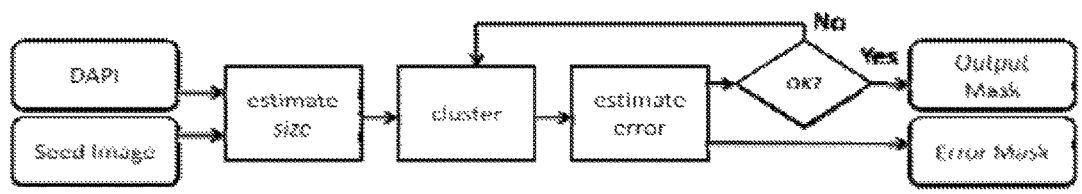

FIGS. 25E-F show another image processing and cellular segmentation approach according to another embodiment of the present invention, which includes an iterative size estimation process. In some embodiments, the nuclei (e.g., DAPI) image is pre-processed and binarized prior to segmentation using seeded local maximum clustering. The nuclei segmentation and the binarized and edge-refined cytoplasm (e.g., CK18) image are used to fill holes in the cytoplasm mask. Cytoplasm segmentation may use a watershed algorithm. The cytoplasm mask may be used to detect candidate nuclei objects that may be artifacts in the nuclei mask. Learned characteristics of these objects (e.g., including their sizes, shapes and/or textures) may be used in artifact detection. Illustrative stages involved in the iterative process are shown in FIG. 25F. In some embodiments, an input nucleus image (e.g., DAPI image) and an initial estimate of the nuclei seeds contained in a seed image is used in a size estimation process that produces, for example, an estimate of the size of each nucleus. This estimate may be used in a clustering process to produce an initial estimate of the nucleus boundaries. A stability analysis process (e.g., shown in FIG. 23B) creates a measure of the stability of each nucleus boundary, for example, in the form of an error mask. A decision process assesses the error mask and adjusts the nucleus boundaries until, for example, an acceptable partitioning as described by the values in the error mask is achieved. The output of the process is a nucleus segmentation mask and an error mask.

Statistical Stability Approach:

Perturbed variants of each of the input images were generated using [1 8 1] or [2 6 2] convolution kernels in each of four directions (top-to-bottom, right-top-to-left-bottom, right-to-left, and right-bottom-to-left-top) to obtain eight variants in total. Referring to FIG. 23B, in some embodiments of the present invention an input image may be perturbed to create one or more variants. The input image and all its variants may be segmented by a segmentation process. The output obtained from segmenting each of the variants may be compared to the output obtained from segmenting the input image using a match metric (e.g. Dice similarity coefficient). Mismatches created in this comparison stage are output, for example, in the form of an error image.

Partition Stability Approach:

Illustrative stages of the process are shown in FIG. 23C. In some embodiments of the present invention, an input image may be segmented and/or partitioned by a partitioning system. The partitioning system may perform morphological operations such as, for example, morphological erosion and/or morphological dilation, to create one or more of a foreground, foreground band and a background. In some embodiments, the texture feature used may be energy, for example, defined as:

$$\sum_{i,j} p(i,j)^2$$

where, p(i,j) is obtained from the gray-level co-occurrence matrix that calculates how often a pixel with gray-level (grayscale intensity) value i occurs horizontally adjacent to a pixel with the value j. One or more arithmetic operations (e.g., division or subtraction) may be applied to one or more partitions. The resulting texture metrics in two or more partitions may be compared and the output of this comparison may be utilized as a measure of stability.

Statistical Stability Validation Metrics:

Extensions of the basic Dice and Jaccard image similarity metrics were derived to the case of: 1) multiple images where each object in each image was considered a match to only one object in the other images (FIG. 27, below); and 2) multiple images, where each object in each image was considered a match to possibly more than one object in the other images (FIG. 28, below). Two forms of each of these metrics were calculated. In the first form, the percentage of objects in each image whose Dice or Jaccard similarity match to their corresponding object or objects in all other images was more than a cut-off point (we used 0.70 in our experiments) for all eight perturbed variants was calculated. In the second form, the Dice and Jaccard similarity scores were averaged of all the objects in each image. Here, the similarity scores were the average of scores for all matches to each perturbed variant where a score of 0.70 was obtained. This was necessary to avoid overly skewing the results when an object has no match in a perturbed variant.

Partition Stability Validation Metrics:

In some embodiments of the present invention, one or more of the metrics may be used to rank segmented images.

Metric 1: In some embodiments, a background texture metric, for example, background texture of epithelial cytoplasm objects per image, may be Metric 2: In some embodiments, a band texture metric, for example, average texture of the band around each epithelial cytoplasm object per image, may be used to rank segmented images. In some embodiments, this metric may be computed as follows:
1. obtaining the background mask by complementing an original cytoplasm segmented mask; and
2. multiplying the original image with the background mask and computing the average energy in the background.

Metric 3: In some embodiments, a band texture metric, for example, average texture of the band around each epithelial cytoplasm object per image, may be used to rank segmented images. In some embodiments, this metric may be computed as follows:
1. dilate a segmented epithelial cytoplasm mask using, for example, a 10 pixel disk structuring element;
2. subtracting the dilated mask from the original cytoplasm mask; and
3. calculating the energy (texture) of that band for each cytoplasm gland object and averaged for each image, with this value being the band texture for that particular image.

Metric 4: In some embodiments, a background ratio texture metric, for example, the ratio of background texture of the original cytoplasm (e.g., CK18) background divided by the dilated (e.g., CK18) background, may be used to rank segmented images. In some embodiments, this metric may be computed as follows:
1. dilate a segmented epithelial cytoplasm mask using, for example, a 10 pixel disk structuring element;
2. obtaining the original and dilated backgrounds by complementing the original and dilated cytoplasm segmented masks; and
3. computing the energy (texture) of the ratio of the original cytoplasm (e.g., CK18) background divided by the dilated (e.g., CK18) background, with this value being the background ratio texture for that particular image.

Results Analysis:

For each of the 48-by-4 image-algorithm pairs, a ground-truth match metric (using the classic Dice metric) and four stability validation metrics (described above) were calculated. The correlation between each of the 48-by-4 ground truth scores for each image-algorithm pair to the corresponding stability validation score were also calculated for each metric. Using 48 images and 4 algorithms, it was determined whether the stability-based validation method could pick the better of every algorithm pair for every image, as judged by accuracy-based validation. Results showed this to be true in over 96% of cases. It exaggerated the accuracy difference in segmentation results judged similar by ground-truth validation in 4% of cases. The method reduced segmentation review effort and time by over 99% and consistently detected poor segmentation outputs.

Figure 26A:
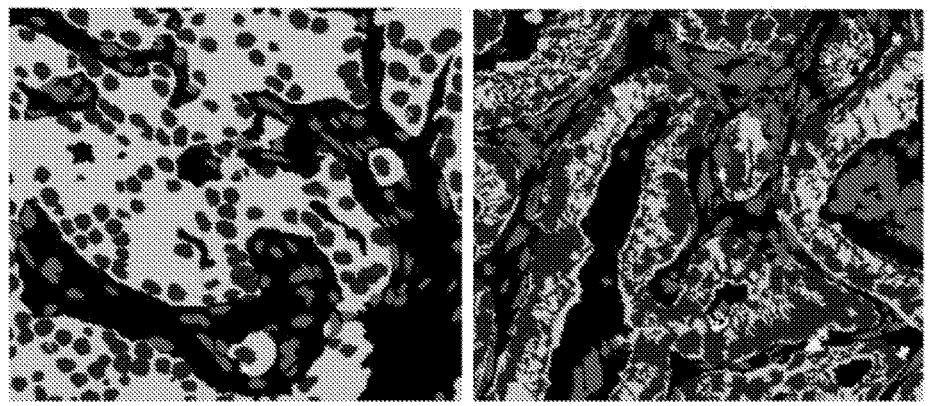
FIG. 26A, subpart (a), illustrates an application of stability analysis to segmentation scoring according to some embodiments of the present invention, where the image on the left is a good segmentation result with a high stability score and the image on the right is a poor segmentation result producing a low statistical stability score.
Figure 26A:
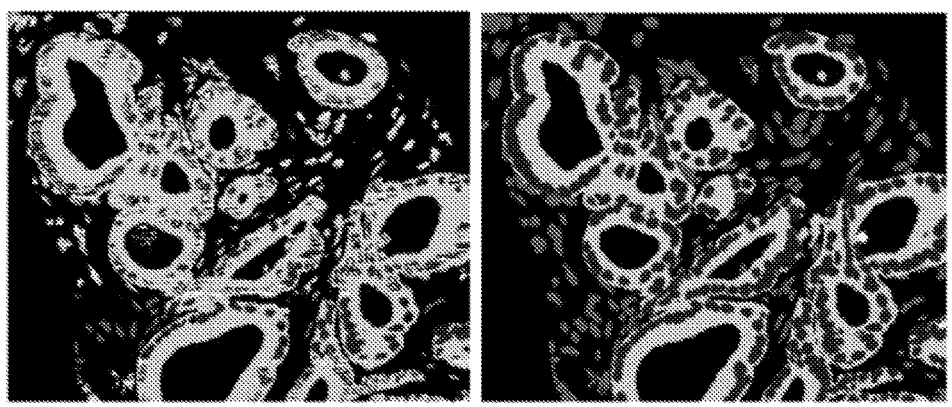
Figure 26B:
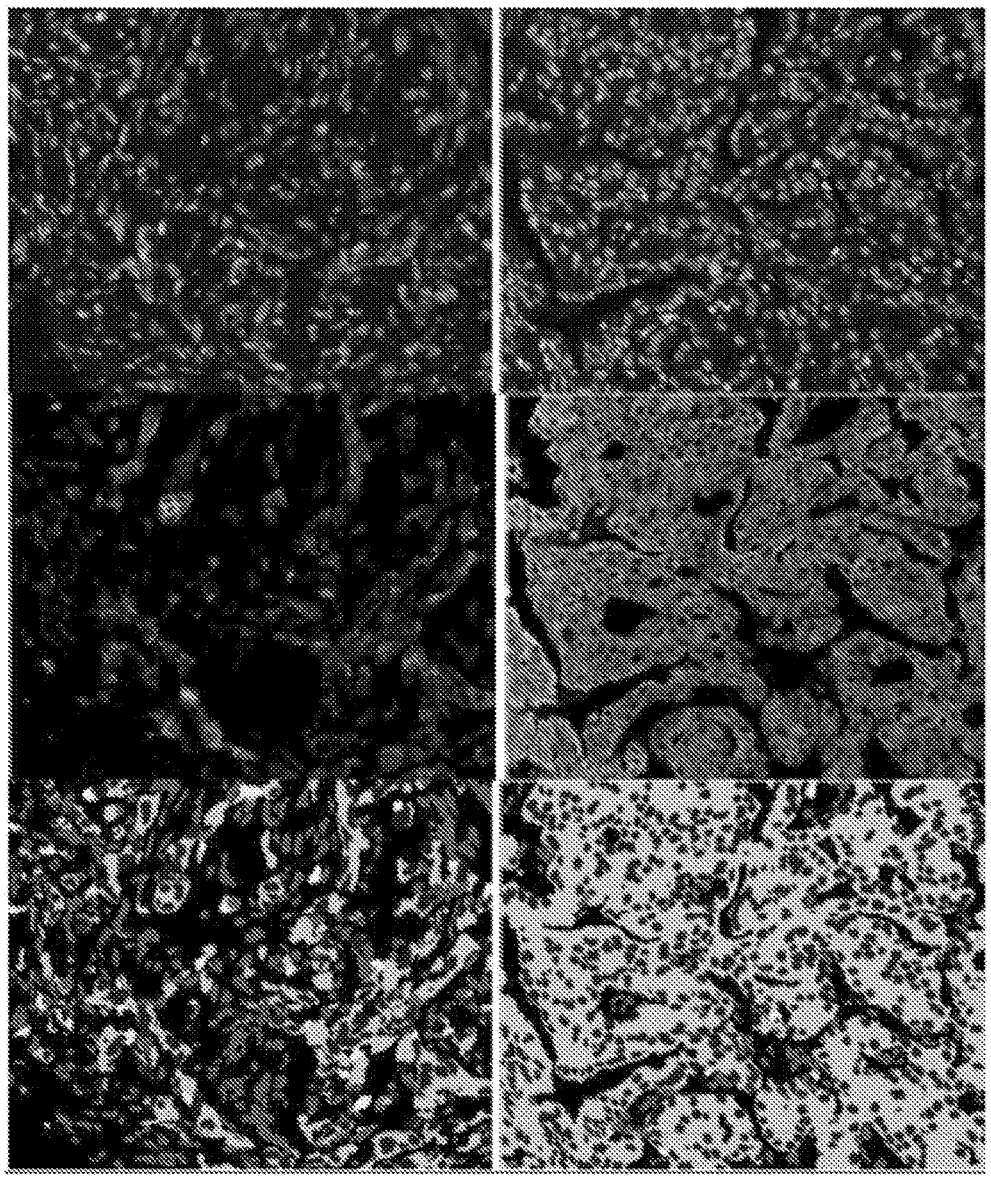
FIG. 26B illustrates examples of several overlapping nuclei (on right) and few overlaps (on left), where the DAPI, CK18, and segmentation outputs are shown from top to bottom.
Figure 26C:
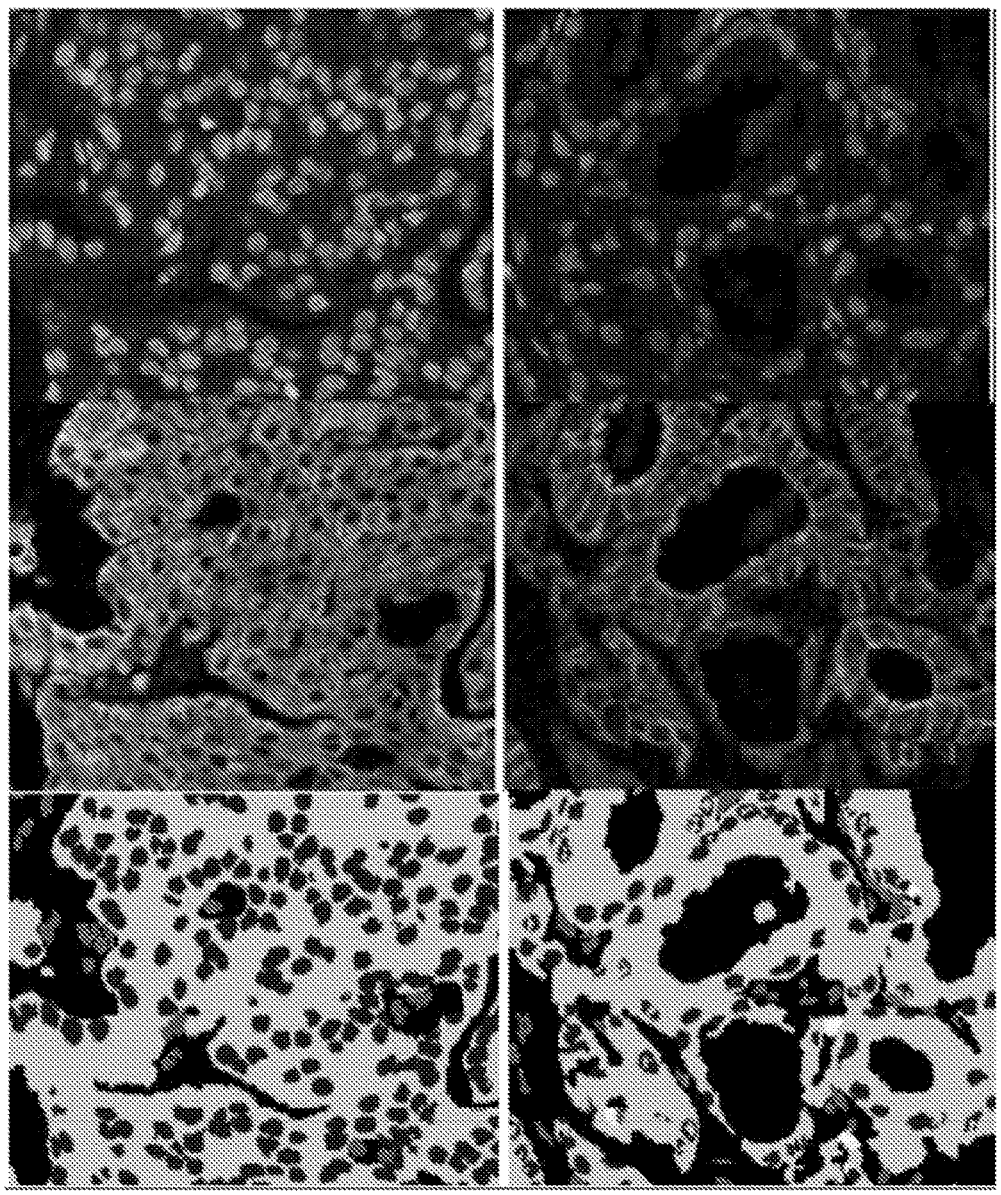
FIG. 26C illustrates a good segmentation output corresponding to a case with a high stability score (right column), and a poor segmentation result producing a low stability score, where the DAPI, CK18, and segmentation outputs are shown from top to bottom.

FIG. 26A shows images subject to stability analysis according to some embodiments of the present invention. In (a), segmentation scoring was performed and the image on the left has a good segmentation with a high stability score, whereas the image on the right has poor segmentation that resulted in a low statistical stability score. In this example, the metrics described in connection with FIG. 27 were used to score these images. In (b), bug detection was performed and the effect of a statistical estimation bug in one of the segmentation approaches yielded the image on the left which had a poor score, whereas the image on the right was created with the same segmentation approach after the estimation bug was fixed and it received a correspondingly higher validation score. The images in FIG. 26A were originally generated in color but have been provided herein in black and white for ease of reproduction. FIG. 26B illustrates examples of several overlapping nuclei (on right) and few overlaps (on left), where the DAPI, CK18, and segmentation outputs are shown from top to bottom. FIG. 26C illustrates a good segmentation output corresponding to a case with a high stability score (right column), and a poor segmentation result producing a low stability score, where the DAPI, CK18, and segmentation outputs are shown from top to bottom.

To characterize the two datasets, the average statistics of the statistical stability metric 1 and the three partition stability metrics were calculated for biopsy and prostatectomy tissue images and shown in Table 20 below. Due to laboratory process differences, prostatectomy tissue images had higher background noise than biopsy tissue images. This corresponded to lower mean metric values. Further, the standard deviations of values for the biopsy images were lower than those of the prostatectomy images, indicating their segmentation was superior on average. In Table 20: S-DSC: stability-based Dice correlation coefficient, BGT: background texture; BNT: band texture; BGRT: the ratio of background texture to combined texture of the foreground and band, in other words, the texture in the background of original versus dilated cytoplasm backgrounds.

TABLE 20

| Datasets | | S-DSC | BGT | BNT | BGRT |
|---|---|---|---|---|---|
| Biopsy (926 Images) | Min | 90.66 | 88.89 | 94.48 | 94.43 |
| | Max | 99.99 | 99.98 | 99.98 | 99.98 |
| | Mean | 99.30 | 99.31 | 99.48 | 99.49 |
| | Std | 0.67 | 0.92 | 0.61 | 0.61 |
| Prostatectomy (1030 Images) | Min | 92.80 | 64.67 | 81.53 | 81.20 |
| | Max | 99.83 | 99.97 | 99.98 | 99.98 |
| | Mean | 98.43 | 90.34 | 95.29 | 95.22 |
| | Std | 0.95 | 6.25 | 2.91 | 2.98 |

Table 21 below illustrates the improvement in nuclei features obtained when, for example, the lower 30% of images with low statistical stability scores are pruned (eliminated) from the dataset. Table 21 shows the concordance index of minimum spanning tree nuclei features obtained from 926 prostate biopsy images before and after such pruning.

TABLE 21

| | Mean Length | Proportional Edge 1 | Proportional Edge | Proportional Edge 3 |
|---|---|---|---|---|
| Before pruning | 0.56 | 0.68 | 0.69 | 0.67 |
| After pruning | 0.68 | 0.72 | 0.74 | 0.69 |

Discussion:

Stability analysis was applied to performance assessment of segmentation algorithms without using ground-truth images. Tests using 48 realistic phantoms and four segmentation algorithms show that statistical validation scores correspond to ground-truth validation scores in over 96% of cases. Tests on 6000 segmentation results show that this method cut the segmentation review time and effort by over 99%. As no ground-truth is required, this method can be used for performance evaluation long after algorithm development.

In various embodiments of the present invention, one or both of statistical and partition stability can be applied to the task of ranking images by segmentation. Table 22 above shows average values of statistical and partition stability metrics in the biopsy and prostatectomy sets.

Additional Embodiments

Thus it is seen that systems and methods are provided for, for example, segmentation and processing of tissue images and feature extraction from the same. Although particular embodiments have been disclosed herein in detail, this has been done by way of example for purposes of illustration only, and is not intended to be limiting with respect to the scope of the appended claims, which follow. In particular, it is contemplated by the applicant that various substitutions, alterations, and modifications may be made without departing from the spirit and scope of the invention as defined by the claims. Other aspects, advantages, and modifications are considered to be within the scope of the following claims. The claims presented are representative of the inventions disclosed herein. Other, unclaimed inventions are also contemplated. Applicant reserves the right to pursue such inventions in later claims.

Insofar as embodiments of the invention described above are implementable, at least in part, using a computer system, it will be appreciated that a computer program for implementing at least part of the described methods and/or the described systems is envisaged as an aspect of the present invention. The computer system may be any suitable apparatus, system or device. For example, the computer system may be a programmable data processing apparatus, a general purpose computer, a Digital Signal Processor or a microprocessor. The computer program may be embodied as source code and undergo compilation for implementation on a computer, or may be embodied as object code, for example.

It is also conceivable that some or all of the functionality ascribed to the computer program or computer system aforementioned may be implemented in hardware, for example by means of one or more application specific integrated circuits.

Suitably, the computer program can be stored on a carrier medium in computer usable form, such as a non-transitory computer readable storage medium, which is also envisaged as an aspect of the present invention. For example, the carrier medium may be solid-state memory, optical or magneto-optical memory such as a readable and/or writable disk for example a compact disk (CD) or a digital versatile disk (DVD), or magnetic memory such as disc or tape, and the computer system can utilize the program to configure it for operation. The computer program may also be supplied from a remote source embodied in a carrier medium such as an electronic signal, including a radio frequency carrier wave or an optical carrier wave.

All of the following disclosures are hereby incorporated by reference herein in their entireties: U.S. application Ser. No. 12/821,664, filed on Jun. 23, 2010; U.S. Provisional Application No. 61/280,162, filed on Oct. 30, 2009; U.S. application Ser. No. 12/584,048, filed on Aug. 31, 2009; U.S. application Ser. No. 12/462,041, filed on Jul. 27, 2009; PCT Application No. PCT/US09/04364, filed on Jul. 27, 2009; PCT Application No. PCT/US08/004523, filed Apr. 7, 2008, which claims priority from U.S. Provisional Patent Application Nos. 60/922,163, filed Apr. 5, 2007, 60/922,149, filed Apr. 5, 2007, 60/923,447, filed Apr. 13, 2007, and 61/010,598, filed Jan. 9, 2008; U.S. patent application Ser. No. 11/200,758, filed Aug. 9, 2005; U.S. patent application Ser. No. 11/581,043, filed Oct. 13, 2006; U.S. patent application Ser. No. 11/404,272, filed Apr. 14, 2006; U.S. patent application Ser. No. 11/581,052, filed Oct. 13, 2006, which claims priority from U.S. Provisional Patent Application No. 60/726,809, filed Oct. 13, 2005; and U.S. patent application Ser. No. 11/080,360, filed Mar. 14, 2005, which is: a continuation-in-part of U.S. patent application Ser. No. 11/067,066, filed Feb. 25, 2005 (now U.S. Pat. No. 7,321,881, issued Jan. 22, 2008), which claims priority from U.S. Provisional Patent Application Nos. 60/548,322, filed Feb. 27, 2004, and 60/577,051, filed Jun. 4, 2004; a continuation-in-part of U.S. patent application Ser. No. 10/991,897, filed Nov. 17, 2004, which claims priority from U.S. Provisional Patent Application No. 60/520,815, filed Nov. 17, 2003; a continuation-in-part of U.S. patent application Ser. No. 10/624,233, filed Jul. 21, 2003 (now U.S. Pat. No. 6,995,020, issued Feb. 7, 2006); a continuation-in-part of U.S. patent application Ser. No. 10/991,240, filed Nov. 17, 2004, which claims priority from U.S. Provisional Patent Application No. 60/520,939 filed Nov. 18, 2003; and claims priority from U.S. Provisional Patent Application Nos. 60/552,497, filed Mar. 12, 2004, 60/577,051, filed Jun. 4, 2004, 60/600,764, filed Aug. 11, 2004, 60/620,514, filed Oct. 20, 2004, 60/645,158, filed Jan. 18, 2005, and 60/651,779, filed Feb. 9, 2005. Also incorporated herein by reference are Ajemba et al., "Integrated segmentation of cellular structures," Proc. of the SPIE Medical Imaging Conf, Orlando Fla., 7962 (17) (2011), and Ajemba et al, "Stability based validation of cellular segmentation algorithms," Proc. of the SPIE Medical Imaging Conference., Orlando Fla., 7962(106), (2011).

What is claimed is:

1. A computer implemented method comprising:
receiving an image of at least one tissue within the memory of a computer;
performing, using code executing in at least one or more processors of the computer, triangulation on the tissue image with epithelial nuclei centers as vertices, thereby identifying one or more triangles having one or more regions;
identifying one or more polygonal areas within the tissue by merging one or more regions of the one or more triangles;
classifying, with the at least one or more processors, at least one of the one or more polygonal areas as at least one of:
(a) gland rings,
(b) glandular non-rings,
(c) stroma regions,
(d) under-segmented regions, and
(e) incomplete regions;
storing the classified image to at least one data storage device as a patient dataset;
assigning, with at least one or more processors, a respective depth to each of the one or more triangles; and
sorting the one or more triangles based on the respective depths;
wherein merging one or more regions of the one or more triangles comprises merging one or more regions of the one or more triangles starting with the triangle having the greatest respective depth.

2. The method of claim 1, wherein the step of performing triangulation on the image comprises:
segmenting nuclei of a cellular region within the image into individually contiguous regions;
extracting the one or more epithelial nuclei centers; and
partitioning the image into polygonal regions with the one or more epithelial nuclei centers at the vertices.

3. The method of claim 1, wherein the step of classifying at least one of the one or more polygonal areas comprises classifying at least one of the one or more polygonal areas based on one or more of a size, stromal area, lumen area, ring density, and cytoplasm connectivity around a ring.

4. The method of claim 1, wherein assigning a respective depth to each of the one or more triangles comprises assigning a respective depth to each of the one or more triangles that is equal or substantially equal to a length of a longest side of the triangle.

5. The method of claim 1, wherein merging one or more regions of the one or more triangles comprises merging two of the one or more regions of the one or more triangles based on (a) a determination that a length of a common side between the two triangles is at least 90% of a depth of a neighbor, and (b) based on a determination that both of the two regions touch the same epithelial units.

6. The method of claim 1, further comprising:
applying, using code executing in at least one or more processors of the computer a perturbation to the image to generate one or more variant images;
performing segmentation on the tissue image and the one or more variant images to produce segmented versions of the tissue image and the one or more variant images; and
computing one or more metrics of similarity for the segmented versions of the tissue image and the one or more variant images in order to assess the stability of the segmentation.

7. A system comprising: one or more processors configured to interact with a computer-readable medium in order to perform operations comprising:
receiving within a memory of the processor, an image of at least one tissue;
segmenting nuclei of a cellular region within the image into individually contiguous regions;
extracting one or more epithelial nuclei centers;
partitioning the image into polygonal regions with the one or more epithelial nuclei centers at the vertices, thereby identifying one or more triangles;
merging one or more regions of the one or more triangles, thereby identifying one or more polygonal areas within the tissue;
classifying at least one of the one or more polygonal areas as at least one of:
(a) gland rings,
(b) glandular non-rings,
(c) stroma regions
(d) under-segmented regions, and
(e) incomplete regions;
evaluating a dataset with a predictive model stored within a memory of the processor, the model being based on one or more ring features selected from the group of ring features consisting of: one or more ring metrics, feature(s) derived from one or more ring metrics, and feature(s) representing an adjacency relationship between rings; and
generating an evaluation of a medical condition by outputting a value indicative of the medical condition in the patient.

8. A computer implemented method comprising:
receiving an image of at least one tissue within the memory of a computer;
performing, using code executing in at least one or more processors of the computer, triangulation on the tissue image with epithelial nuclei centers as vertices, thereby identifying one or more triangles having one or more regions;
identifying one or more polygonal areas within the tissue by merging one or more regions of the one or more triangles;
classifying, with the at least one or more processors, at least one of the one or more polygonal areas as at least one of:
(a) gland rings,
(b) glandular non-rings,
(c) stroma regions,
(d) under-segmented regions, and
(e) incomplete regions;
storing the classified image to at least one data storage device as a patient dataset;
evaluating the patient dataset with a predictive model using code executing in at least one or more processors of the computer, the model being based on one or more ring features selected from the group of ring features consisting of:
one or more ring metrics,
feature(s) derived from one or more ring metrics, and
feature(s) representing an adjacency relationship between rings; and
providing, based on the evaluating, output data indicative of the medical condition of the patient.

9. The method of claim 8, wherein the predictive model is further based on at least one additional feature selected from the group of features consisting of:
one or more clinical features,
one or more molecular features, and
one or more computer generated morphometric feature(s).

10. The method of claim 8, wherein the one or more ring features comprises one or more ring features selected from the group of ring features consisting of: outer diameter of ring, inner diameter of ring, border gap, lumen or clearing diameter, border density, lumen ratio, proportion of border touching inner clearing, proportion of border touching stroma, ratio of border less than a predefined number of pixels from stroma, mean distance of border pixels from stroma, width of epithelial padding between ring and stroma, feature(s) derived from any of the foregoing features, and feature(s) representing an adjacency relationship between rings.

11. The method of claim 8, wherein providing output data indicative of a medical condition comprises generating a value indicative of the medical condition in the patient.

* * * * *